United States Patent
Hirayama et al.

(10) Patent No.: US 9,452,806 B2
(45) Date of Patent: Sep. 27, 2016

(54) VEHICLE

(71) Applicant: Yamaha Hatsudoki Kabushiki Kaisha, Iwata-shi, Shizuoka (JP)

(72) Inventors: Yosuke Hirayama, Shizuoka (JP); Toshio Iizuka, Shizuoka (JP); Yutaka Kubo, Shizuoka (JP); Takahiro Watanabe, Shizuoka (JP); Noboru Miyamoto, Shizuoka (JP); Kaoru Sasaki, Shizuoka (JP); Hirokatsu Ogawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/430,368

(22) PCT Filed: Sep. 24, 2013

(86) PCT No.: PCT/JP2013/075720
§ 371 (c)(1),
(2) Date: Mar. 23, 2015

(87) PCT Pub. No.: WO2014/046287
PCT Pub. Date: Mar. 27, 2014

(65) Prior Publication Data
US 2015/0232147 A1   Aug. 20, 2015

(30) Foreign Application Priority Data

Sep. 24, 2012  (JP) ................................ 2012-209873
Jul. 1, 2013    (JP) ................................ 2013-138478

(51) Int. Cl.
*B62K 21/00*  (2006.01)
*B62K 21/20*  (2006.01)
*B62K 21/02*  (2006.01)

(52) U.S. Cl.
CPC ............... *B62K 21/20* (2013.01); *B62K 21/02* (2013.01)

(58) Field of Classification Search
CPC .............................. B62K 21/20; B62K 21/02
See application file for complete search history.

(56) References Cited

U.S. PATENT DOCUMENTS

| D547,242 S | 7/2007 | Lambri |
|---|---|---|
| 2004/0140645 A1 | 7/2004 | Hayashi |

(Continued)

FOREIGN PATENT DOCUMENTS

| CN | 1386668 A | 12/2002 |
|---|---|---|
| CN | 201151444 Y | 11/2008 |

(Continued)

OTHER PUBLICATIONS

Official Communication issued in corresponding European Patent Application No. 13 838 370.8, mailed on Oct. 30, 2015.

(Continued)

*Primary Examiner* — Joseph Rocca
*Assistant Examiner* — Marlon A Arce
(74) *Attorney, Agent, or Firm* — Keating and Bennett, LLP

(57) ABSTRACT

At least a portion of a tie rod of a steering force transmitting mechanism overlaps with a portion of a first support member or a second support member when viewed from a front of a vehicle in a fully-tilted condition in which the vehicle body frame is fully tilted in the left-right direction. At least a portion of the tie rod is disposed below a second cross member, above a first front wheel and a second front wheel, behind a front end of the first front wheel and a front end of the second front wheel, and ahead of a first axis of a first side member and a second axis of a second side member when viewed from the left or right of the vehicle when the vehicle body frame is in an upright state.

7 Claims, 20 Drawing Sheets

(56) References Cited

U.S. PATENT DOCUMENTS

| | | |
|---|---|---|
| 2005/0167174 A1 | 8/2005 | Marcacci |
| 2008/0115994 A1 | 5/2008 | Martini et al. |
| 2012/0161410 A1 | 6/2012 | Ting et al. |
| 2014/0353940 A1 | 12/2014 | Bartolozzi et al. |
| 2015/0259027 A1* | 9/2015 | Takano .................. B62K 5/05 280/267 |

FOREIGN PATENT DOCUMENTS

| | | |
|---|---|---|
| CN | 201670311 U | 12/2010 |
| DE | 10 2010 052 716 A1 | 6/2011 |
| EP | 1 391 374 A1 | 2/2004 |
| EP | 1 561 612 A1 | 8/2005 |
| EP | 2 399 811 A1 | 12/2011 |
| EP | 2 404 817 A1 | 1/2012 |
| JP | 2005-313876 A | 11/2005 |
| JP | 2008-168893 A | 7/2008 |
| JP | 2011-195099 A | 10/2011 |
| TW | 200530057 A | 9/2005 |
| TW | 201125770 A1 | 8/2011 |
| TW | 201202081 A1 | 1/2012 |
| TW | 201210882 A1 | 3/2012 |
| WO | 2012/007819 A1 | 1/2012 |

OTHER PUBLICATIONS

Official Communication issued in corresponding European Patent Application No. 13 838 370.8, mailed on Nov. 20, 2015.
Official Communication issued in corresponding Columbian Patent Application No. 15712, mailed on Dec. 29, 2015.
Official Communication issued in International Patent Application No. PCT/JP2013/075720, mailed on Dec. 24, 2013.
Piaggio, "Catalogo Parti Di Ricambio", NTRC000U01, MP3 300 ie LT Mod. ZAPM64102, 116 pages.
Iizuka et al.; "Vehicle", U.S. Appl. No. 14/430,371, filed Mar. 23, 2015.
Takano et al.; "Vehicle"; U.S. Appl. No. 14/430,376, filed Mar. 23, 2015.

* cited by examiner

VEHICLE

BACKGROUND OF THE INVENTION

1. Field of the Invention

The present invention relates to a vehicle including a tiltable vehicle body frame and two front wheels.

2. Description of the Related Art

A known vehicle includes a vehicle body frame that is tilted in the left-right direction during the cornering of the vehicle and two front wheels provided so as to be arranged in the left-right direction of the vehicle body frame (for example, see German Patent Publication No. 10 2010 052 716 A, International Publication No. WO 2012/007819, U.S. Design Pat. No. D547,2425, and Catalogo partidi ricambio, MP3 300 ie LT Mod. ZAPM64102, Piaggio).

The vehicle including the tiltable vehicle body frame and the two front wheels further includes a link mechanism. The link mechanism includes an upper cross member and a lower cross member. Furthermore, the link mechanism also includes a right side rod and a left side rod. The right side rod supports the right end portions of the upper cross member and the lower cross member. The left side rod supports the left end portions of the upper cross member and the lower cross member. The intermediate portions of the upper cross member and the lower cross member are supported on the vehicle body frame at a position directly in front of a steering shaft. The upper cross member and the lower cross member are supported on the vehicle body frame so as to be turnable about axes extending substantially in the front-rear direction of the vehicle body frame. The upper cross member and the lower cross member are turned relative to the vehicle body frame in cooperation with the tilting of the vehicle body frame such that the relative positions of the two front wheels in the up-down direction of the vehicle body frame are changed. In the upright state of the vehicle body frame, the upper cross member and the lower cross member are located above the two front wheels in the up-down direction of the vehicle body frame.

The vehicle including the tiltable vehicle body frame and the two front wheels further includes a right shock absorber and a left shock absorber. The right shock absorber supports the right front wheel so that the right front wheel is movable in the up-down direction of the vehicle body frame. The left shock absorber supports the left front wheel so that the left front wheel is movable in the up-down direction of the vehicle body frame. The right shock absorber is supported on the right side rod so as to be turnable about the axis of the right side rod. The right shock absorber includes a right shock-absorbing member and a right bracket to support the right shock-absorbing member. The left shock absorber is supported on the left side rod so as to be turnable about the axis of the left side rod. The left shock absorber includes a left shock-absorbing member and a left bracket to support the left shock-absorbing member. The vehicles described in German Patent Publication No. 10 2010 052 716 A and International Publication No. WO 2012/007819 further include a handle bar, a steering shaft, and a turn transmitting mechanism. The handle bar is fixed to the steering shaft. The steering shaft is turnably supported on the vehicle body frame. When the handle bar is steered, the steering shaft is also turned. The turn transmitting mechanism transmits the turning of the steering shaft to the right shock absorber and to the left shock absorber.

The vehicle including the tiltable vehicle body frame and the two front wheels further includes numerous on-vehicle components on the periphery of the steering shaft. The on-vehicle components are, for example, lighting devices such as a headlight, a radiator, a reservoir tank, electric devices such as a horn, a vehicle main switch, a storage box, a storage pocket and the like.

The vehicles described in German Patent Publication No. 10 2010 052 716 A and International Publication No. WO 2012/007819 include a link mechanism on the periphery of the steering shaft so that the link mechanism is moved in cooperation with the titling of the vehicle body frame. Hence, in the vehicle including the tiltable vehicle body frame and the two front wheels, when the on-vehicle components are located around the periphery of the steering shaft, the components are required to be spaced away from the movable range of the link mechanism. For this reason, in the vehicle including the tiltable vehicle body frame and the two front wheels, the structure provided around the periphery of the steering shaft is liable to become bulky.

In the vehicle disclosed in German Patent Publication No. 10 2010 052 716 A, a turn transmitting mechanism is disposed between the lower cross member and the right and left brackets in the up-down direction of the vehicle when the vehicle is viewed from the front. The lower cross member, the turn transmitting mechanism, and the left and right brackets are moved in the up-down direction in cooperation with one another. Since their movable ranges overlap with one another, the structure around the periphery of the steering shaft is not liable to become bulky even if on-vehicle components such as a headlight and auxiliary devices are provided. On the other hand, in the tilted state of the vehicle body frame, it is necessary to secure clearances between the turn transmitting mechanism and the right shock absorber and between the turn transmitting mechanism and the left shock absorber. Hence, each of the right bracket and the left bracket includes a slanted portion slanted inward toward the center in the vehicle width direction, and the shock-absorbing member is connected to the lower end portion of the slanted portion. Accordingly, it is possible to secure the clearances between the turn transmitting mechanism and the right shock absorber and between the turn transmitting mechanism and the left shock absorber, not only in the upright state of the vehicle body frame but also in the tilted state thereof. However, since each of the right bracket and the left bracket includes the slanted portion, the extension/contraction lengths of the right shock-absorbing member and the left shock-absorbing member become short. When the extension/contraction lengths of the shock-absorbing members are not sufficiently long, the impact forces applied to the two front wheels are hardly absorbed. As a result, in the vehicle disclosed in German Patent Publication No. 10 2010 052 716 A, an enlargement of the structure around the periphery of the steering shaft is suppressed but the riding comfort of the vehicle is degenerated.

In the vehicle disclosed in International Publication No. WO 2012/007819, the turn transmitting mechanism is curved upward when the vehicle is viewed from the front. In addition, a portion of the turn transmitting mechanism overlaps with the lower cross member. Hence, the extension/contraction lengths of the shock-absorbing members are sufficiently long while securing the clearances between the turn transmitting mechanism and the right shock absorber and between the turn transmitting mechanism and the left shock absorber. However, the space ahead of the lower cross member is eventually used as the movable range of the turn transmitting mechanism. Since the turn transmitting mechanism is moved in cooperation with the link mechanism and the steering of the handle bar, its movable range is large.

Hence, it is necessary to configure the turn transmitting mechanism so that the movable range of the link mechanism does not interfere with the movable range of the turn transmitting mechanism. Furthermore, when the on-vehicle components such as a headlight and auxiliary devices are included, it is necessary to avoid the movable range of the link mechanism and the movable range of the turn transmitting mechanism. As a result, in the vehicle disclosed in International Publication No. WO 2012/007819, the riding comfort of the vehicle is secured but the structure around the periphery of the steering shaft eventually becomes bulky.

SUMMARY OF THE INVENTION

Preferred embodiments of the present invention provide a vehicle including a tiltable vehicle body frame and two front wheels, and that significantly reduces or prevents an enlargement of the structure around a periphery of a steering shaft located above the two front wheels while also significantly reducing or preventing degeneration of riding comfort of the vehicle.

According to a preferred embodiment of the present invention, a vehicle includes a vehicle body frame; a first front wheel and a second front wheel arranged side by side in a left-right direction of the vehicle body frame; a first support member including a first shock-absorbing member supporting the first front wheel at a lower portion thereof and configured to absorb displacement of the first front wheel in an up-down direction of the vehicle body frame relative to an upper portion thereof, and a first bracket supporting the upper portion of the first shock-absorbing member; a second support member including a second shock-absorbing member supporting the second front wheel at a lower portion thereof and configured to absorb displacement of the second front wheel in the up-down direction of the vehicle body frame relative to the upper portion thereof, and a second bracket supporting the upper portion of the second shock-absorbing member; a link mechanism including a first side member disposed such that a lower portion thereof is located ahead of an upper portion thereof in a front-rear direction of the vehicle body frame and supporting the upper portion of the first support member so as to be turnable about a first axis extending in the up-down direction of the vehicle body frame, a second side member disposed such that a lower portion thereof is located ahead of an upper portion thereof in the front-rear direction of the vehicle body frame and supporting the upper portion of the second support member so as to be turnable about a second axis extending parallel or substantially parallel to the first axis, an upper turnable member turnably supporting the upper portion of the first side member at a left end portion thereof and turnably supporting the upper portion of the second side member at a right end portion thereof, the upper turnable member including an intermediate portion supported on the vehicle body frame so as to be turnable about an upper axis extending in the front-rear direction of the vehicle body frame, and a lower turnable member turnably disposed below the upper turnable member and above the first front wheel and the second front wheel when the vehicle body frame is in an upright state, the lower turnable member supporting the lower portion of the second side member at a left end portion thereof, turnably supporting the lower portion of the second side member at a right end portion thereof, including an intermediate portion which is supported on the vehicle body frame so as to be turnable about a lower axis extending parallel or substantially parallel to the upper axis, and is disposed ahead of the first axis and the second axis; a steering shaft supported by the vehicle body frame at a position between the first side member and the second side member in a left-right direction of the vehicle body frame, the steering shaft including an upper end portion disposed above the lower axis in the up-down direction, disposed such that a lower end portion thereof is located ahead of the upper end portion in the front-rear direction of the vehicle body frame, and being turnable about a steering turn axis extending in the up-down direction of the vehicle body frame; a handle disposed on the upper end portion of the steering shaft; and a steering force transmitting mechanism including a tie rod extending in the left-right direction of the vehicle body frame and configured to transmit a turning motion of the steering shaft in accordance with an operation of the handle to the first support member and the second support member; wherein at least a portion of the tie rod of the steering force transmitting mechanism overlaps with a portion of the first support member or the second support member when viewed from a front of the vehicle when the vehicle body frame is in a fully-tilted condition in the left-right direction; and at least a portion of the tie rod of the steering force transmitting mechanism is disposed below the lower turnable member, above the first front wheel and the second front wheel, behind a front end of the first front wheel and a front end of the second front wheel, and ahead of the first axis of the first side member and the second axis of the second side member when viewed from the left or right of the vehicle in which the vehicle body frame is in the upright state.

With this configuration, at least a portion of the tie rod is disposed below the lower turnable member provided ahead of the first axis of the first side member and the second axis of the second side member and above the first front wheel and the second front wheel as viewed from the side of the vehicle in the upright state of the vehicle body frame. Furthermore, at least a portion of the tie rod is disposed behind of the front end of the first front wheel and the front end of the second front wheel and ahead of the first axis of the first side member and the second axis of the second side member. Moreover, at least a portion of the tie rod overlaps with a portion of the first support member or the second support member as viewed from the front of the vehicle when the vehicle body frame is in the fully tilted state in the left-right direction. Hence, the tie rod is disposed at a position close to or within the movable ranges of the first front wheel and the second front wheel at the time when the vehicle body frame is tilted in the left-right direction. The space in which the tie rod is disposed is a space that is not used conventionally because of interference with the first front wheel and the second front wheel. The inventor of the present invention first noticed that the tie rod moves together with the first front wheel and the second front wheel in cooperation with the operation of the link mechanism and the steering of the handle bar. Then, the inventor of the present invention conceived that it is possible to avoid interference between the tie rod and the first and second front wheels. With the use of this idea, the Examiner determined that the interference of the front wheel, the second front wheel, the lower turnable member, the first support member, and the second support member with the tie rod is capable of being avoided by disposing the tie rod at a position close to or within the movable ranges of the front wheel and the second front wheel. Moreover, the tie rod is disposed below the lower turnable member that is provided ahead of the first axis of the first side member and the second axis of the second side member. Hence, on-vehicle components, such as other auxiliary devices, are able to be disposed in the space ahead of the lower turnable member. As a result, an enlargement of the structure around the periphery of the steering shaft is reduced or prevented.

Moreover, the tie rod overlaps with a portion of the first support member or the second support member as viewed from the front of the vehicle when the vehicle body frame is in the fully tilted state in the left-right direction. Hence, in the fully tilted state, the tie rod is positioned ahead of the first support member and the second support member. Therefore, the first shock-absorbing member of the first support member and the second shock-absorbing member of the second support member have sufficiently long extension/contraction lengths thereof while avoiding interference with the tie rod in the front-rear direction of the vehicle. As a result, the riding comfort of the vehicle is secured. As described the above, the enlargement of the structure around the periphery of the steering shaft located above the two front wheels is reduced or prevented while the degeneration of the riding comfort of the vehicle including the tiltable vehicle body frame and the two front wheels is also reduced or prevented.

It is preferable that a vehicle according to a preferred embodiment of the present invention has the following configuration. At least a portion of the tie rod is disposed below an upper end of the first bracket of the first support member and an upper end of the second bracket of the second support member when viewed from the lateral side of the vehicle in which the vehicle body frame is in the upright state. With this configuration, the tie rod is disposed at an even lower position. Hence, a larger space is secured in an area ahead of the lower turnable member such that the on-vehicle components, such as other auxiliary devices, are disposed therein. In addition, in the above-described vehicle, even in the upright state of the vehicle body frame, the extension/contraction lengths of the first shock-absorbing member and the second shock-absorbing member are longer while contact of the tie rod with the first shock-absorbing member and the second shock-absorbing member is avoided. As a result, an enlargement of the structure around the periphery of the steering shaft located above the two front wheels is reduced or prevented while the degeneration of the riding comfort of the vehicle is reduced or prevented.

It is preferable that a vehicle according to a preferred embodiment of the present invention has the following configuration.

The upper end of the first shock-absorbing member and the upper end of the second shock-absorbing member are disposed above a lower end of the first side member and a lower end of the second side member in the up-down direction of the vehicle body frame in the upright state.

In the above-described vehicle, the distance between the upper surface and the lower surface of each of the first bracket and the second bracket is reduced. Hence, the first bracket and the second bracket are downsized in comparison with the conventional configuration in which the brackets include slanted portions. For this reason, the extension/contraction lengths of the first shock-absorbing member and the second shock-absorbing member are longer. As a result, the enlargement of the structure around the periphery of the steering shaft located above the two front wheels is further reduced or prevented while the degeneration of the riding comfort of the vehicle is also further reduced or prevented.

It is preferable that a vehicle according to a preferred embodiment of the present invention has the following configuration.

The tie rod is configured such that a left intermediate portion thereof located between a left end portion thereof and an intermediate portion thereof, and a right intermediate portion thereof located between a right end portion thereof and the intermediate portion thereof is located ahead of either one of the left end portion thereof, the right end portion thereof, and the intermediate portion thereof in the front-rear direction of the vehicle body frame in the upright state.

With this configuration, the tie rod avoids interference with the first support member and the second support member while the tie rod itself is reduced or prevented from being enlarged. Hence, the movable range of the tie rod is reduced such that the on-vehicle components, such as other auxiliary devices, are disposed in the space ahead of the lower turnable member. As a result, the enlargement of the structure around the periphery of the steering shaft located above the two front wheels is further reduced or prevented while the degeneration of the riding comfort of the vehicle is reduced or prevented.

It is preferable that a vehicle according to a preferred embodiment of the present invention has the following configuration.

A length of the tie rod in the left-right direction of the vehicle body frame is longer than a distance between a right end of the first front wheel and a left end of the second front wheel in the left-right direction, and is shorter than a distance between the first axis of the first side member and the second axis of the second side member in the left-right direction when viewed from above of the vehicle in which the vehicle body frame is in the upright state.

Since the tie rod is disposed below the lower turnable member and above the first front wheel and the second front wheel, even if its length is made longer to obtain the Ackermann geometry, the tie rod does not interfere with the first support member and the second support member. Furthermore, the on-vehicle components, such as other auxiliary devices, are disposed in the space ahead of the lower turnable member. As a result, the enlargement of the structure around the periphery of the steering shaft located above the two front wheels is reduced or prevented while the degeneration of the riding comfort of the vehicle is reduced or prevented such that the characteristics of the vehicle are adjusted easily.

It is preferable that a vehicle according to a preferred embodiment of the present invention has the following configuration.

The vehicle preferably includes a front cover supported on the vehicle body frame and covering at least the upper turnable member of the link mechanism, a first front fender disposed directly above the first front wheel and configured to turn together with the first front wheel in cooperation with a turning motion of the steering shaft; and a second front fender disposed directly above the second front wheel and configured to turn together with the second front wheel in cooperation with the turning motion of the steering shaft.

Here, the tie rod is disposed at a position closer to the first front fender and the second front fender than to the front cover in the up-down direction of the vehicle body frame in the upright state. The movement of the tie rod is interlocked with the movements of the first front fender and the second front fender. On the other hand, since the front cover is supported on the vehicle body frame, its movement is not interlocked with the movement of the tie rod. For this reason, the tie rod is disposed at an even lower position. Hence, a larger space is secured in an area ahead of the lower turnable member such that the on-vehicle components, such as other auxiliary devices, are disposed therein. As a result, the enlargement of the structure around the periphery of the steering shaft located above the two front wheels is further reduced or prevented while the degeneration of the riding comfort of the vehicle is reduced or prevented.

It is preferable that a vehicle according to a preferred embodiment of the present invention has the following configuration.

The tie rod is closer to a turning center of the first front wheel and a turning center of the second front wheel than to the lower turnable member that is provided ahead of the first axis of the first side member and the second axis of the second side member in the front-rear direction of the vehicle body frame in the upright state.

With this configuration, the tie rod is disposed in an even more anterior area. Hence, a larger space is secured in an area ahead of the lower turnable member such that the on-vehicle components, such as other auxiliary devices, are disposed therein. As a result, the enlargement of the structure around the periphery of the steering shaft located above the two front wheels is further reduced or prevented while the degeneration of the riding comfort of the vehicle is reduced or prevented.

Preferred embodiments of the present invention provide a vehicle including a tiltable vehicle body frame and two front wheels that reduces or prevents enlargement of the structure around the periphery of the steering shaft located above the two front wheels while reducing or preventing the degeneration of the riding comfort of the vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 19A and 19B are views illustrating the movements of the steering force transmitting mechanism, the first front wheel and the second front wheel of the vehicle of FIG. 11, wherein FIG. 19A is a schematic view during straight traveling and FIG. 19B is a schematic view during left turning.

DETAILED DESCRIPTION OF THE PREFERRED EMBODIMENTS

Figure 1:
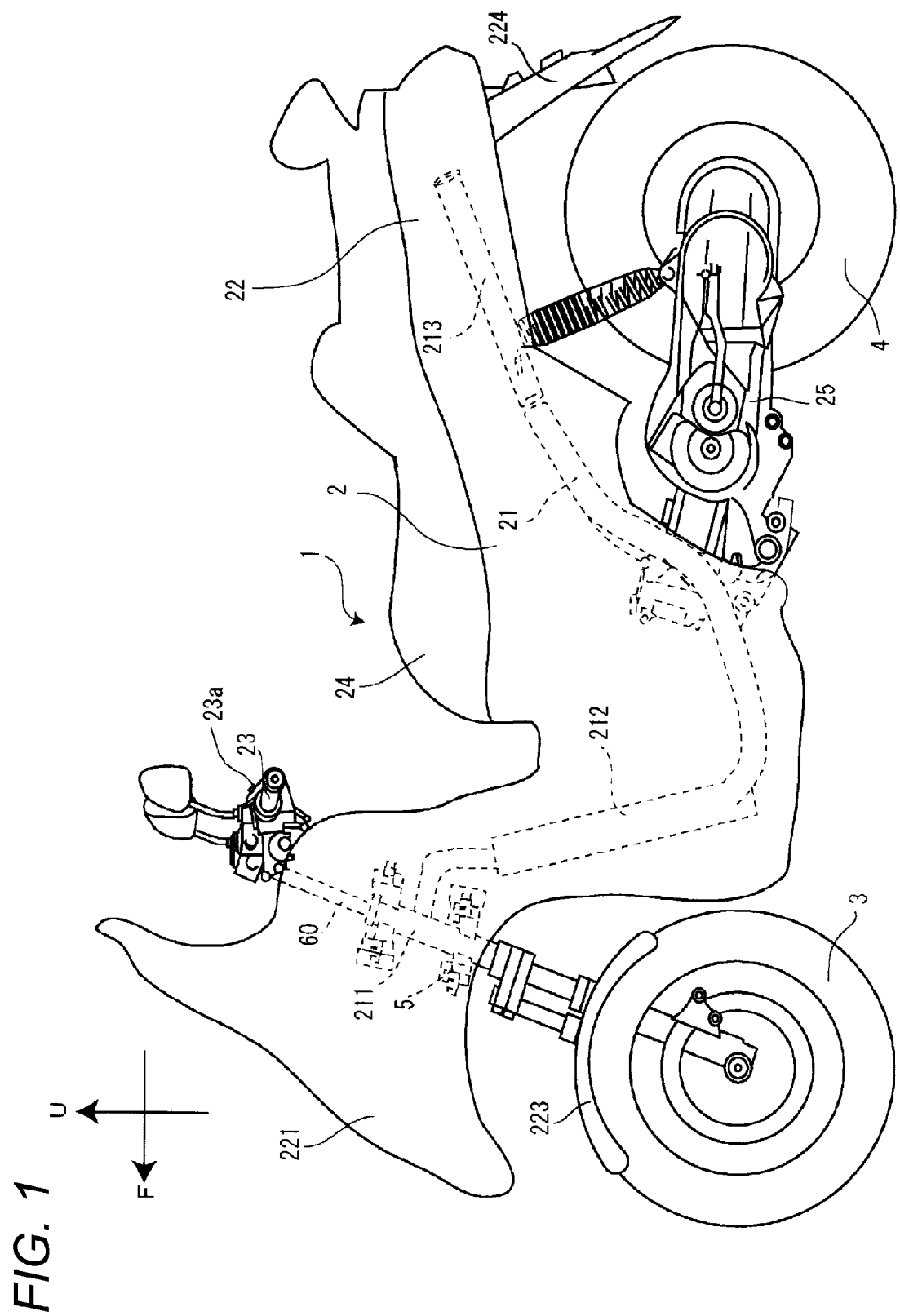
FIG. 1 is an overall side view illustrating a vehicle according to a first preferred embodiment of the present invention.

The present invention will be described below referring to the drawings on the basis of preferred embodiments thereof.
First Preferred Embodiment A three-wheel vehicle 1, which is one example of a vehicle according to a preferred embodiment of the present invention, will be described below referring to FIGS. 1 to 10. In the drawings, the same or corresponding components will be designated by the same numerals and their explanations will not be repeated. In the following descriptions, an arrow F in the drawings indicates the forward direction of the three-wheel vehicle 1. An arrow R in the drawings indicates the rightward direction of the three-wheel vehicle 1. An arrow L in the drawings indicates the leftward direction of the three-wheel vehicle 1. An arrow U in the drawings indicates the upward direction of the three-wheel vehicle 1. Outward in the vehicle width direction denotes an outward direction from the center in the vehicle width direction. In other words, the outward in the vehicle width direction denotes a direction from the center in the vehicle width direction to the leftward or rightward direction. A component disposed in a right portion of the vehicle and labeled with "first" corresponds to a component disposed in a right portion of a vehicle according to a second preferred embodiment and the claims which is labeled with "second". A component disposed in a left portion of the vehicle and labeled with "second" corresponds to a component disposed in a left portion of the vehicle according to the second preferred embodiment and the claims which is labeled with "first".

FIG. 1 is an overall side view illustrating the three-wheel vehicle 1. In the following descriptions, the front-rear direction and the left-right direction respectively denote the front-rear direction and the left-right direction as viewed from a driver on the three-wheel vehicle 1.

The three-wheel vehicle 1 includes a vehicle body 2, front wheels 3, and a rear wheel 4. The vehicle body 2 includes a vehicle body frame 21, a vehicle body cover 22, a handle bar 23, a seat 24, and a power unit 25.

The vehicle body frame 21 supports the power unit 25, the seat 24 and the like. The power unit 25 includes an engine, a transmission and the like. In FIG. 1, the vehicle body frame 21 is indicated in dashed lines.

The vehicle body frame 21 includes a head pipe 211, a down frame 212, and a rear frame 213. The head pipe 211 is disposed in the front portion of the vehicle. A link mechanism 5 is disposed around the periphery of the head pipe 211. A steering shaft 60 is turnably inserted into the head pipe 211. The steering shaft 60 extends in the up-down direction. The handle bar 23 is attached to an upper end of the steering shaft 60. The down frame 212 is slanted downward and rearward from a front end thereof. The rear frame 213 supports the seat 24, a tail lamp and the like. A switch 23a is attached to the handle bar 23.

The vehicle body frame 21 is covered with the vehicle body cover 22. The vehicle body cover 22 includes a front cover 221, front fenders 223, and a rear fender 224.

The front cover 221 is positioned directly ahead of the seat 24. The front cover 221 covers the head pipe 211 and the link mechanism 5.

The front fenders 223 are respectively disposed directly above the pair of left and right front wheels 3. The front fenders 223 are disposed directly below the front cover 221. The rear fender 224 is disposed directly above the rear wheel 4.

The front wheels 3 are positioned below the head pipe 211 and the link mechanism 5. The front wheels 3 are disposed directly below the front cover 221. The rear wheel 4 is disposed directly below the vehicle body cover 22.

Figure 2:
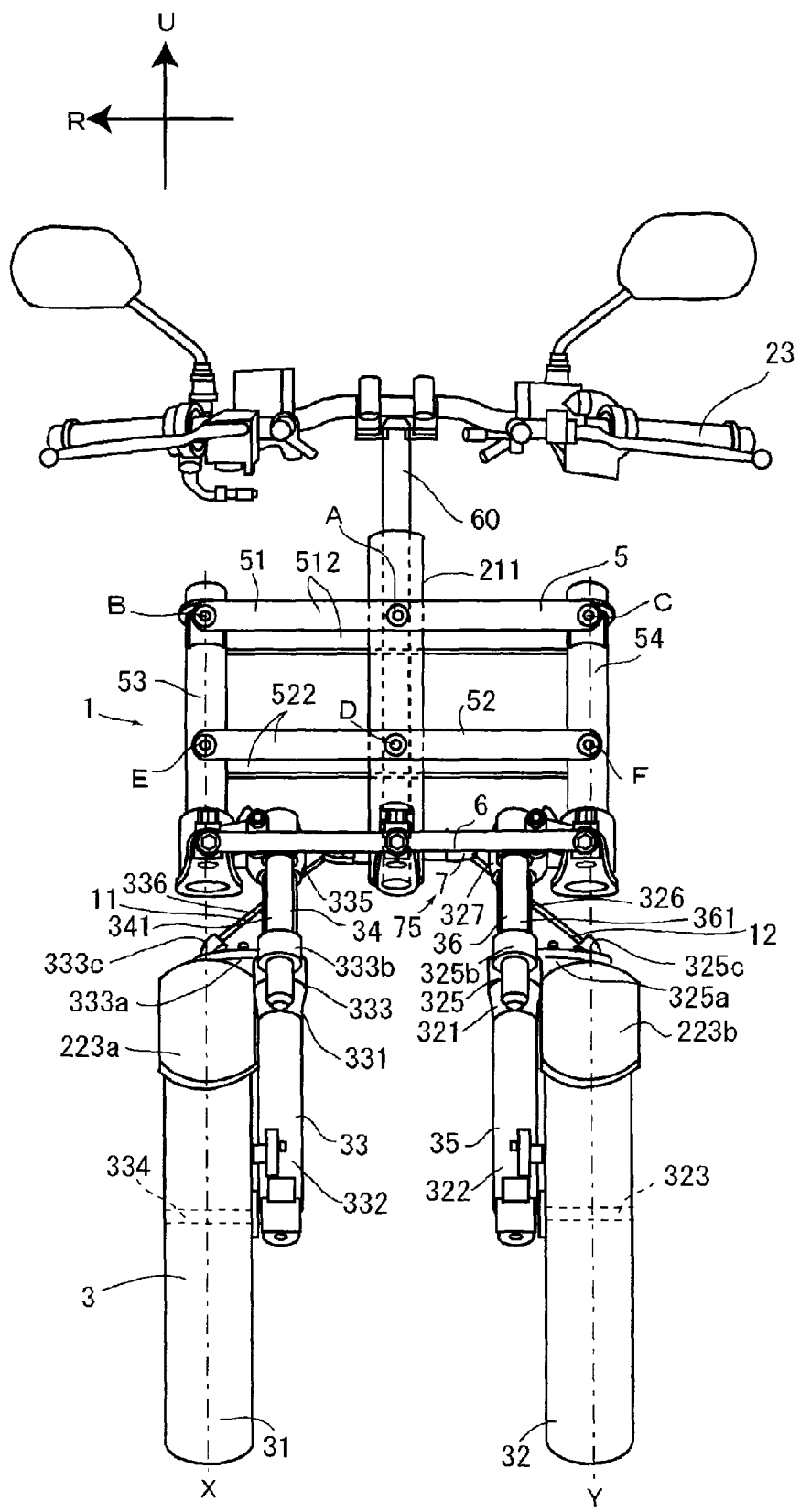
FIG. 2 is an overall front view illustrating the vehicle in a state in which a vehicle body cover is removed.

FIG. 2 is an overall front view illustrating the three-wheel vehicle 1 in a state that the vehicle body cover 22 is removed. In FIG. 2, frames, such as the down frame 212, are not illustrated.

The three-wheel vehicle 1 includes the handle bar 23, the steering shaft 60, the head pipe 211, the pair of left and right front wheels 3, a first shock absorber 33, a first turn preventing mechanism 34, a second shock absorber 35, a second turn preventing mechanism 36, the link mechanism 5, an operation force transmitting mechanism 6, and a deformation suppressing mechanism 75.

The front wheels 3 include a first front wheel 31 and a second front wheel 32. The first front wheel 31 is disposed to the right of the center in the vehicle width direction. A first front fender 223a is disposed directly above the first front wheel 31. The second front wheel 32 is disposed to the left of the center in the vehicle width direction. A second front fender 223b is disposed directly above the second front wheel 32. The first front wheel 31 and the second front wheel 32 are disposed symmetrically with the center in the vehicle width direction.

The first front wheel 31 is supported on a first support member 331. The first front wheel 31 is connected to the lower portion of the first support member 331. The first support member 331 includes a first outer cylinder 332 and a first guide 333. The lower end of the first outer cylinder 332 includes a first support shaft 334. The first support shaft 334 supports the first front wheel 31. The first outer cylinder 332 extends in the up-down direction. The first guide 333 is disposed at the upper end of the first outer cylinder 332. The first guide 333 is fixed to the upper portion of the first outer cylinder 332. The first guide 333 includes a first plate 333a. The first plate 333a extends to a location directly above the first front fender 223a. The first front wheel 31 is steerable about a first center axis X. The first front wheel 31 can change its direction by being steered about the first center axis X. The first center axis X intersects the first plate 333a at a first connection point 333c.

Figure 3:
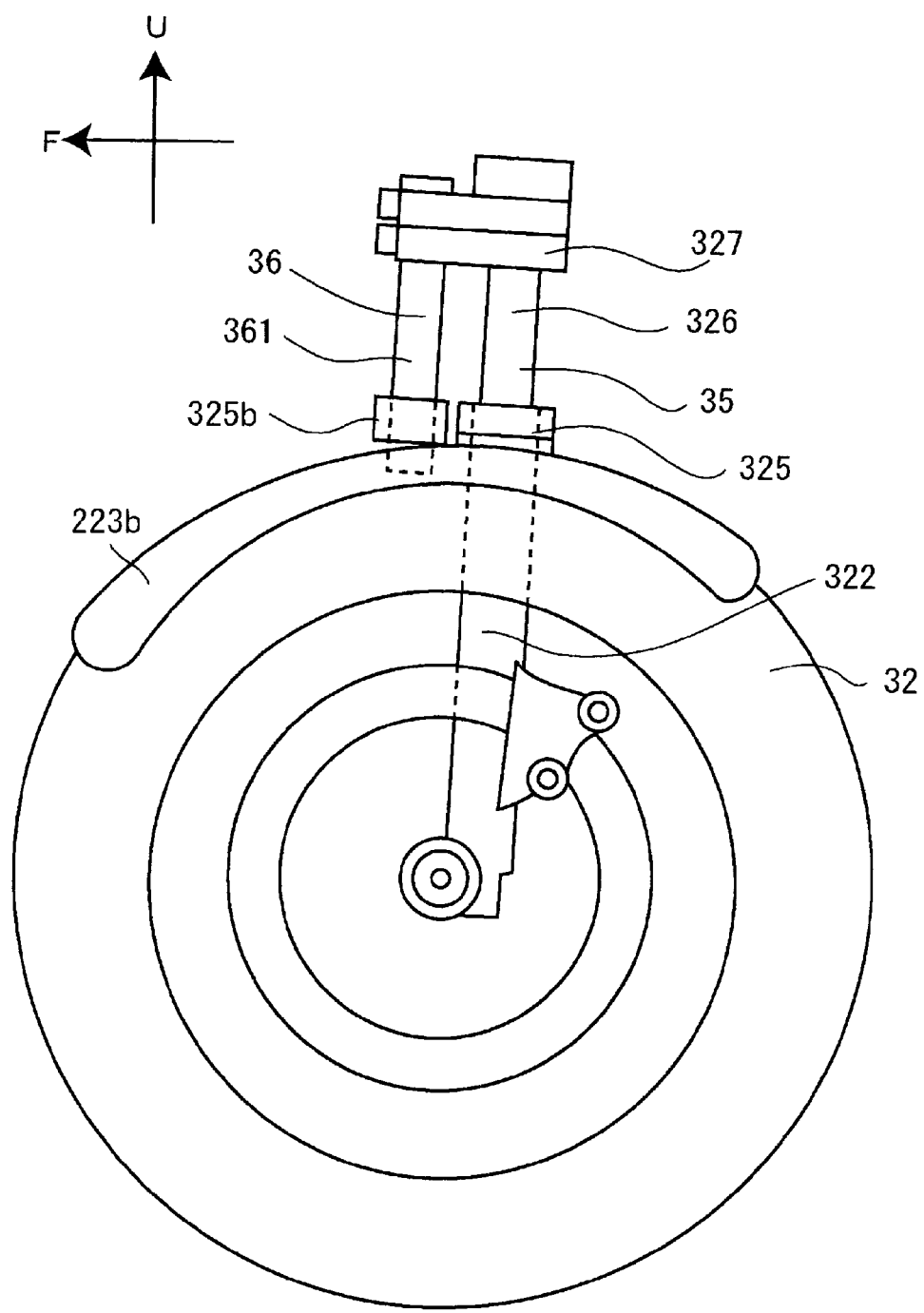
FIG. 3 is a fragmentary schematic side view illustrating a second front wheel and a second turn preventing mechanism.

FIG. 3 is a schematic left side view illustrating the second front wheel 32, the second shock absorber 35, and the second turn preventing mechanism 36.

The second shock absorber 35 includes a second outer cylinder 322 and a second inner cylinder 326. The second inner cylinder 326 is partially inserted into the inner periphery of the second outer cylinder 322. The second inner cylinder 326 is disposed directly above the second outer cylinder 322. The second inner cylinder 326 is movable relative to the second outer cylinder 322 in the extending direction of the second outer cylinder 322. A second bracket 327 is disposed at the upper end of the second inner cylinder 326. The upper end of the second inner cylinder 326 is fixed to the second bracket 327. The second shock absorber 35 preferably is a so-called telescopic shock absorber, for example.

The second turn preventing mechanism 36 prevents the turning of the second outer cylinder 322 relative to the second inner cylinder 326. The second turn preventing mechanism 36 includes a second guide 325, a second turn preventing rod 361, and the second bracket 327. The second guide 325 guides the moving direction of the second turn preventing rod 361. The second guide 325 includes a second guide cylinder 325b. The second turn preventing rod 361 is inserted into the inner periphery of the second guide cylinder 325b. The second turn preventing rod 361 is movable relative to the second guide cylinder 325b. The second turn preventing rod 361 prevents the second front wheel 32 from turning relative to the second inner cylinder 326. The second turn preventing rod 361 is parallel or substantially parallel to the second shock absorber 35. The upper end of the second turn preventing rod 361 is fixed to the second bracket 327. The second turn preventing rod 361 is not movable relative to the second inner cylinder 326. The second bracket 327 secures the second inner cylinder 326 and the second turn preventing rod 361.

The three-wheel vehicle 1 will be described referring again to FIG. 2. The first shock absorber 33 includes the first outer cylinder 332 and a first inner cylinder 336. The first shock absorber 33 and the second shock absorber 35 have similar configurations. The first inner cylinder 336 is partially inserted into the inner periphery of the first outer cylinder 332. The first inner cylinder 336 is disposed directly above the first outer cylinder 332. The first inner cylinder 336 is movable relative to the first outer cylinder 332 in the extending direction of the first outer cylinder 332. A first bracket 335 is disposed at the upper end of the first inner cylinder 336. The upper end of the first inner cylinder 336 is fixed to the first bracket 335. The first shock absorber 33 preferably is a so-called telescopic shock absorber, for example.

The first turn preventing mechanism 34 prevents the turning of the first outer cylinder 332 relative to the first inner cylinder 336. The first turn preventing mechanism 34 and the second turn preventing mechanism 36 have similar configurations. The first turn preventing mechanism 34 includes the first guide 333, a first turn preventing rod 341, and the first bracket 335. The first guide 333 guides the moving direction of the first turn preventing rod 341. The first guide 333 includes a first guide cylinder 333b. The first turn preventing rod 341 is inserted into the inner periphery of the first guide cylinder 333b. The first turn preventing rod 341 is movable relative to the first guide cylinder 333b. The first turn preventing rod 341 prevents the relative turning of the first front wheel 31 relative to the first inner cylinder 336. The first turn preventing rod 341 is parallel or substantially parallel to the first shock absorber 33. The upper end of the first turn preventing rod 341 is fixed to the first bracket 335. The first turn preventing rod 341 is not movable relative to the first inner cylinder 336. The first bracket 335 secures the first inner cylinder 336 and the first turn preventing rod 341.

The second front wheel 32 is supported on a second support member 321. The second front wheel 32 is connected to the lower portion of the second support member 321. The second support member 321 includes the second outer cylinder 322 and the second guide 325. The second outer cylinder 322 includes a second support shaft 323 at its lower end. The second support shaft 323 supports the second front wheel 32. The second outer cylinder 322 extends in the up-down direction. The second guide 325 is disposed at the upper end of the second outer cylinder 322. The second guide 325 is fixed to the upper portion of the second outer cylinder 322. The second guide 325 includes a second plate 325*a*. The second plate 325*a* extends to a location directly above the second front fender 223*b*. The second front wheel 32 is steerable about a second center axis Y. The second front wheel 32 can change its direction by being steered about the second center axis Y. The second center axis Y intersects the second plate 325*a* at a second connection point 325*c*.

The link mechanism 5 is disposed directly below the handle bar 23. The link mechanism 5 is disposed above the first front wheel 31 and the second front wheel 32. The link mechanism 5 is connected to the head pipe 211. The link mechanism 5 includes a first cross member 51 (one example of an upper turnable member), a second cross member 52 (one example of a lower turnable member), a first side member 53, and a second side member 54.

The first cross member 51 is supported on the vehicle body frame 21 (the head pipe 211) at a supporting section A. The first cross member 51 is supported on the vehicle body frame 21 so as to be turnable about a turn axis (the supporting section A, one example of an upper axis). The first cross member 51 is supported on the head pipe 211 so as to be turnable in a plane including the first cross member 51 and the second cross member 52. The first cross member 51 is turnable relative to the steering shaft 60 in the left-right direction. Even when the steering shaft 60 is turned in accordance with the steering of the handle bar 23, the first cross member 51 will not turn relative to the steering shaft 60. The first cross member 51 includes a pair of plate-shaped members 512. The first cross member 51 extends in the vehicle width direction. The head pipe 211 is located between the pair of plate-shaped members 512 in the front-rear direction. The right end of the first cross member 51 is connected to the first side member 53 via a connecting section B. The first cross member 51 is connected to the first side member 53 so as to be turnable about a turn axis B. The left end of the first cross member 51 is connected to the second side member 54 via a connecting section C. The first cross member 51 is disposed so as to be turnable relative to the second side member 52 about a turn axis C. The first cross member 51 is turnable relative to the first side member 53 and the second side member 54 in the plane including the first cross member 51 and the second cross member 52.

The second cross member 52 is supported on the vehicle body frame 21 (the head pipe 211) at a supporting section D. The second cross member 52 is supported on the vehicle body frame 21 so as to be turnable about a turn axis (the supporting section D, one example of a lower axis). The second cross member 52 is supported on the head pipe 211 so as to be turnable in the plane including the first cross member 51 and the second cross member 52. The second cross member 52 is disposed directly below the first cross member 51. The second cross member 52 extends parallel or substantially parallel to the first cross member 51. The first cross member 51 and the second cross member 52 preferably have the same length. The second cross member 52 is turnable relative to the steering shaft 60 in the left-right direction. Even when the steering shaft 60 is turned in accordance with the steering of the handle bar 23, the second cross member 52 will not turn relative to the steering shaft 60. The second cross member 52 includes a pair of plate-shaped members 522. The second cross member 52 extends in the vehicle width direction. The head pipe 211 is located between the pair of plate-shaped members 522 in the front-rear direction. The right end of the second cross member 52 is connected to the first side member 53 via a connecting section E. The second cross member 52 is connected to the first side member 53 so as to be turnable about a turn axis (the connecting section E). The left end of the second cross member 52 is connected to the second side member 54 via a connecting section F. The second cross member 52 is disposed so as to be turnable relative to the second side member 54 about a turn axis (the connecting section F). The second cross member 52 is turnable relative to the first side member 53 and the second side member 54 in the plane including the first cross member 51 and the second cross member 52. In the present preferred embodiment, the first cross member 51 and the second cross member 52 are provided as a pair of plate-shaped members extending in the left-right direction and arranged in the front-rear direction. However, each of the first cross member 51 and the second cross member 52 may include a member extending rightward from the head pipe 211 and a member extending leftward from the head pipe 211.

The first side member 53 is disposed directly to the right of the head pipe 211. The first side member 53 extends in the extending direction of the head pipe 211. The first side member 53 extends in the extending direction of the steering shaft 60. The first side member 53 is disposed directly above the first front wheel 31. The first bracket 335 is disposed so as to be turnable relative to the first side member 53 about the first center axis X (one example of a first axis). The first bracket 335 is turned about the first center axis X of the first side member 53 in accordance with the steering of the handle bar 23. Even when the first bracket 335 is turned, the first side member 53 will not turn relative to the vehicle body frame 21. The first side member 53 is disposed on the right of the first shock absorber 33. The first side member 53 is disposed above the first shock absorber 33.

The second side member 54 is disposed directly to the left of the head pipe 211. The second side member 54 extends in the extending direction of the head pipe 211. The second side member 54 extends in the extending direction of the steering shaft 60. The second side member 54 is disposed directly above the second front wheel 32. The second bracket 327 is disposed so as to be turnable relative to the second side member 54 about the second center axis Y (one example of a second axis). The second bracket 327 is turned about the second center axis Y of the second side member 54 in accordance with the steering of the handle bar 23. Even when the second bracket 327 is turned, the second side member 54 will not turn relative to the vehicle body frame 21. The second side member 54 is disposed to the left of the second shock absorber 35. The second side member 54 is disposed above the second shock absorber 35.

The operation force transmitting mechanism 6 transmits the operation force of the handle bar 23 to the first front wheel 31 and the second front wheel 32 in accordance with the handle bar operation by the driver. A portion of the operation force transmitting mechanism 6 is disposed directly below the second cross member 52. The operation force transmitting mechanism 6 is disposed above the first front wheel 31 and the second front wheel 32.

The deformation suppressing mechanism 75 reduces or prevents the deformation of the link mechanism 5. The deformation suppressing mechanism 75 includes a first connection member 11, a second connection member 12, and a suppressing mechanism 7.

The first connection member 11 is disposed on the first plate 333a. The first connection member 11 is disposed at the first connection point 333c where the first plate 333a intersects the first center axis X. Here, the first connection member 11 may not be disposed at the position strictly aligned with the first connection point 333c. In other words, the first connection member 11 may be disposed at a position slightly deviated from the first connection point 333c. The first connection member 11 is disposed on the upper surface of the first plate 333a. The first connection member 11 extends from the first plate 333a toward the head pipe 211. The first connection member 11 includes a bar-shaped portion. The first connection member 11 is disposed directly below the link mechanism 5.

The second connection member 12 is disposed on the second plate 325a. The second connection member 12 is disposed at the second connection point 325c where the second plate 325a intersects the second center axis Y. Here, the second connection member 12 may not be disposed at the position strictly aligned with the second connection point 325c. In other words, the second connection member 12 may be disposed at a position slightly deviated from the second connection point 325c. The second connection member 12 is disposed on the upper surface of the second plate 325a. The second connection member 12 extends from the second plate 325a toward the head pipe 211. The second connection member 12 includes a bar-shaped portion. The second connection member 12 is disposed directly below the link mechanism 5.

The suppressing mechanism 7 reduces or prevents the movement of the first connection member 11 relative to the head pipe 211. The suppressing mechanism 7 reduces or prevents the movement of the second connection member 12 relative to the head pipe 211. The suppressing mechanism 7 is disposed directly below the link mechanism 5.

Figure 4:
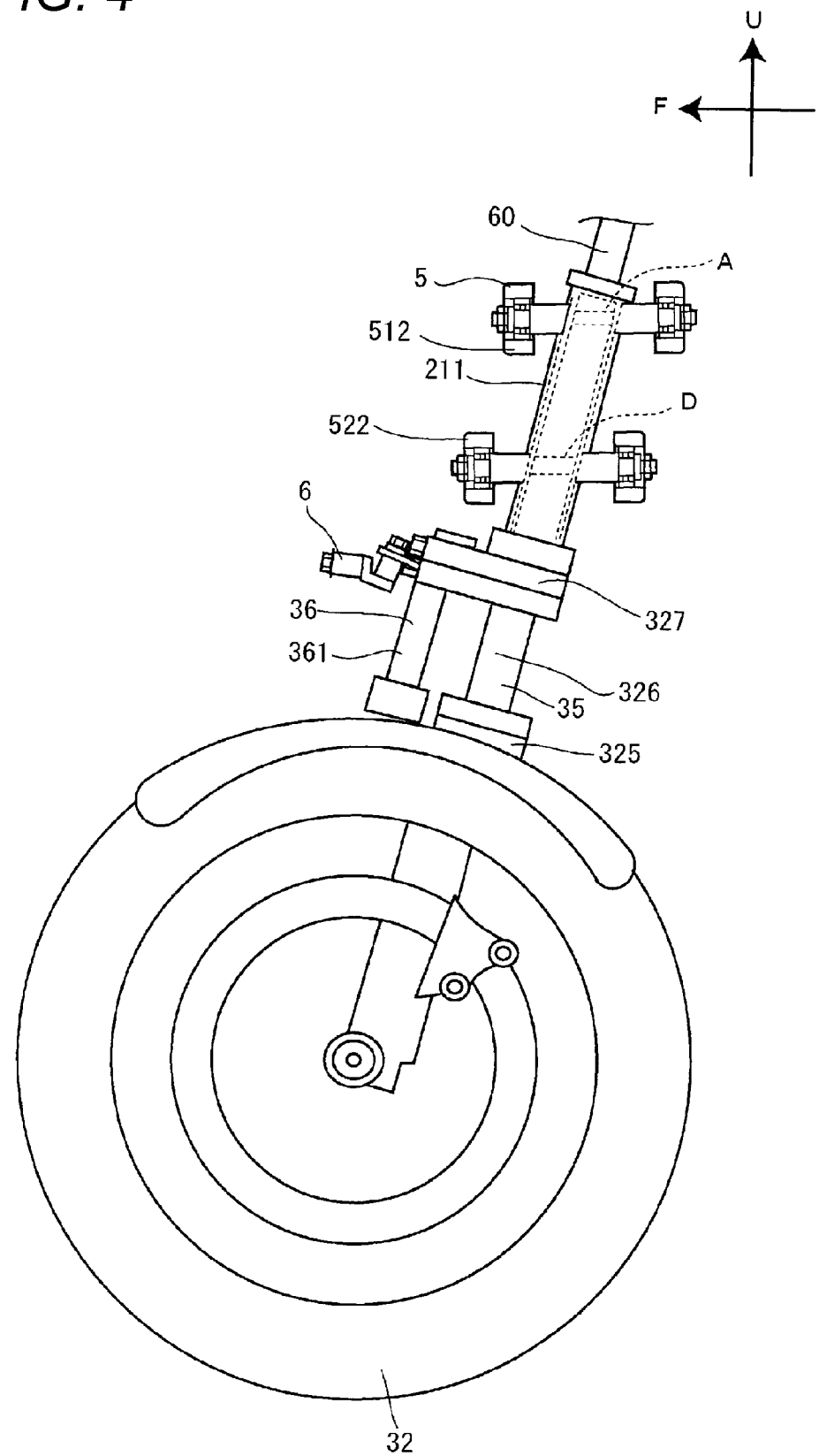
FIG. 4 is a fragmentary side view illustrating the vehicle.

FIG. 4 is a left side view illustrating the area around the periphery of the link mechanism 5 and the second front wheel 32. In FIG. 4, the down frame 212, the handle bar 23 and the like which are located directly behind the link mechanism 5 are not illustrated. The upper portion of the head pipe 211 is located between the pair of plate-shaped members 512 in the front-rear direction. The lower portion of the head pipe 211 is located between the pair of plate-shaped members 522 in the front-rear direction. In the side view, the turn axis (the supporting section A) extends so as to intersect the steering shaft 60. In the side view, the turn axis (the supporting section D) extends so as to intersect the steering shaft 60. In the side view, the upper end of the second shock absorber 35 is disposed below the lower end of the link mechanism 5. Although not illustrated in FIG. 4, in the side view, the upper end of the first shock absorber 33 is disposed below the lower end of the link mechanism 5.

Figure 5:
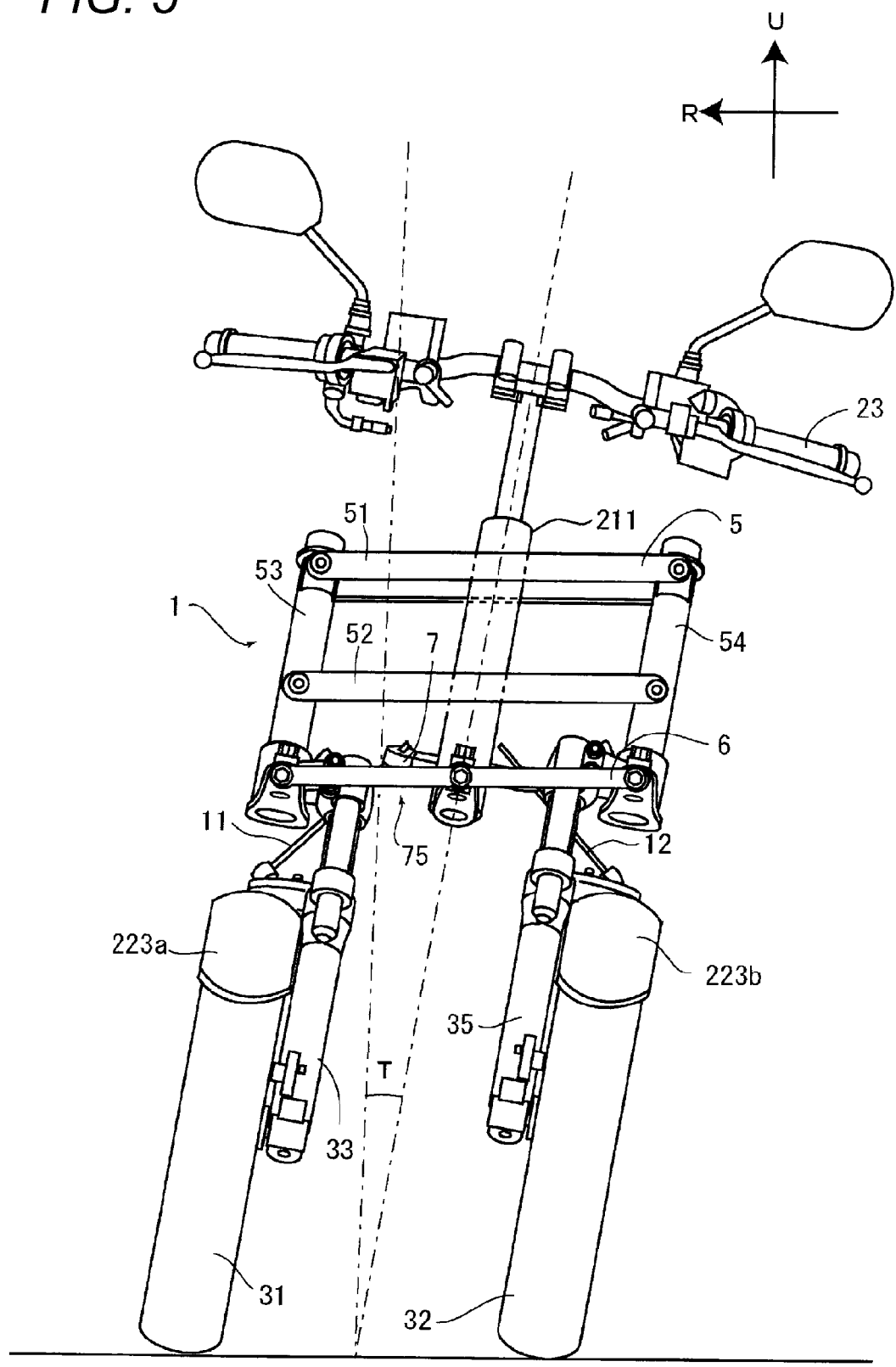
FIG. 5 is an overall front view illustrating a state in which the vehicle is tilted.

FIG. 5 is an overall front view showing a state in which the three-wheel vehicle 1 is tilted leftward by an angle T. When vehicle body of the three-wheel vehicle 1 is tilted in the left-right direction, the link mechanism 5 is deformed. When the driver tilts the vehicle body of the three-wheel vehicle 1 leftward by the angle T, the head pipe 211 is tilted leftward relative to the vertical direction. When the head pipe 211 is tilted, the first cross member 51 and the second cross member 52 are turned relative to the head pipe 211. In accordance with the leftward tilting of the head pipe 211, the left end of the first cross member 51 is moved leftward of the left end of the second cross member 52. Since the first cross member 51 is moved leftward of the second cross member 52, the second side member 54 is tilted. Incidentally, the second side member 54 extends parallel or substantially parallel to the head pipe 211. Like the second side member 54, the first side member 53 is tilted relative to the vertical direction. The first side member 53 extends parallel or substantially parallel to the head pipe 211. When the first side member 53 and the second side member 54 are tilted, the first side member 53 is turned relative to the first cross member 51 and the second cross member 52. When the first side member 53 and the second side member 54 are tilted, the second side member 54 is turned relative to the first cross member 51 and the second cross member 52.

When the three-wheel vehicle 1 is tilted in this manner, the first front wheel 31 and the second front wheel 32 are respectively tilted relative to the vertical direction as viewed from front of the vehicle. When the vehicle is tilted, each of the first front wheel 31 and the second front wheel 32 maintains a posture that extends parallel or substantially parallel to the head pipe 211.

Figure 6:
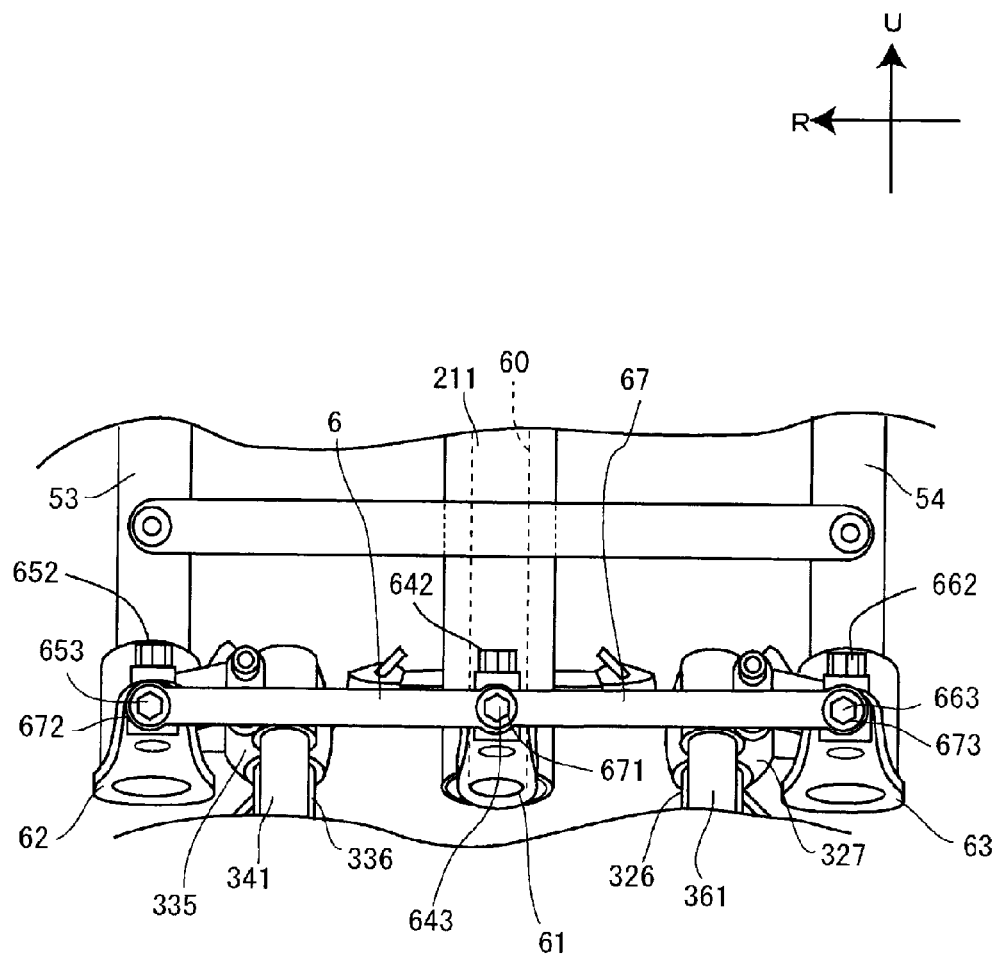
FIG. 6 is an enlarged fragmentary front view illustrating an operation force transmitting mechanism.

FIG. 6 is an enlarged fragmentary front view showing the operation force transmitting mechanism 6. The operation force transmitting mechanism 6 includes the steering shaft 60, a first transmission plate 61, a second transmission plate 62, a third transmission plate 63, a first transmission member 67, the first bracket 335, and the second bracket 327.

The first transmission plate 61 is connected to the steering shaft 60. The first transmission plate 61 is not turnable relative to the steering shaft 60. When the handle bar 23 is steered relative to the head pipe 211, the steering shaft 60 is turned relative to the head pipe 211. In accordance with the turning of the steering shaft 60, the first transmission plate 61 is turned.

The second transmission plate 62 is connected to the first side member 53. The second transmission plate 62 is connected to the first side member 53 and turnable relative to the first side member 53. The second transmission plate 62 is fixed to the first bracket 335. The second transmission plate 62 is located directly below the first bracket 335.

The third transmission plate 63 is connected to the second side member 54. The third transmission plate 63 is connected to the second side member 54 and turnable relative to the second side member 54. In the front view, the third transmission plate 63 is disposed symmetrically with the second transmission plate 62 relative to the first transmission plate 61. The third transmission plate 63 is fixed to the second bracket 327. The third transmission plate 63 is located directly below the second bracket 327.

The first transmission member 67 transmits the operation force transmitted from the steering shaft 60 to the first bracket 335 and the second bracket 327. The first transmission member 67 extends in the vehicle width direction. A detailed configuration of transmitting the operation force from the steering shaft 60 to the first bracket 335 and the second bracket 327 will be described below.

Figure 7:
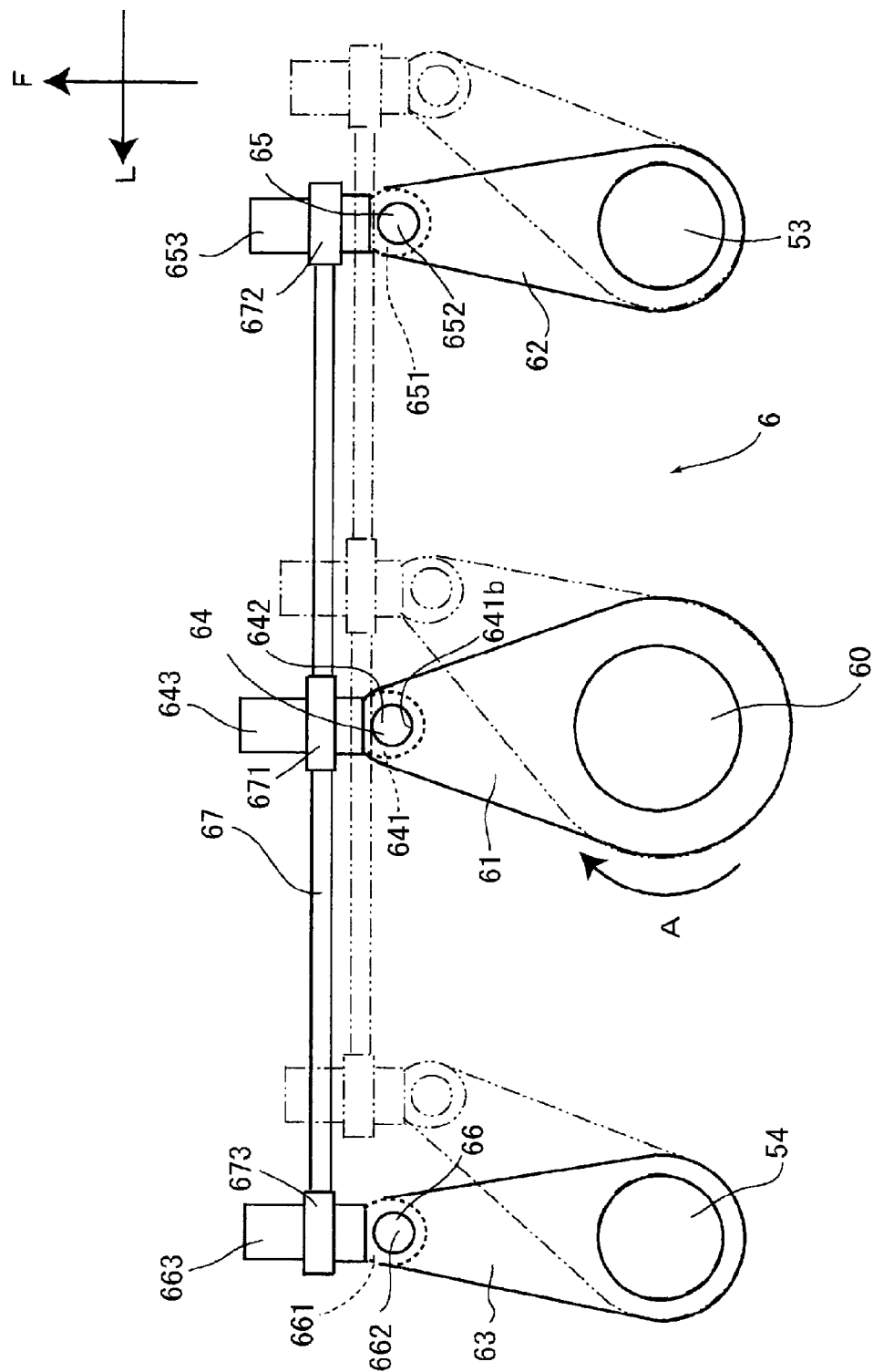
FIG. 7 is a schematic configuration view illustrating a portion of the operation force transmitting mechanism.

FIG. 7 is a schematic plan view showing the configuration of the operation force transmitting mechanism 6. In FIG. 7, the operation force transmitting mechanism 6 is viewed from above. Here, the configurations of the link mechanism 5, the brackets and the like are not illustrated. The dashed chain lines in FIG. 7 indicate a state in which the steering shaft 60 is turned in the direction of an arrow A.

The operation force transmitting mechanism 6 includes the first transmission plate 61, the second transmission plate 62, the third transmission plate 63, a first joint 64, a second joint 65, a third joint 66, and the first transmission member 67.

The front portion of the first transmission plate 61 is narrower than the rear portion of the first transmission plate 61. The first joint 64 is disposed at the front portion of the first transmission plate 61.

The width of the front portion of the second transmission plate 62 is narrower than the width of the rear portion of the second transmission plate 62. The second joint 65 is disposed at the front portion of the second transmission plate 62. The second transmission plate 62 is disposed directly to the right of the first transmission plate 61.

The width of the front portion of the third transmission plate 63 is narrower than the width of the rear portion of the third transmission plate 63. The third joint 66 is disposed at the front portion of the third transmission plate 63. The third transmission plate 63 is disposed directly on the left of the first transmission plate 61.

The first joint 64 includes a first bearing 641, a first shaft 642, and a first front rod 643. The first shaft 642 is turnable relative to the first bearing 641. The first bearing 641 supports the first shaft 642. The first bearing 641 is supported on the first transmission plate 61. The first transmission plate 61 includes a first support hole 641b to support the first shaft 642. The first shaft 642 is inserted into the first support hole 641b. The first bearing 641 is fixed to the first shaft 642. The first shaft 642 is disposed at the front end of the first transmission plate 61.

The first front rod 643 extends frontward from the first bearing 641. The first front rod 643 is turnable in the left-right direction about the center of the first shaft 642 when the first bearing 641 is turned relative to the first transmission plate 61. The first front rod 643 is fixed to the first bearing 641.

The second joint 65 includes a second bearing 651, a second shaft 652, and a second front rod 653. The second bearing 651 preferably has a configuration similar to that of the first bearing 641. The second shaft 652 preferably has a configuration similar to that of the first shaft 642. The second front rod 653 preferably has a configuration similar to that of the first front rod 643.

The third joint 66 includes a third bearing 661, a third shaft 662, and a third front rod 663. The third bearing 661 preferably has a configuration similar to that of the first bearing 641. The third shaft 662 preferably has a configuration similar to that of the first shaft 642. The third front rod 663 preferably has a configuration similar to that of the first front rod 643.

The first transmission member 67 includes a first ring 671, a second ring 672, and a third ring 673. The first front rod 643 is inserted into the first ring 671. The first ring 671 is provided at the center in the left-right direction of the first transmission member 67. The second ring 672 is disposed directly to the right of the first ring 671. The second front rod 653 is inserted into the second ring 672. The third ring 673 is disposed directly to the left of the first ring 671. The third front rod 663 is inserted into the third ring 673.

Figure 8:
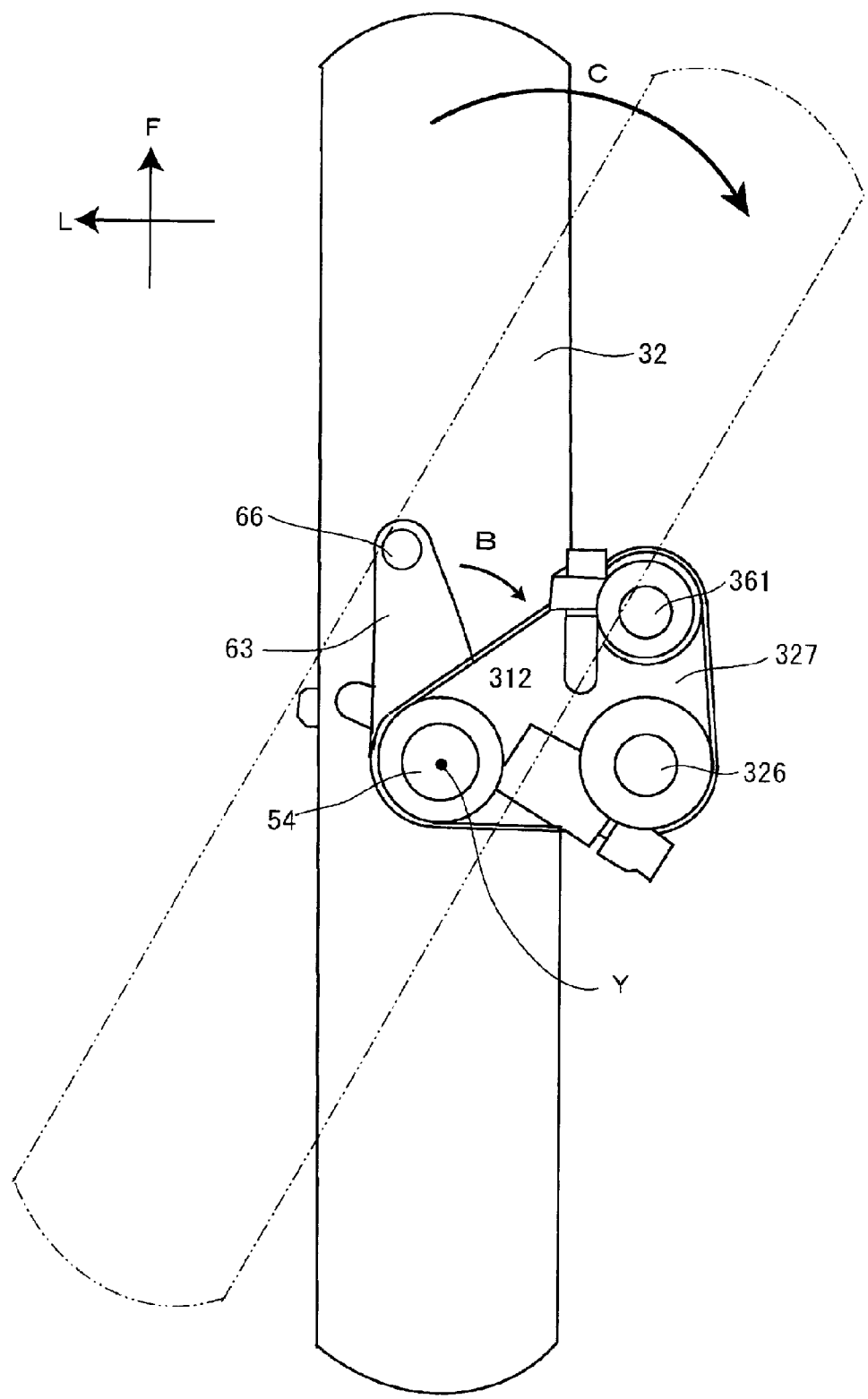
FIG. 8 is an enlarged fragmentary plan view illustrating a second bracket and a front wheel.

FIG. 8 is a plan view showing the second front wheel 32 and the second bracket 327. The dashed chain lines in FIG. 8 indicate a state in which the second front wheel 32 is steered. The second front fender 223b is not illustrated.

The second side member 54 supports the second bracket 327 as described above. The third transmission plate 63 is disposed on the second bracket 327.

When the steering shaft 60 is turned, the first transmission plate 61 is turned in accordance with the turning of the steering shaft 60. For example, when the steering shaft 60 is turned in the direction of the arrow A in FIG. 7, the first ball joint 64 is moved right and rearward in accordance with the turning of the first transmission plate 61. Incidentally, the first ball 642 is turned relative to the first bearing 641 such that the first transmission member 67 is moved right and rearward while the posture of the first transmission member 67 is maintained. In accordance with the rightward movement of the first transmission member 67, the second front rod 653 and the third front rod 663 are moved right and rearward. When the second front rod 653 and the third front rod 663 are moved right and rearward, the second bearing 651 and the third bearing 661 are moved right and rearward. In accordance with the right and rearward movement of the second bearing 651 and the third bearing 661, the second transmission plate 62 and the third transmission plate 63 are turned in the direction of the arrow A about the centers of the first side member 53 and the second side member 54, respectively. Accordingly, the state indicated in the dashed chain lines in FIG. 7 is obtained.

When the third transmission plate 63 is turned about the center of the third side member 54, the second bracket 327 is turned in the direction of the arrow B in FIG. 8 via a third transmission member 69. When the second bracket 327 is turned in the direction of the arrow B, the second front wheel 32 is steered in the direction of the arrow C in FIG. 8 via the second shock absorber 35. The front wheel 32 is steered about the second center axis Y. Accordingly, the front wheel 32 is set to the state indicated in the dashed chain lines in FIG. 8. Like the second front wheel 32, the first front wheel 31 is steered about the first center axis X. The first front wheel 31 and the second front wheel 32 are steered as described above by operating the handle bar 23.

Figure 9:
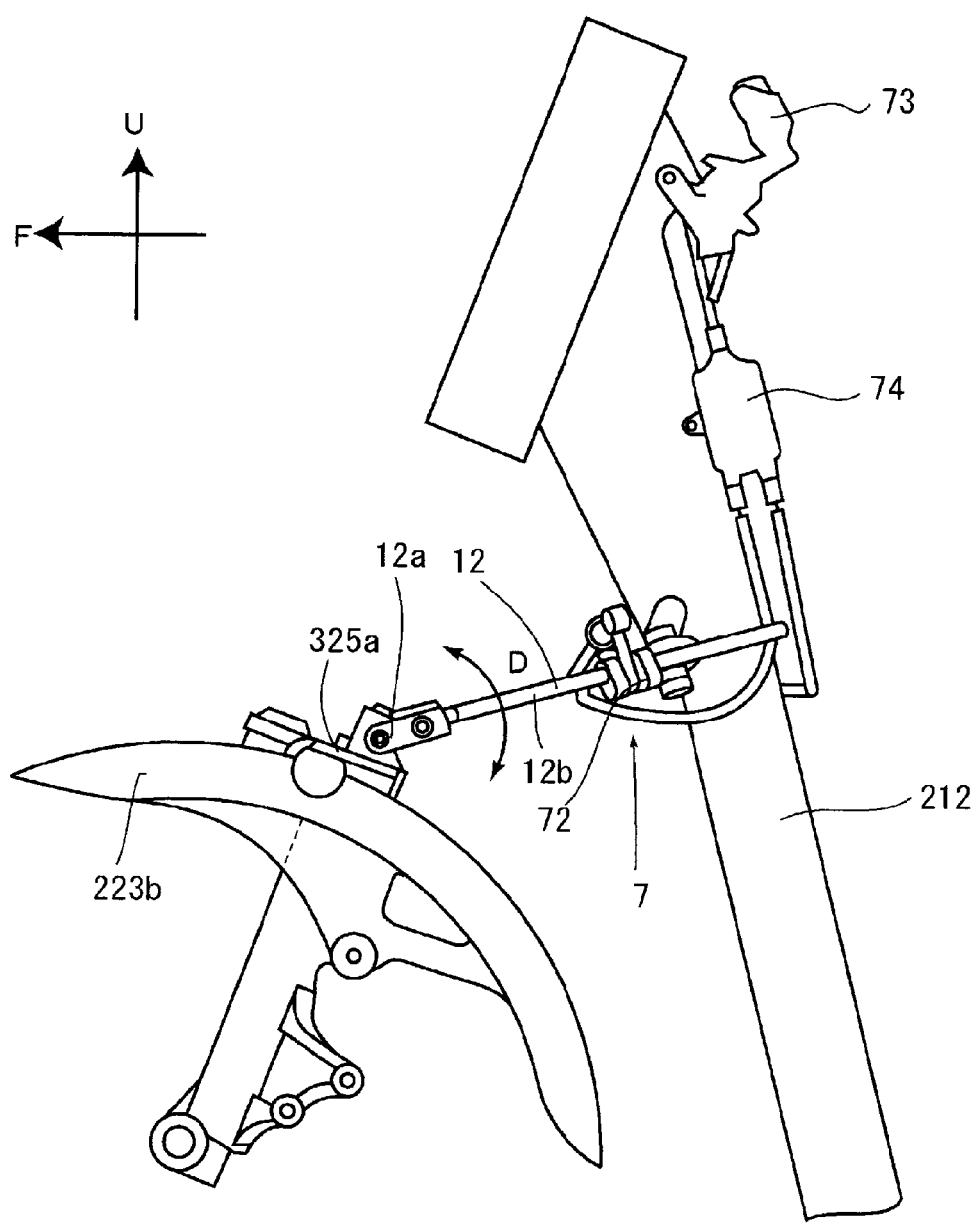
FIG. 9 is a fragmentary side view illustrating the area around the periphery of a suppressing mechanism.

FIG. 9 is a left side view showing a portion of the suppressing mechanism 7 as viewed outward in the vehicle width direction. The suppressing mechanism 7 includes the first connection member 11, the second connection member 12, a lever 73, a connection mechanism 74, and calipers 72. The calipers 72 are respectively disposed on the left and right of the head pipe 211. Here, FIG. 9 illustrates only the left caliper 72. Since the first connection member 11 preferably has the same configuration as that of the second connection member 12, the description for the same will be omitted. FIG. 9 illustrates only the left second connection member 12.

The second connection member 12 includes a turn supporting section 12a and a pole 12b. The turn supporting section 12a supports one end of the pole 12b. The turn supporting section 12a supports the pole 12b so that the pole 12b is turnable about a turn axis extending in the vehicle width direction. The turn supporting section 12a supports the pole 12b so that the pole 12b is turnable in the direction of an arrow D. The pole 12b extends upward and rearward from the second plate 325a. The rear end of the pole 12b is a free end.

The lever 73 is used to operate the caliper 72. The lever 73 is connected to the connection mechanism 74. The lever 73 is disposed on the vehicle body cover 22.

The connection mechanism 74 connects the lever 73 to the caliper 72. When the lever 73 is operated, the connection mechanism 74 transmits the operation force of the lever 73 to the caliper 72.

The caliper 72 reduces or prevents the movement of the second connection member 12. When the lever 73 is operated, the operation force is transmitted via the connection mechanism 74, and the caliper 72 reduces or prevents the movement of the second connection member 12 relative to the head pipe 211.

Figure 10:
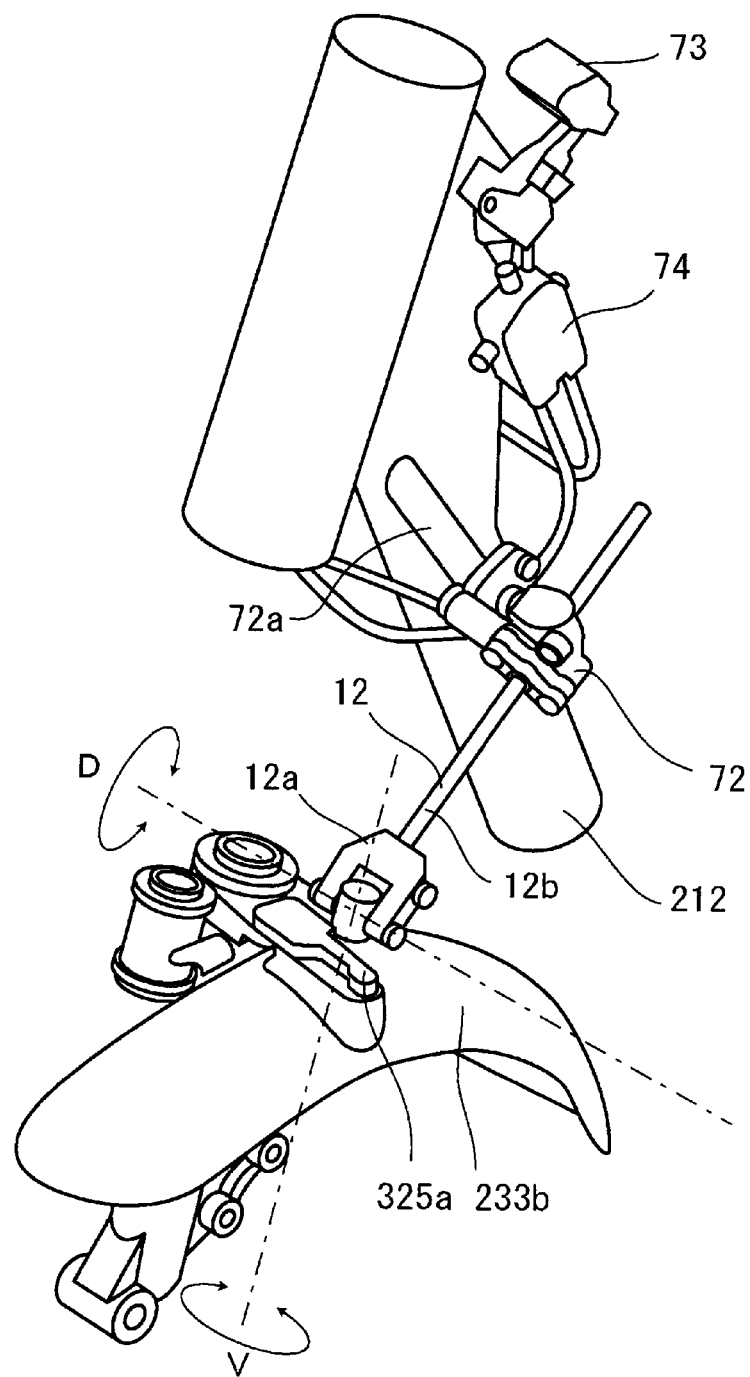
FIG. 10 is a fragmentary perspective view illustrating a portion of the suppressing mechanism.

FIG. 10 is a fragmentary perspective view showing a portion of the suppressing mechanism 7. The turn supporting section 12a supports the pole 12b so that the pole 12b is turnable not only in the direction of the arrow D but also in the direction of an arrow V. The arrow V indicates the direction of turning about the turn axis extending in the vertical direction. The caliper 72 is disposed outward of the down frame 212 in the vehicle width direction. The caliper 72 is connected to a support member 72a that is connected to the vehicle body frame 21. The support member 72a extends outward in the vehicle width direction from the vehicle body frame 21. The lever 73 is disposed directly behind the down frame 212.

In a state that the lever 73 is not operated, the calipers 72 do not reduce or prevent the movement of the first connection member 11 and the second connection member 12 relative to the head pipe 211. When traveling straight, the driver drives the three-wheel vehicle 1 in the state illustrated in FIG. 2. When turning, the driver steers the handle bar 23 of the three-wheel vehicle 1 in the traveling direction and tilts the three-wheel vehicle 1 as illustrated in FIG. 5. In the three-wheel vehicle 1, the steering of the handle bar 23 is transmitted to the first front wheel 31 and the second front wheel 32 via the steering shaft 60, the first transmission plate 61, the second transmission plate 62, and the third transmission plate 63. Accordingly, the advancing directions of the first front wheel 31 and the second front wheel 32 are changed.

When the three-wheel vehicle 1 is made to self-stand, for example, when the three-wheel vehicle 1 is parked, the driver operates the lever 73. When the lever 73 is operated, the calipers 72 reduce or prevent the movements of the first connection member 11 and the second connection member 12 relative to the head pipe 211. In this state, the movements of the first front wheel 31 and the second front wheel 32 relative to the head pipe 211 are reduced or prevented. Hence, the deformation of the link mechanism 5 is reduced or prevented. Since the deformation of the link mechanism 5 is reduced or prevented, the three-wheel vehicle 1 is reduced or prevented from being tilted further from the current state and is made to self-stand.

Some of the unique characteristics of the first preferred embodiment will be described below.

According to the first preferred embodiment, the three-wheel vehicle 1 is made to self-stand by the operation of the lever 73 such that the three-wheel vehicle 1 is easily parked. According to the first preferred embodiment, when the three-wheel vehicle 1 is stopped, the relative movement between the first front wheel 31 and the second front wheel 32 is reduced or prevented such that the driver is able to stop the three-wheel vehicle 1 without letting his/her feet touch the ground.

According to the first preferred embodiment, the movements of the first front wheel 31 and the second front wheel 32 relative to the head pipe 211 are reduced or prevented in a state that the height position of the first front wheel 31 is different from the height position of the second front wheel 32 such that the three-wheel vehicle 1 is capable of being parked in a tilted state or in a state that one of the front wheels 3 rides on a step.

In the three-wheel vehicle 1 according to the first preferred embodiment, a portion of the deformation suppressing mechanism 75 is disposed directly below the link mechanism 5. Specifically, in the three-wheel vehicle 1, the first connection member 11, the second connection member 12, and the suppressing mechanism 7 are positioned directly below the link mechanism 5. Hence, the center of gravity of the three-wheel vehicle 1 is lower than that in a configuration in which the deformation suppressing mechanism 75 is entirely disposed above the link mechanism 5. For this reason, the three-wheel vehicle 1 is less likely to become unstable.

In the three-wheel vehicle 1, the first connection member 11 is disposed at the first connection point 333c. In the three-wheel vehicle 1, the second connection member 12 is disposed at the second connection point 325c. Hence, even if the first front wheel 31 steers about the first center axis X and the second front wheel 32 steers about the second center axis Y, the positions of the first connection point 333c and the second connection point 325c relative to the head pipe 211 are unchanged. Therefore, the steering of the first front wheel 31 and the second front wheel 32 are not hindered by the first connection member 11 and the second connection member 12.

As described the above, the first cross member 51 and the second cross member 52 defining turnable members of the link mechanism 5 are disposed above the first front wheel 31 and the second front wheel 32 such that the front portion of the three-wheel vehicle 1 is reduced or prevented from being enlarged in order to provide the mechanism to interlock the first front wheel 31 and the second front wheel 32. Furthermore, at least in the fully tilted state wherein the link mechanism 5 is fully tilted, the first transmission member 67 is disposed at a position in which at least a portion thereof overlaps with at least one of the first shock-absorber supporting section of the first bracket 335 and the first shock absorber 33 or at a position in which at least a portion thereof overlaps with at least one of the second shock-absorber supporting section of the second bracket 327 and the second shock absorber 34 as viewed from the front of the vehicle. Hence, the long extension/contraction lengths of the first shock absorber 33 and the second shock absorber 34 are secured easily without enlarging the vehicle in the up-down direction. Accordingly, impact forces applied to the first front wheel 31 and the second front wheel 32 during the traveling of the three-wheel vehicle 1 are absorbed easily and smoothly such that the riding comfort of the three-wheel vehicle 1 is improved. As described above, the enlargement of the front portion of the three-wheel vehicle 1 is reduced or prevented while the degeneration of the riding comfort of the three-wheel vehicle 1 is reduced or prevented.

In the above-described preferred embodiment, in the no-load state of the three-wheel vehicle 1, the first transmission member 67 is disposed at a position in which portions thereof overlap with the first shock-absorber supporting section of the first bracket 335 and the second shock-absorber supporting section of the second bracket 327 as viewed from the front of the vehicle. Hence, also in the upright state of the vehicle, the first transmission member 67 avoids interference with the first shock-absorber supporting section of the first bracket 335 by using the space in the front-rear direction such that the first shock-absorber supporting section of the first bracket 335 is easily disposed in an upper area in comparison with the conventional configuration. Similarly, the second shock-absorber supporting section of the second bracket 327 is easily disposed in an upper area. Hence, the long extension/contraction lengths of the first shock absorber 33 and the second shock absorber 34 are easily secured. Accordingly, impact forces applied to the first front wheel 31 and the second front wheel 32 during the traveling of the three-wheel vehicle 1 are absorbed easily and smoothly such that the riding comfort of the three-wheel vehicle 1 is improved.

In the above-described preferred embodiment, in the no-load state of the three-wheel vehicle 1, the supporting section of the first side member overlaps with the first shock-absorber supporting section as viewed from the direction orthogonal or substantially orthogonal to the extending direction of the first side member 53, and the supporting section of the second side member overlaps with the second shock-absorber supporting section as viewed from the direction orthogonal or substantially orthogonal to the extending direction of the second side member 54. Hence, the shapes of the upper and lower surfaces of the first bracket 335 and the second bracket 327 are simple flat surfaces. For this reason, the first bracket 335 and the second bracket 327 is downsized in comparison with the conventional configuration in which the brackets include slanted portions. Therefore, the enlargement of the vehicle body cover 22 is reduced or prevented such that the enlargement of the front portion of the three-wheel vehicle 1 is reduced or prevented. Furthermore, in the above-described preferred embodiment, in comparison with the conventional configuration in which the brackets include slanted portions, the brackets have a simple shape based on flat surfaces that are easily produced such that the production costs of the first bracket 335 and the second bracket 327 are reduced.

Second Preferred Embodiment

A vehicle according to a second preferred embodiment of the present invention will be described below referring to the accompanying FIGS. 11 to 19.

In the second preferred embodiment, as one example of a vehicle, a three-wheel vehicle (hereafter referred to as a vehicle) including two front wheels and one rear wheel, will be exemplified.

Figure 11:
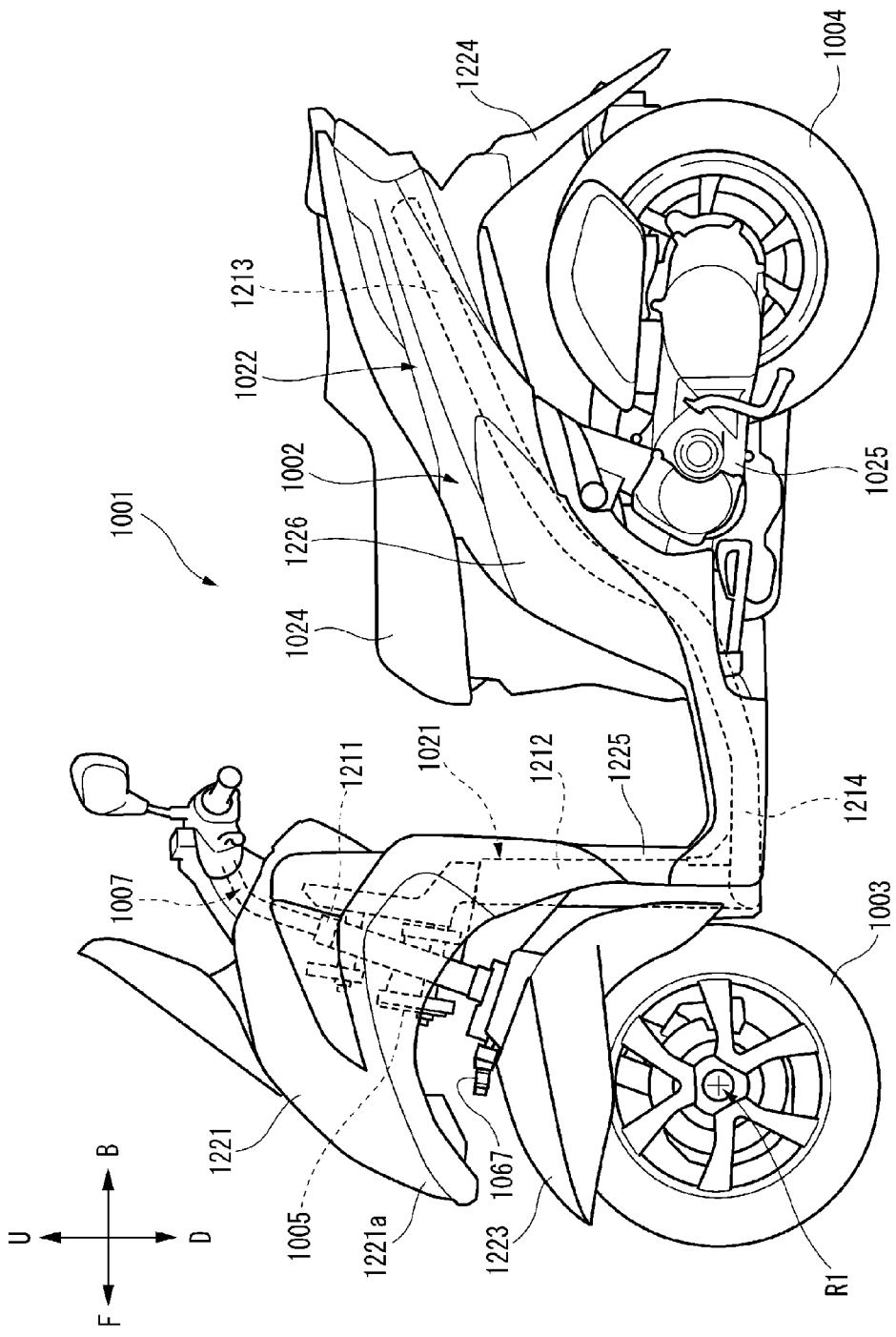
FIG. 11 is an overall side view illustrating a vehicle according to a second preferred embodiment of the present invention.

FIG. 11 is an overall side view showing the vehicle as viewed from the left side of the vehicle. In the following descriptions, an arrow F in the drawings indicates the forward direction of the vehicle and an arrow B indicates the rearward direction of the vehicle. An arrow U indicates the upward direction of the vehicle and an arrow D indicates the downward direction of the vehicle. When the front-rear direction and the left-right direction are indicated in the descriptions, the directions denote the front-rear direction and the left-right direction as viewed from the driver on the vehicle. The center in the vehicle width direction denotes the center position of the vehicle in the vehicle width direction. Sideward in the vehicle width direction denotes a leftward direction or a rightward direction from the center of the vehicle in the vehicle width direction. In addition, the no-load state of the vehicle denotes a state that no driver is on the vehicle, that no fuel is loaded with the vehicle, and that the front wheels are in an upright state without being steered or tilted. The axis extending in the front-rear direction is preferably an axis inclined in the range of about ±45 degrees relative to the front-rear direction, for example. Similarly, the axis extending in the up-down direction is an axis inclined preferably in the range of about ±45 degrees relative to the up-down direction, for example. The axis extending in the left-right direction preferably is an axis inclined in the range of about ±45 degrees relative to the left-right direction, for example.

As illustrated in FIG. 11, a vehicle 1001 includes a vehicle body section 1002, a pair of left and right front wheels 1003 (see FIG. 12), a rear wheel 1004, a steering mechanism 1007, and a link mechanism 1005. The vehicle body section 1002 includes a vehicle body frame 1021, a vehicle body cover 1022, a seat 1024, and a power unit 1025.

The vehicle body frame 1021 includes a head pipe 1211, a down frame 1212, an under frame 1214, and a rear frame 1213. In FIG. 11, a portion of the vehicle body frame 1021 covered with the vehicle body cover 1022 is indicated in dashed lines. The vehicle body frame 1021 supports the power unit 1025, the seat 1024 and the like. The power unit 1025 includes a drive source, such as an engine or an electric motor, a transmission and the like.

The head pipe 1211 is disposed in the front portion of the vehicle 1001. The head pipe 1211 is disposed so as to be inclined by a predetermined angle relative to the vertical direction so that its upper portion is positioned behind its lower portion in a side view of the vehicle. The steering mechanism 1007 and the link mechanism 1005 are disposed around the periphery of the head pipe 1211. The steering shaft 1060 of the steering mechanism 1007 is turnably inserted into the head pipe 1211 (see FIG. 22). The head pipe 1211 supports the link mechanism 1005.

The down frame 1212 is connected to the head pipe 1211. The down frame 1212 is disposed behind the head pipe 1211 and extends in the up-down direction. The under frame 1214 is connected to the lower portion of the down frame 1212. The under frame 1214 extends rearward from the lower portion of the down frame 1212. The rear frame 1213 is located behind the under frame 1214 so as to extend rearward and upward. The rear frame 1213 supports the seat 1024, the power unit 1025, a tail lamp and the like.

The vehicle body frame 1021 is covered with the vehicle body cover 1022. The vehicle body cover 1022 includes a front cover 1221, a pair of left and right front fenders 1223, a leg shield 1225, a center cover 1226, and a rear fender 1224.

The front cover 1221 is positioned directly ahead of the seat 1024. The front cover 1221 covers at least portions of the steering mechanism 1007 and the link mechanism 1005. The front cover 1221 includes a front portion 1221a disposed ahead of the link mechanism 1005. The front portion 1221a of the front cover 1221 is provided above the front wheels 1003 in a side view of the vehicle 1001 in its no-load state. The front portion 1221a of the front cover 1221 is disposed behind the front ends of the front wheels 1003 in a side view of the vehicle 1001 in the no-load state. The front cover 1221 is configured so that the distance between the head pipe 1211 and the front cover 1221 in the front-rear direction of the vehicle gradually increases downward or is constant in a side view of the vehicle. Furthermore, the front cover 1221 is configured so that the center portion of the front cover 1221 in the left-right direction protrudes frontward in the front-rear direction of the vehicle than the left and right portions thereof in a plan view of the vehicle (see FIG. 22). The left and right end portions of the front cover 1221 are configured so as to extend from the front portion 1221a outwards of the left and right end portions of a first cross member 1051 in a plan view of the vehicle (see FIG. 22). In this manner, the front cover 1221 preferably has a shape tapered frontward in the front-rear direction of the vehicle. The leg shield 1225 is disposed directly below the front cover 1221 and directly ahead of the seat 1024. The center cover 1226 is disposed so as to cover the periphery of the rear frame 1213.

The pair of left and right front fenders 1223 (see FIG. 12) is disposed directly below the front cover 1221 and directly above the pair of left and right front wheels 1003, respectively. The rear fender 1224 is disposed directly above a rear portion of the rear wheel 1004.

The pair of left and right front wheels 1003 is disposed directly below the head pipe 1211 and directly below the front cover 1221 in the no-load state. The rear wheel 1004 is disposed directly below the center cover 1226 and the rear fender 1224.

Figure 12:
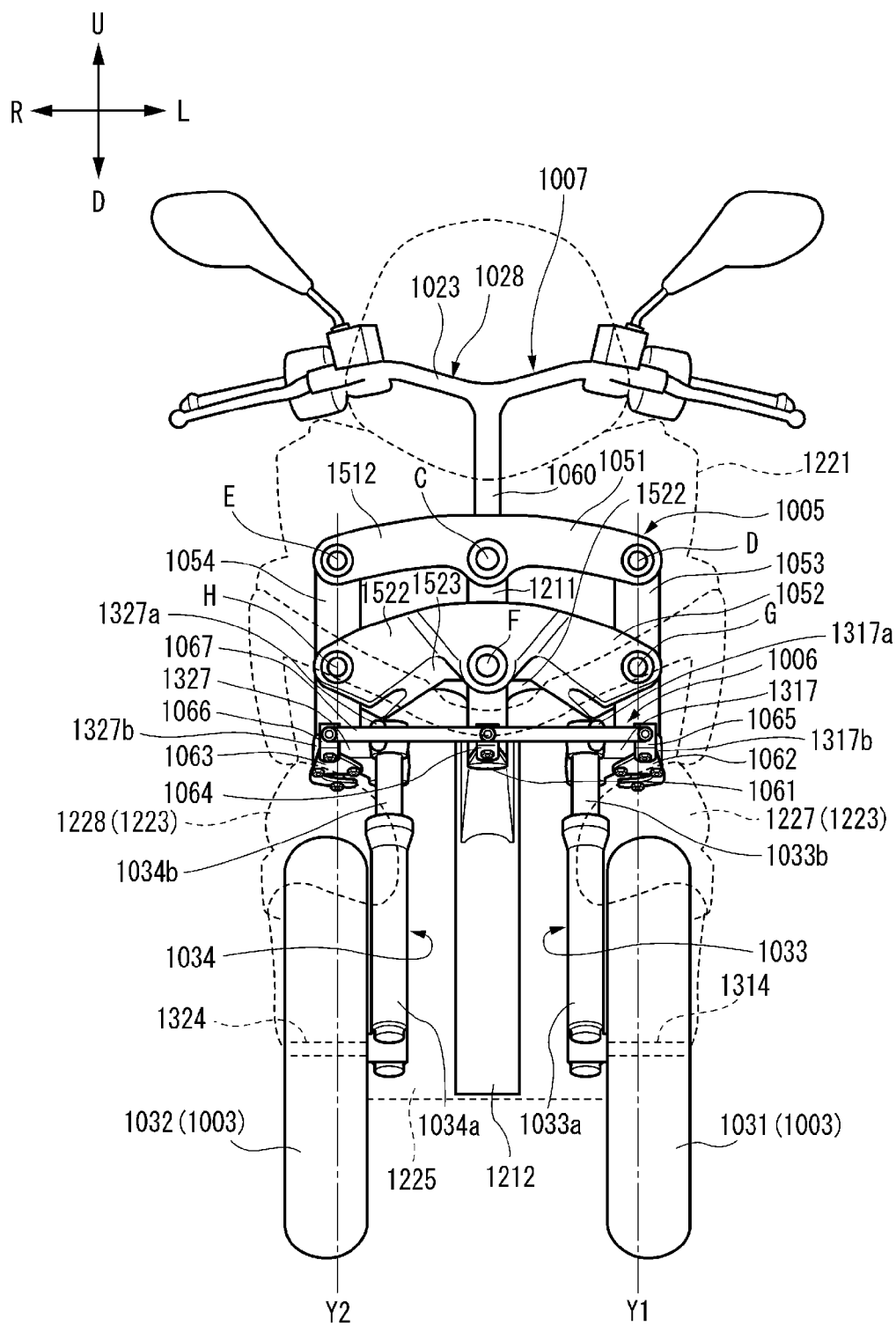
FIG. 12 is a front view illustrating a front portion of the vehicle of FIG. 11.

FIG. 12 is a front view showing the front portion of the vehicle 1001 of FIG. 11 as viewed from the front. FIG. 22 is a plan view showing the front portion of the vehicle 1001 of FIG. 11 as viewed from above. FIG. 12 and FIG. 22 show the vehicle observed through the vehicle body cover 1022.

As illustrated in FIGS. 12 and 22, the steering mechanism 1007 includes a steering force transmitting mechanism 1006, a first shock absorber 1033, a second shock absorber 1034, and the pair of left and right front wheels 1003.

The pair of left and right front wheels 1003 includes a first front wheel 1031 and a second front wheel 1032. The first front wheel 1031 is disposed to the left of the center in the vehicle width direction. The second front wheel 1032 is disposed to the right of the center in the vehicle width direction. The first front wheel 1031 and the second front wheel 1032 are disposed symmetrically with each other relative to the center in the vehicle width direction. Furthermore, the first front fender 1227 of the pair of left and right front fenders 1223 is disposed directly above the first front wheel 1031. The second front fender 1228 of the pair of left and right front fenders 1223 is disposed directly above the second front wheel 1032. The first front wheel 1031 is supported by the first shock absorber 1033. The second front wheel 1032 is supported by the second shock absorber 1034.

The lower portion of a first shock absorbing device supports the first front wheel 1031. In accordance with the steering operation of a handle bar 1023, the first shock absorbing device is turnable about a first center axis Y1 together with the first front wheel 1031. The first shock absorbing device includes the first shock absorber 1033 and a first bracket 1317.

The first shock absorber 1033 preferably is a so-called telescopic shock absorber, for example, and dampens vibrations from the road surface. The first shock absorber 1033 includes a first lower section 1033a and a first upper section 1033b. The first front wheel 1031 is supported on the first lower section 1033a. The first lower section 1033a extends in the up-down direction and a first axle 1314 is supported at its lower portion. The first axle 1314 supports the first front wheel 1031. The first upper section 1033b is disposed directly above the first lower section 1033a while a portion thereof is inserted into the first lower section 1033a. The first upper section 1033b is movable relative to the first lower section 1033a in the extending direction of the first lower section 1033a. The upper portion of the first upper section 1033b is fixed to the first bracket 1317. The first bracket 1317 includes a first shock-absorber supporting section 1317a protruding toward the center of the vehicle 1001 and a first side-member supporting section 1317b positioned farther outward of the vehicle 1001 than the first shock-absorber supporting section 1317a. The first upper section 1033b of the first shock absorber 1033 is fixed to and supported by the first shock-absorber supporting section 1317a of the first bracket 1317. A first side member 1053 described below includes a first side turn shaft 1053a disposed inside the first side member 1053 and turnable relative to the first side member 1053 (see FIG. 14). The lower portion of the first side turn shaft 1053a is connected to the first side-member supporting section 1317b of the first bracket 1317. In the first bracket 1317, the first shock-absorber supporting section 1317a is positioned on an imaginary plane passing through the first shock-absorber supporting section 1317b and orthogonal or substantially orthogonal to the extending direction of the first side member 1053.

The first lower section 1033a and the first upper section 1033b are connected to define two telescopic elements arranged in the front-rear direction and extending parallel or substantially parallel to each other. Hence, the first upper section 1033b is prevented from turning relative to the first lower section 1033a.

The lower portion of a second shock absorbing device supports the second front wheel 1032. In accordance with the steering operation of the handle bar 1023, the second shock absorbing device is turnable about a second center axis Y2 together with the second front wheel 1032. The second shock absorbing device includes the second shock absorber 1034 and a second bracket 1327. The second shock absorber 1034 preferably is a so-called telescopic shock absorber, for example, and dampens vibrations from the road surface. The second shock absorber 1034 includes a second lower section 1034a and a second upper section 1034b. The second front wheel 1032 is supported on the second lower section 1034a. The second lower section 1034a extends in the up-down direction and a second axle 1324 is supported at its lower portion. The second axle 1324 supports the second front wheel 1032. The second upper section 1034b is disposed directly above the second lower section 1034a while a portion thereof is inserted into the second lower section 1034a. The second upper section 1034b is movable relative to the second lower section 1034a in the extending direction of the second lower section 1034a. The upper portion of the second upper section 1034b is fixed to the second bracket 1327. The second bracket 1327 includes a second shock-absorber supporting section 1327a protruding toward the center of the vehicle 1001 and a second side-member supporting section 1327b positioned farther outward of the vehicle 1001 than the second shock-absorber supporting section 1327a. The second upper section 1034b of the second shock absorber 1034 is fixed to and supported by the second shock-absorber supporting section 1327a of the second bracket 1327. A second side member 1054 described below includes a second side turn shaft 1054a disposed inside the second side member 1054 and turnable relative to the second side member 1054 (see FIG. 14). The lower portion of the second side turn shaft 1054a is connected to the second side-member supporting section 1327b of the second bracket 1327. In the second bracket 1327, the second shock-absorber supporting section 1327a is positioned on an imaginary plane passing through the second side-member supporting section 1327b and orthogonal or substantially orthogonal to the extending direction of the second side member 1054.

The second lower section 1034a and the second upper section 1034b is connected to define two telescopic elements extending parallel or substantially parallel to each other and arranged in the front-rear direction. Hence, the second upper section 1034b is reduced or prevented from turning relative to the second lower section 1034a.

The steering force transmitting mechanism 1006 is disposed above the first front wheel 1031 and the second front wheel 1032. The steering force transmitting mechanism 1006 includes a steering member 1028 defining a member to which the steering force of the driver is input. The steering member 1028 includes the steering shaft 1060 and the handle bar 1023 connected to the upper portion of the steering shaft 1060. The steering shaft 1060 is disposed so that a portion thereof is inserted into the head pipe 1211 and extends in the up-down direction, thus being turnable about a steering axis relative to the head pipe 1211. The steering shaft 1060 is turned in accordance with the operation of the handle bar 1023 by the driver.

Figure 14:
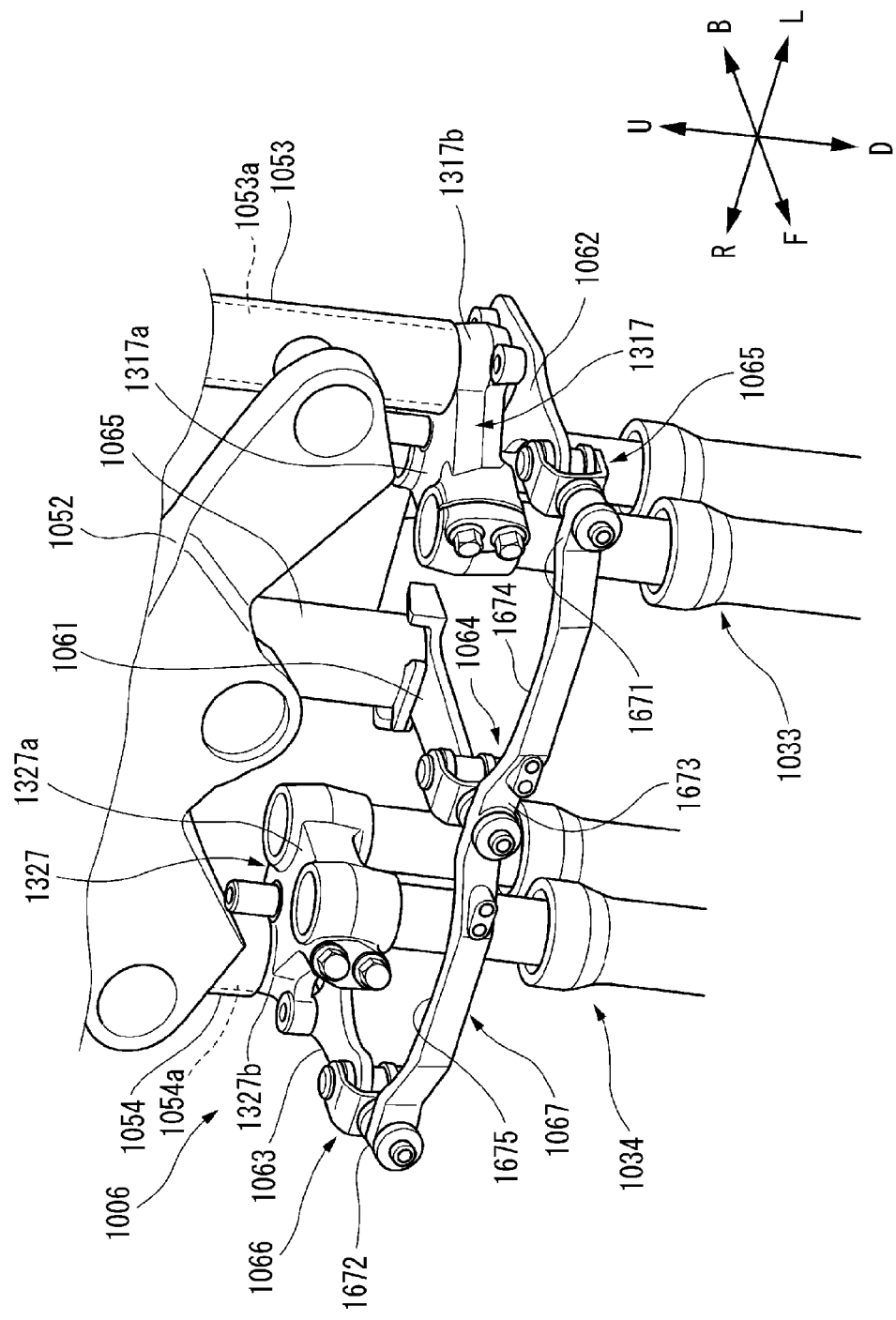
FIG. 14 is a perspective view illustrating the configuration of a portion of the steering force transmitting mechanism in the vehicle of FIG. 11.

FIG. 14 is a perspective view showing the configuration of a portion of the steering force transmitting mechanism 1006 of the vehicle 1001 of FIG. 11.

As illustrated in FIG. 14, the steering force transmitting mechanism 1006 includes a center transmission plate 1061, a left transmission plate 1062, a right transmission plate 1063, a center joint 1064, a left joint 1065, a right joint 1066, a tie rod (one example of a steering force transmitting member) 1067, the first bracket 1317, and the second bracket 1327, in addition to the steering member 1028. The steering force transmitting mechanism 1006 transmits the steering force exerted by the driver to operate the handle bar 1023 to the first bracket 1317 and the second bracket 1327 via these members.

The center transmission plate 1061 is disposed at the center in the vehicle width direction and connected to the steering shaft 1060 so that turning relative to the steering shaft 1060 is not allowed. The center transmission plate 1061 is turned in accordance with the turning of the steering shaft 1060.

The left transmission plate 1062 is connected to the first side member 1053 of the link mechanism 1005 described below so that turning relative to the first side member 1053 is not allowed. The left transmission plate 1062 is fixed to the first bracket 1317. The left transmission plate 1062 is positioned directly below the first bracket 1317. The left transmission plate 1062 is disposed directly to the left of the center transmission plate 1061.

The right transmission plate 1063 is connected to the second side member 1054 of the link mechanism 1005 described below so that turning relative to the second side member 1054 is not allowed. The left transmission plate 1062 and the right transmission plate 1063 are disposed symmetrically relative to the center of the center transmission plate 1061. The right transmission plate 1063 is fixed to the second bracket 1327. The right transmission plate 1063 is positioned directly below the second bracket 1327.

The tie rod 1067 includes a first connecting section 1671, a second connecting section 1672, and a third connecting section 1673. The first connecting section 1671 of the tie rod 1067 is connected to the first bracket 1317. The first connecting section 1671 is connected to the first bracket 1317 via the left joint 1065 and the left transmission plate 1062. The second connecting section 1672 of the tie rod 1067 is connected to the second bracket 1327. The second connecting section 1672 is connected to the second bracket 1327 via the right joint 1066 and the right transmission plate 1063. The third connecting section 1673 of the tie rod 1067 is connected to the lower portion of the steering shaft 1060 constituting the steering member 1028. The third connecting section 1673 is connected to the center transmission plate 1061 fixed to the lower end portion of the steering shaft 1060 defining the steering member 1028.

Of the surfaces of the tie rod 1067, the rear surface located between the first connecting section 1671 and the third connecting section 1673 is defined as a first opposing surface 1674. The first opposing surface 1674 opposes the upper end portion of the first shock absorber 1033 in a plan view of the vehicle. The first opposing surface 1674 is curved so that a portion that is farther from the first connecting section 1671 and the third connecting section 1673 protrudes frontward. The first opposing surface 1674 is configured to be spaced away from the first shock absorber 1033. Of the surfaces defining the tie rod 1067, the rear surface located between the second connecting section 1672 and the third connecting section 1673 is defined as a second opposing surface 1675. The second opposing surface 1675 opposes the upper end portion of the second shock absorber 1034 in a plan view of the vehicle. The second opposing surface 1675 is curved such a portion that is farther from the second connecting section 1672 and the third connecting section 1673 protrudes forward. The second opposing surface 1675 is configured to be spaced away from the second shock absorber 1034.

Figure 15:
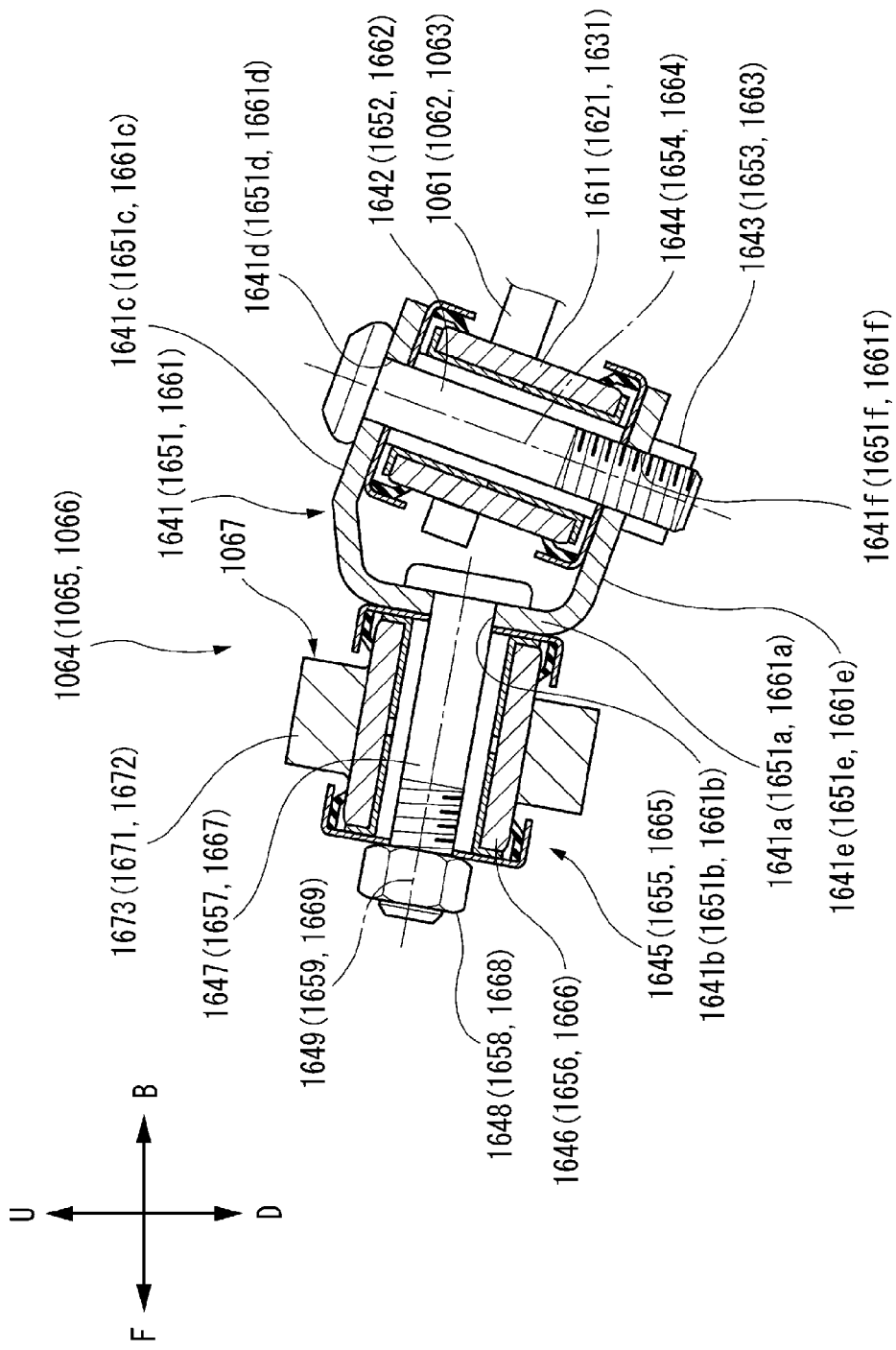
FIG. 15 is a sectional view illustrating the structure of a portion of the steering force transmitting mechanism in the vehicle of FIG. 11.

FIG. 15 is a sectional view showing the configuration of a portion of the steering force transmitting mechanism 1006 of the vehicle 1001 of FIG. 11. In FIG. 15, only the structure of the center portion of the steering force transmitting mechanism 1006 is illustrated, whereas the structures of the left and right portions of the steering force transmitting mechanism 1006 are not illustrated (only reference numerals are shown).

As illustrated in FIG. 15, the center joint 1064 is disposed at the front portion of the center transmission plate 1061. The center joint 1064 includes a first center turn section 1641 and a second center turn section 1645. The first center turn section 1641 is supported at the tip end of the center transmission plate 1061. The first center turn section 1641 preferably has a U-shape in a side view. The first center turn section 1641 includes a support plate section 1641a. A through hole 1641b is provided in the support plate section 1641a of the first center turn section 1641. The first center turn section 1641 includes an upper fixing plate section 1641c extending rearward from the upper end of the support plate section 1641a. A through hole 1641d is provided in the upper fixing plate section 1641c. The first center turn section 1641 includes a lower fixing plate section 1641e extending rearward from the lower end of the support plate section 1641a. A through hole 1641f is provided in the lower fixing plate section 1641e. A center transmission cylinder section 1611 preferably having a cylindrical or substantially cylindrical shape is fixed to the center transmission plate 1061 while its axis is directed in the up-down direction. A first center bolt 1642 passes through the center transmission cylinder section 1611. The first center bolt 1642 passes, from an upper side, through the through hole 1641d provided in the upper fixing plate section 1641c of the first center turn section 1641 and the through hole 1641f provided in the lower fixing plate section 1641e of the first center turn section 1641. A first center nut 1643 is threaded onto the first center bolt 1642 from a lower side. The first center turn section 1641 is connected to the center transmission cylinder section 1611 of the center transmission plate 1061 via the first center bolt 1642 and the first center nut 1643. The first center turn section 1641 is turnable relative to the center transmission plate 1061 about a first center turn axis 1644 that is the center axis of the first center bolt 1642 extending in the up-down direction.

The second center turn section 1645 is supported on the first center turn section 1641. The second center turn section 1645 includes a second center turn cylinder section 1646 having a cylindrical or substantially cylindrical shape. The second center turn cylinder section 1646 is connected to the front portion of the first center turn section 1641 while its axis is directed in the front-rear direction. A second center bolt 1647 passes through the second center turn cylinder section 1646. The second center bolt 1647 passes through the through hole 1641b of the support plate section 1641a of the first center turn section 1641 from a rear side. A second center nut 1648 is threaded onto the first center bolt 1647 from the front end of the second center turn cylinder section 1646. The second center turn section 1645 is connected to the first center turn section 1641 via the second center bolt 1647 and the second center nut 1648. The second center turn section 1645 is turnable relative to the first center turn section 1641 about a second center turn axis 1649 that is the center axis of the second center bolt 1647 extending in the front-rear direction.

The second center turn cylinder section 1646 of the second center turn section 1645 is fixed to the tie rod 1067. The third connecting section 1673 of the center portion of the tie rod 1067 is supported on the second center turn section 1645. The tie rod 1067 is turnable relatively about the second center turn axis 1649.

The left joint 1065 is disposed at the front portion of the left transmission plate 1062. The left joint 1065 includes a first left turn section 1651 and a second left turn section 1655. The first left turn section 1651 is supported at the tip end of the left transmission plate 1062. The first left turn section 1651 preferably has a U-shape in a side view. The first left turn section 1651 includes a support plate section 1651a. A through hole 1651b is provided in the support plate section 1651a of the first left turn section 1651. The first left turn section 1651 includes an upper fixing plate section 1651c extending rearward from the upper end of the support plate section 1651a. A through hole 1651d is provided in the upper fixing plate section 1651c. The first left turn section 1651 includes a lower fixing plate section 1651e extending rearward from the lower end of the support plate section 1651a. A through hole 1651f is provided in the lower fixing plate section 1651e. A left transmission cylinder section 1621 having a cylindrical or substantially cylindrical shape is fixed to the left transmission plate 1062 while its axis is directed in the up-down direction. A first left bolt 1652 passes through the left transmission cylinder section 1621. The first left bolt 1652 passes, from an upper side, through the through hole 1651d provided in the upper fixing plate section 1651c of the first left turn section 1651 and the through hole 1651f provided in the lower fixing plate section 1651e of the first left turn section 1651. A first left nut 1653 is threaded onto the first left bolt 1652 from a lower side. The first left turn section 1651 is connected to the left transmission cylinder section 1621 of the left transmission plate 1062 via the first left bolt 1652 and the first left nut 1653. The first left turn section 1651 is turnable relative to the left transmission plate 1062 about a first left turn axis 1654 that is the center axis of the first left bolt 1652 extending in the up-down direction.

The second left turn section 1655 is supported on the first left turn section 1651. The second left turn section 1655 includes a second left turn cylinder section 1656 having a cylindrical or substantially cylindrical shape. The second left turn cylinder section 1656 is connected to the front portion of the first left turn section 1651 while its axis is directed in the front-rear direction. A second left bolt 1657 passes through the second left turn cylinder section 1656. The second left bolt 1657 passes through the through hole 1651b of the support plate section 1651a of the first left turn section 1651 from a rear side. A second left nut 1658 is threaded onto the first left bolt 1657 from the front end of the second left turn cylinder section 1656. The second left turn section 1655 is connected to the first left turn section 1651 via the second left bolt 1657 and the second left nut 1658. The second left turn section 1655 is turnable relative to the first left turn section 1651 about a second left turn axis 1659 that is the center axis of the second left bolt 1657 extending in the front-rear direction.

The second left turn cylinder section 1656 of the second left turn section 1655 is fixed to the tie rod 1067. The first connecting section 1671 which is a left portion of the tie rod 1067 is supported on the second left turn section 1655. The tie rod 1067 is turnable relatively about the second left turn axis 1659.

The right joint 1066 is disposed at the front portion of the right transmission plate 1063. The right joint 1066 includes a first right turn section 1661 and a second right turn section 1665. The first right turn section 1661 is supported at the tip end of the right transmission plate 1063. The first right turn section 1661 preferably has a U-shape in a side view. The first right turn section 1661 includes a support plate section 1661a. A through hole 1661b is provided in the support plate section 1661a of the first right turn section 1661. The first right turn section 1661 includes an upper fixing plate section 1661c extending rearward from the upper end of the support plate section 1661a. A through hole 1661d is provided in the upper fixing plate section 1661c. The first right turn section 1661 includes a lower fixing plate section 1661e extending rearward from the lower end of the support plate section 1661a. A through hole 1661f is provided in the lower fixing plate section 1661e. A right transmission cylinder section 1631 having a cylindrical or substantially cylindrical shape is fixed to the right transmission plate 1063 while its axis is directed in the up-down direction. A first right bolt 1662 passes through the right transmission cylinder section 1631. The first right bolt 1662 passes, from an upper side, through the through hole 1661d provided in the upper fixing plate section 1661c of the first right turn section 1661 and the through hole 1661f provided in the lower fixing plate section 1661e of the first right turn section 1661. A first right nut 1663 is threaded onto the first right bolt 1662 from a lower side. The first right turn section 1661 is connected to the right transmission cylinder section 1631 of the right transmission plate 1063 via the first right bolt 1662 and the first right nut 1663. The first right turn section 1661 is turnable relative to the right transmission plate 1063 about a first right turn axis 1664 that is the center of the first right bolt 1662 extending in the up-down direction.

The second right turn section 1665 is supported on the first right turn section 1661. The second right turn section 1665 includes a second right turn cylinder section 1666 having a cylindrical or substantially cylindrical shape. The second right turn cylinder section 1666 is connected to the front portion of the first right turn section 1661 while its axis is directed in the front-rear direction. A second right bolt 1667 passes through the second right turn cylinder section 1666. The second right bolt 1667 passes through the through hole 1661b of the support plate section 1661a of the first right turn section 1661 from a rear side. A second right nut 1668 is threaded onto the first right bolt 1667 from the front end of the second right turn cylinder section 1666. The second right turn section 1665 is connected to the first right turn section 1661 via the second right bolt 1667 and the second right nut 1668. The second right turn section 1665 is turnable relative to the first right turn section 1661 about a second right turn axis 1669 that is the center axis of the second right bolt 1667 extending in the front-rear direction.

The second right turn cylinder section 1666 of the second right turn section 1665 is fixed to the tie rod 1067. The second connecting section 1672, which is a right portion of the tie rod 1067, is supported on the second right turn section 1665. The tie rod 1067 is turnable relatively about the second right turn axis 1669.

The steering force transmitting mechanism 1006 configured as described above transmits the steering force transmitted from the steering member 1028 to the tie rod 1067 via the center transmission plate 1061 and the center joint 1064. Hence, the tie rod 1067 is displaced in either the left or right direction. The steering force transmitted to the tie rod 1067 is transmitted from the tie rod 1067 to the first bracket 1317 via the left joint 1065 and the left transmission plate 1062 and also transmitted to the second bracket 1327 from the tie rod 1067 to the second bracket 1327 via the right joint 1066 and the right transmission plate 1063. As a result, the first bracket 1317 and the second bracket 1327 are turned in the direction of displacement of the tie rod 1067.

As illustrated in FIG. 12, in this example, the link mechanism 1005, a parallel four-bar link (also referred to as a parallelogram link) type, is used.

The link mechanism 1005 is disposed below the handle bar 1023. The link mechanism 1005 is connected to the head pipe 1211 of the vehicle body frame 1021. The link mechanism 1005 includes the first cross member 1051 (one example of an upper turnable member), the second cross member 1052 (one example of a lower turnable member), the first side member 1053, and the second side member 1054, as a configuration to perform the tilting operation of the vehicle 1001.

The first cross member 1051 includes a plate-shaped member 1512 disposed directly ahead of the head pipe 1211 and extending in the vehicle width direction. The plate-shaped member 1512 is supported on the head pipe 1211 at a supporting section C and is turnable relative to the head pipe 1211 about the turn axis (one example of an upper axis) of the supporting section C extending along the front-rear direction.

The left end of the first cross member 1051 is connected to the first side member 1053 via a connecting section D. The first cross member 1051 is turnable relative to the first side member 1053 about the turn axis of the connecting section D extending along the front-rear direction. The right end of the first cross member 1051 is connected to the second side member 1054 at a connecting section E. The first cross member 1051 is turnable relative to the second side member 1054 about the turn axis of the connecting section E extending along the front-rear direction.

The second cross member 1052 is supported on the head pipe 1211 at a supporting section F and is turnable about the turn axis (one example of a lower axis) of the supporting section F extending along the front-rear direction. The second cross member 1052 is disposed below the first cross member 1051. The second cross member 1052 has the same length as that of the first cross member 1051 in the vehicle width direction and is disposed parallel or substantially parallel to the first cross member 1051.

Figure 13:
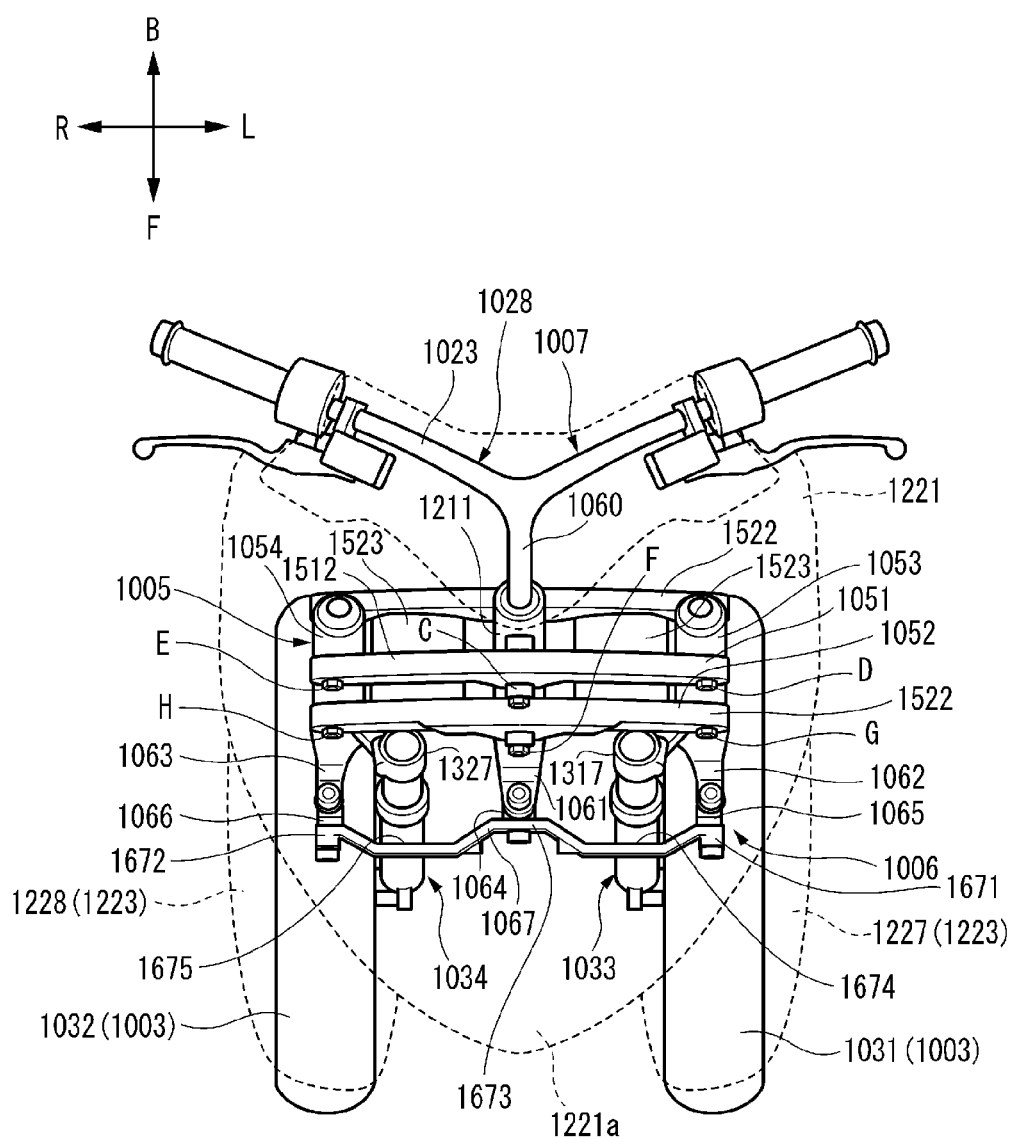
FIG. 13 is a plan view illustrating the front portion of the vehicle of FIG. 11.

As illustrated in FIG. 13, the second cross member 1052 includes a pair of plate-shaped members 1522 and 1522 extending in the vehicle width direction. The head pipe 1211 is disposed between the pair of plate-shaped members 1522 and 1522 in the front-rear direction. The plate-shaped members 1522 and 1522 are integrally connected to each other via an intermediate portion 1523. The intermediate portion 1523 may be integral with the pair of plate-shaped members 1522 and 1522 or may be separate from these members. The left end of the second cross member 1052 is connected to the first side member 1053 at a connecting section G. The second cross member 1052 is turnable relative to the first side member 1053 about the turn axis of the connecting section G extending along the front-rear direction. The right end of the second cross member 1052 is connected to the second side member 1054 at a connecting section H. The second cross member 1052 is turnable relative to the second side member 1054 about the turn axis of the connecting section H extending along the front-rear direction.

The first side member 1053 is disposed directly on the left of the head pipe 1211 and extends parallel or substantially parallel to the extending direction of the head pipe 1211. The first side member 1053 is disposed directly above the first front wheel 1031 and above the first shock absorber 1033. The first side turn shaft 1053a, being turnable relative to the first side member 1053, is supported on the first side-member supporting section 1317b of the first bracket 1317. The first bracket 1317 is disposed on the first side member 1053 so as to be turnable relative to the first side member 1053 about the first center axis Y1 (see FIG. 12, one example of the first axis).

The second side member 1054 is disposed directly to the right of the head pipe 1211 and extends parallel or substantially parallel to the extending direction of the head pipe 1211. The second side member 1054 is disposed directly above the second front wheel 1032 and above the second shock absorber 1034. The second side turn shaft 1054a, being turnable relative to the second side member 1054, is supported on the second side-member supporting section 1327b of the second bracket 1327. The second bracket 1327 is disposed on the second side member 1054 so as to be turnable relative to the second side member 1054 about the second center axis Y2 (see FIG. 12, one example of the second axis).

As described above, the first cross member 1051, the second cross member 1052, the first side member 1053, and the second side member 1054 are connected so that the first cross member 1051 and the second cross member 1052 maintain their directions (postures) that are parallel or substantially parallel to each other, and so that the first side member 1053 and the second side member 1054 maintain their directions (postures) that are parallel or substantially parallel to each other.

Figure 16:
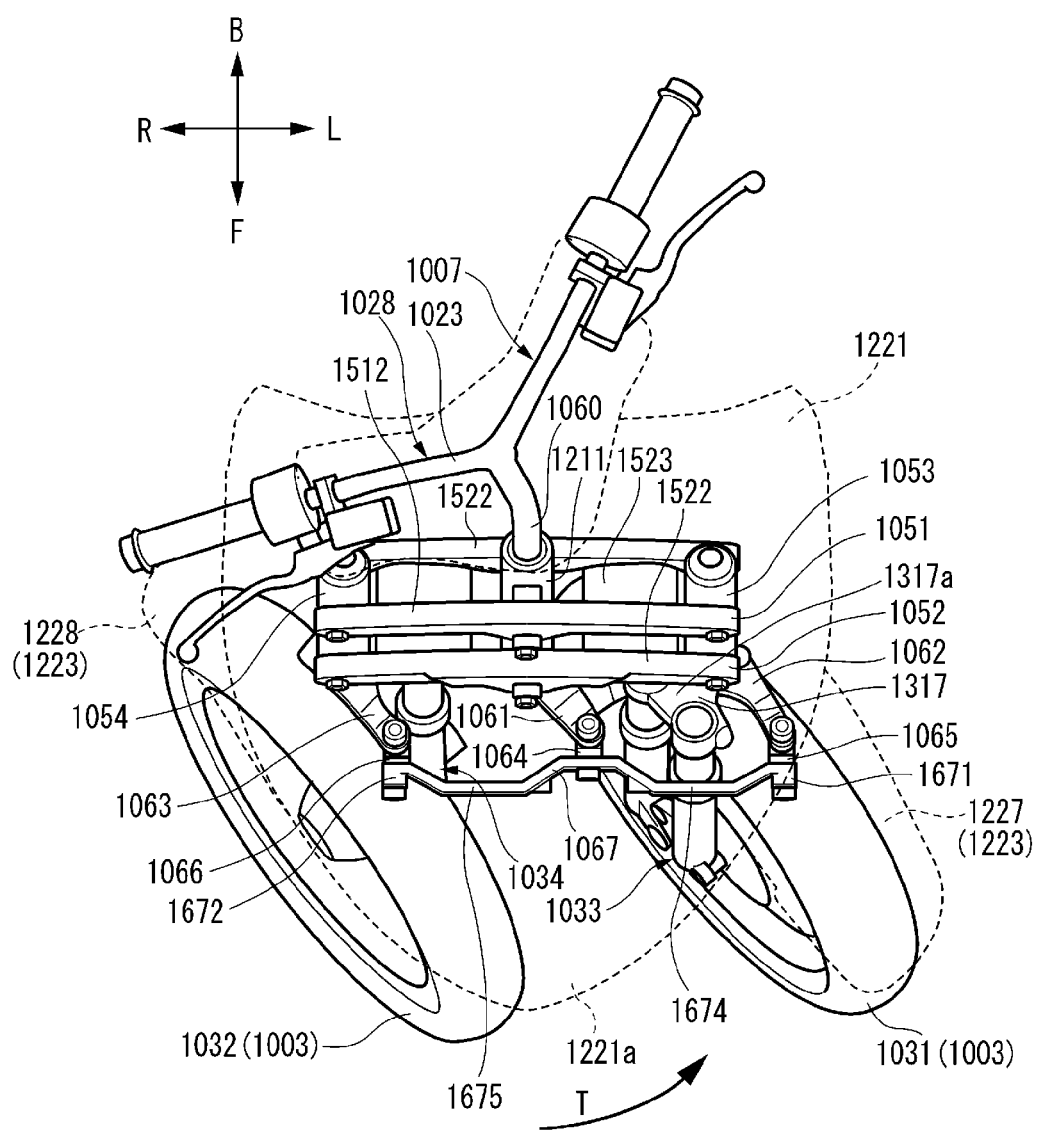
FIG. 16 is a plan view illustrating the front portion of the vehicle in a state that the vehicle of FIG. 11 is steered.

FIG. 16 is a view illustrating the steering operation of the vehicle 1001 and is a plan view showing the front portion of the vehicle in a state that the vehicle 1001 is steered.

As illustrated in FIG. 16, when the handle bar 1023 is steered in the left-right direction, the steering force transmitting mechanism 1006 of the steering mechanism 1007 is operated, and a steering operation is performed. When the steering shaft 1060 is turned by the steering of the handle bar 1023, the center transmission plate 1061 is turned in accordance with the turning of the steering shaft 1060.

For example, when the steering shaft 1060 is turned in the direction of the arrow T of FIG. 16, the tie rod 1067 is moved leftward and rearward in accordance with the turning of the center transmission plate 1061. Incidentally, the center transmission plate 1061 is turned relative to the center joint 1064 about a turn axis of the center joint 1064 extending in the up-down direction such that the tie rod 1067 is moved leftward and rearward while maintaining its posture. As the tie rod 1067 is moved leftward and rearward, the left transmission plate 1062 and the right transmission plate 1063 are turned in the direction of the arrow T about the center of the first side member 1053 and the center of the second side member 1054, respectively. Incidentally, the left transmission plate 1062 is turned relative to the left joint 1065 about a turn axis of the left joint 1065 extending in the up-down direction, and the right transmission plate 1063 is turned relative to the right joint 1066 about a turn axis of the right joint 1066 extending in the up-down direction.

When the left transmission plate 1062 and the right transmission plate 1063 are turned in the direction of the arrow T, the first bracket 1317 and the second bracket 1327 are turned in the direction of the arrow T. The first support member supports the first front wheel 1031. The first support member includes the first bracket 1317 and the first shock absorber 1033. When the first bracket 1317 is turned, the first support member is turned. The second support member supports the second front wheel 1032. The second support member includes the second bracket 1327 and the second shock absorber 1034. When the second bracket 1327 is turned, the second support member is turned. As a result, when the first bracket 1317 and the second bracket 1327 are turned in the direction of the arrow T, the first front wheel 1031 is turned about the first center axis Y1 (see FIG. 12) via the first shock absorber 1033, and the second front wheel 1032 is turned about the second center axis Y2 (see FIG. 12) via the second shock absorber 1034.

Figure 17:
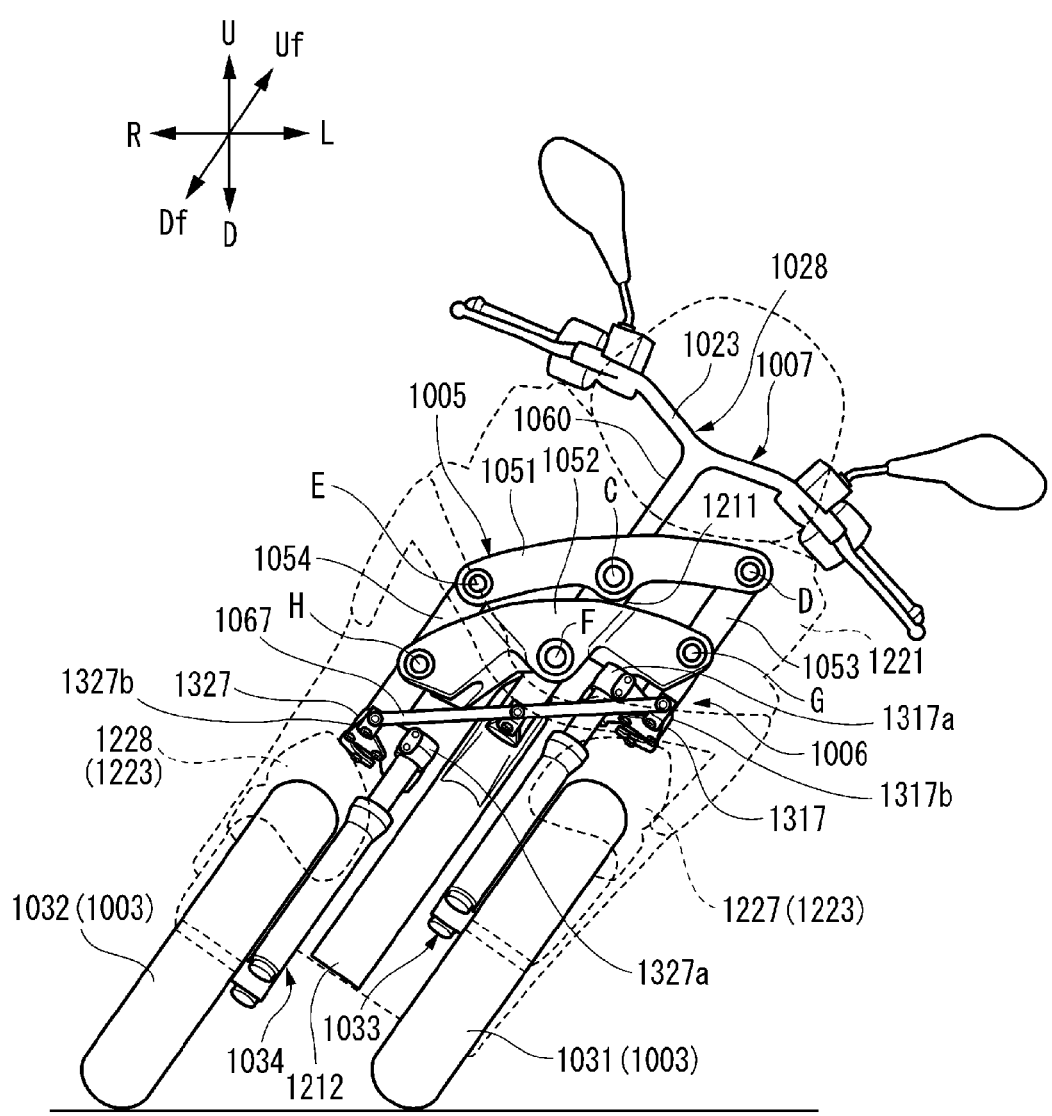
FIG. 17 is a front view illustrating the front portion of the vehicle in a state that the vehicle of FIG. 11 is tilted.

FIG. 17 is a view illustrating the tilting operation of the vehicle 1001 and is a plan view showing the front portion of the vehicle in a state that the vehicle 1001 is tilted.

As illustrated in FIG. 17, in accordance with the operation of the link mechanism 1005, the vehicle 1001 is tilted in the left-right direction. The operation of the link mechanism 1005 denotes that the respective members (the first cross member 1051, the second cross member 1052, the first side member 1053, and the second side member 1054) that perform the tilting operation in the link mechanism 1005 are turned relatively about their respective connection points, so that the shape of the link mechanism 1005 is changed.

In the link mechanism 1005 of this example, for example, in the upright state of the vehicle, the first cross member 1051, the second cross member 1052, the first side member 1053, and the second side member 1054 are disposed so as to define a rectangular shape in a front view, but in the tilted state of the vehicle 1001, the rectangular shape is deformed into a parallelogram. The link mechanism 1005 performs a tilting operation in cooperation with the relative turning operations of the first cross member 1051, the second cross member 1052, the first side member 1053, and the second side member 1054, thus tilting the first front wheel 1031 and the second front wheel 1032.

For example, when the driver tilts the vehicle 1001 leftward, the head pipe 1211 is tilted leftward relative to the vertical direction. When the head pipe 1211 is tilted, the first cross member 1051 is turned relative to the head pipe 1211 about the supporting section C and the second cross member 1052 is turned relative to the head pipe 1211 about the supporting section F. As a result, the first cross member 1051 is moved leftward of the second cross member 1052 such that the first side member 1053 and the second side member 1054 are tilted relative to the vertical direction while being parallel or substantially parallel to the head pipe 1211. When the first side member 1053 and the second side member 1054 are tilted, the first side member 1053 and the second side member 1054 are turned relative to the first cross member 1051 and the second cross member 1052. Therefore, when the vehicle 1001 is tilted, the first front wheel 1031 and the second front wheel 1032 supported on the first side member 1053 and the second side member 1054 are respectively titled relative to the vertical direction while being parallel or substantially parallel to the head pipe 1211 in accordance with the tilting of the first side member 1053 and the second side member 1054.

Furthermore, when the tilting operation is performed, the tie rod 1067 is turned about the second center turn axis 1649 of the center joint 1064, the second left turn axis 1659 of the left joint 1065, and the second right turn axis 1669 of the right joint 1066, which are extending in the front-rear direction (see FIG. 14 and FIG. 15). As a result, the tie rod 1067 maintains its direction (posture) that extends parallel or substantially parallel to the first cross member 1051 and the second cross member 1052 even when the vehicle 1001 is tilted.

As described the above, the link mechanism 1005 that tilts the first front wheel 1031 and the second front wheel 1032 by performing the tilting operation is disposed directly above the first front wheel 1031 and the second front wheel 1032. In other words, the turn axes of the first cross member 1051, the second cross member 1052, the first side member 1053, and the second side member 1054 defining the turnable members and the link mechanism 1005 are disposed above the first front wheel 1031 and the second front wheel 1032. The up-down direction of the vehicle body frame in a state that the vehicle is tilted in the left-right direction is different from the up-down direction along the vertical direction. The former denotes the up-down direction along the longitudinal direction of the head pipe 1211 tilted in the left-right direction. For example, the sign Uf illustrated in FIG. 17 and FIG. 18 indicates an upward direction along the up-down direction of the vehicle body frame and the sign Df indicates a downward direction along the up-down direction of the vehicle body frame.

Figure 18:
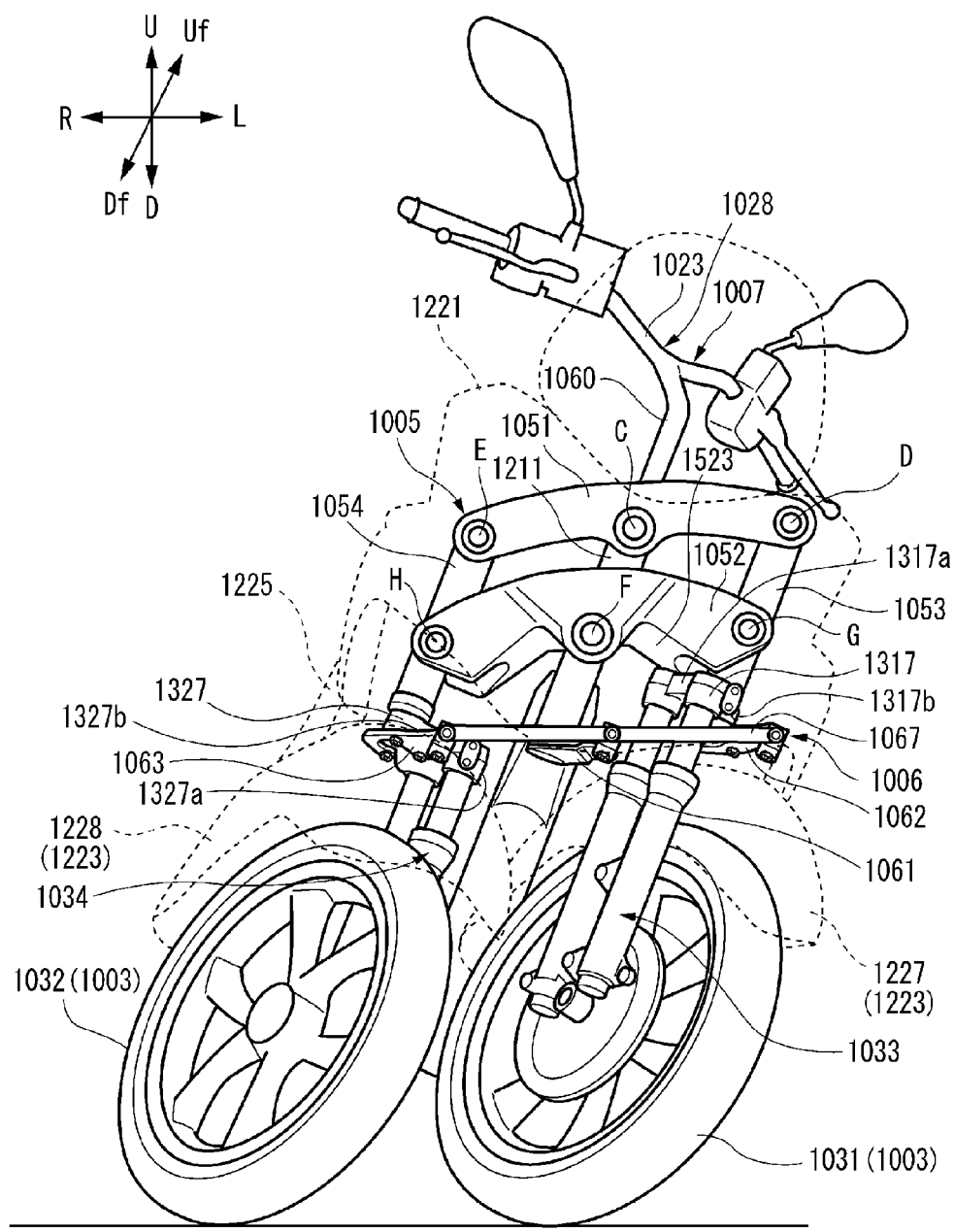
FIG. 18 is a front view illustrating the front portion of the vehicle in a state that the vehicle of FIG. 11 is steered and tilted.

FIG. 18 is a front view showing the front portion of the vehicle in a state that the vehicle 1001 is steered and tilted.

FIG. 18 illustrates a state that the vehicle is steered leftward and tilted leftward. When the turning operation of the vehicle is performed as illustrated in FIG. 18, the directions of the first front wheel 1031 and the second front wheel 1032 are changed by the steering operation, while the first front wheel 1031 and the second front wheel 1032 are tilted together with the vehicle body frame 1021 by the tilting operation. In this state, the shape defined by the first cross member 1051, the second cross member 1052, the first side member 1053, and the second side member 1054 of the link mechanism 1005 is deformed into a parallelogram such that the tie rod 1067 is moved rearward and either leftward or rightward (leftward in FIG. 18) which is in accordance with the direction of the steering operation.

The tie rod 1067 moves in a direction parallel or substantially parallel to the extending directions of the first cross member 1051 and the second cross member 1052 as viewed from the axial directions of the supporting section C and the connecting sections D, E defining the turn axes of the first cross member 1051 or as viewed from the axial directions of the supporting section F and the connecting sections G, H defining the turn axes of the second cross member 1052. Specifically, the tie rod 1067 moves such that the lines passing through the turn axis 1649 of the support position at the center joint 1064, the turn axis 1659 of the support position at the left joint 1065, and the turn axis 1669 of the support position at the right joint 1066 are parallel or substantially parallel to the lines passing through the support positions C, D and E of the first cross member 1051 and the lines passing through the support positions F, G and H of the second cross member 1052 (see FIG. 12 and FIGS. 16 to 18).

The tie rod 1067 is disposed below the first cross member 1051 and the second cross member 1052 (see FIG. 12). The tie rod 1067 is disposed at a position in which the tie rod overlaps with at least one of the first shock-absorber supporting section 1317*a* of the first bracket 1317 and the first shock absorber 1033 as viewed from the front of the vehicle in at least the fully tilted state wherein the link mechanism 1005 is fully tilted leftward (see FIG. 17). The tie rod 1067 is disposed at a position in which the tie rod overlaps with at least one of the second shock-absorber supporting section 1327*a* of the second bracket 1327 and the second shock absorber 1034 as viewed from the front of the vehicle in at least the fully tilted state wherein the link mechanism 1005 is fully tilted rightward. Furthermore, in the front-rear direction of the vehicle, the tie rod 1067 is disposed ahead of the first bracket 1317 and the second bracket 1327 in the front-rear direction of the vehicle (see FIGS. 13 and 14).

The tie rod 1067 is disposed at a position in which a portion thereof overlaps with the first shock-absorber supporting section 1317a of the first bracket 1317 and the second shock-absorber supporting section 1327a of the second bracket 1327 as viewed from the front of the vehicle in the no-load state of the vehicle 1001 (see FIG. 12).

In the no-load state of the vehicle 1001, the first side-member supporting section 1317b and the first shock-absorber supporting section 1317a of the first bracket 1317 overlap with each other as viewed from the direction orthogonal or substantially orthogonal to the extending direction of the first side member 1053. In the no-load state of the vehicle 1001, the second side-member supporting section 1327b and the second shock-absorber supporting section 1327a of the second bracket 1327 overlap with each other as viewed from the direction orthogonal or substantially orthogonal to the extending direction of the second side member 1054.

Figure 19A:
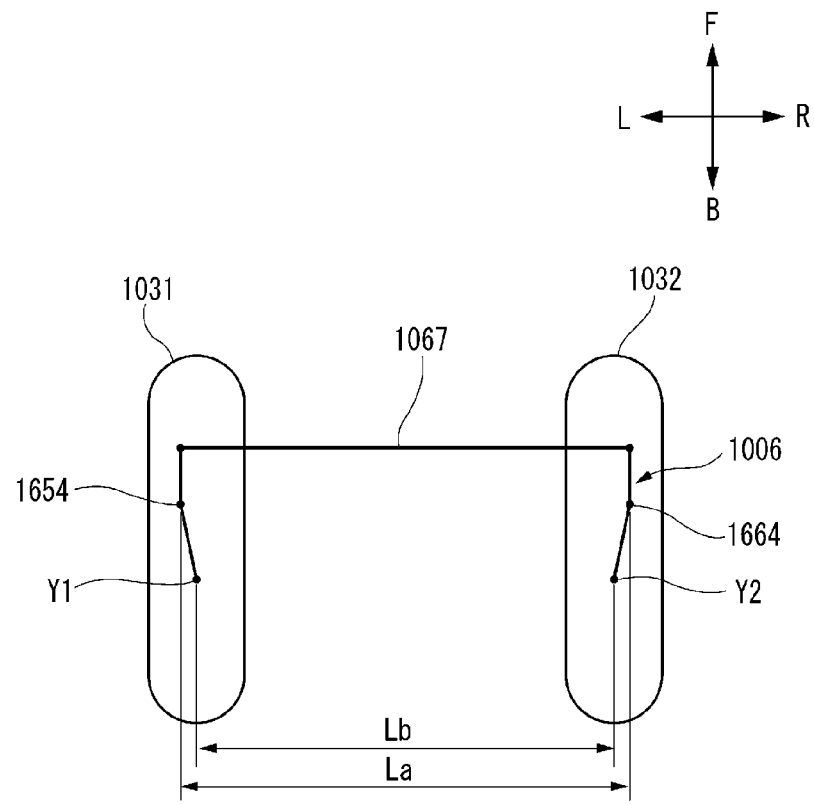
Figure 19B:
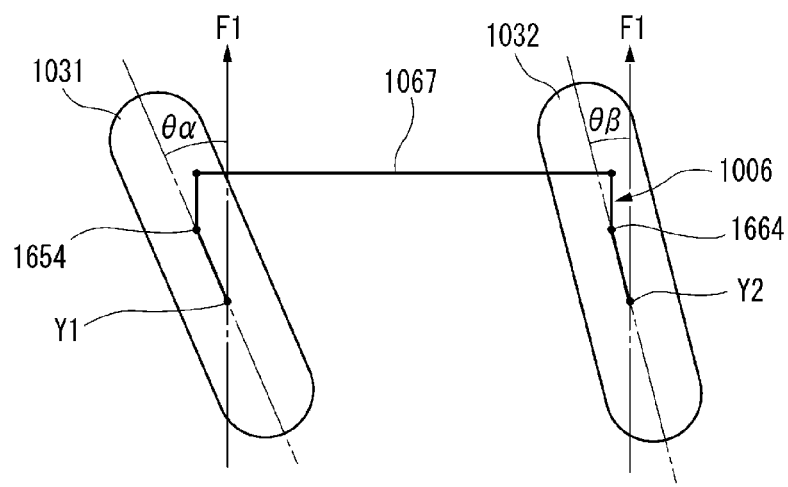

FIGS. 19A and 19B are views illustrating the movements of the steering force transmitting mechanism, the first front wheel 1031 and the second front wheel 1032 of the vehicle 1001 illustrated in FIG. 11. FIG. 19A is a schematic view during straight traveling and FIG. 19B is a schematic view during left turning.

As illustrated in FIG. 19A, in the steering force transmitting mechanism 1006, the distance La in the left-right direction between the first left turn axis 1654 and the first right turn axis 1664 is larger than the distance Lb in the left-right direction between the first center axis Y1 defining the turn axis of the first bracket 1317 and extending in the up-down direction, and the second center axis Y2 defining the turn axis of the second bracket 1327 and extending in the up-down direction.

As illustrated in FIG. 19B, when the vehicle 1001 is steered leftward, the left turning is performed such that the first front wheel 1031 closer to the turning center is an inner wheel, and such that the second front wheel 1032 away from the turning center is an outer wheel. In this manner, when the vehicle is turned to the left, the first front wheel 1031 closer to the turning center is an inner wheel and is tilted by an inner wheel steering angle θα relative to a vehicle center axis F1 extending in the front-rear direction of the vehicle 1001, and the second front wheel 1032 away from the turning center is an outer wheel and is tilted by an outer wheel steering angle θβ relative to the vehicle center axis F1 extending in the front-rear direction of the vehicle 1001. Incidentally, in the vehicle 1001, the inner wheel steering angle θα of the first front wheel 1031 being an inner wheel is larger than the outer wheel steering angle θβ of the second front wheel 1032 being an outer wheel. Similarly, in the vehicle 1001, when the vehicle 1001 is steered rightward, the right turning is performed such that the second front wheel 1032 closer to the turning center is an inner wheel and such that the first front wheel 1031 away from the turning center is an outer wheel. In this manner, when the vehicle is turned to the right, the second front wheel 1032 closer to the turning center is an inner wheel and is tilted by the inner wheel steering angle θα relative to the vehicle center axis F1 extending in the front-rear direction of the vehicle 1001, and the first front wheel 1031 away from the turning center is an outer wheel and is tilted by the outer wheel steering angle θβ relative to the vehicle center axis F1 extending in the front-rear direction of the vehicle 1001. Incidentally, the inner wheel steering angle θα of the second front wheel 1032 being an inner wheel is larger than the outer wheel steering angle θβ of the first front wheel 1031 being an outer wheel.

As described the above, in the vehicle 1001, relative to the vehicle center axis F1 extending in the front-rear direction of the vehicle 1001, the inner wheel steering angle θα of the front wheel disposed inward when the steering is performed (i.e., one of the first front wheel 1031 and the second front wheel 1032) is larger than the outer wheel steering angle θβ of the front wheel disposed outward at the time of the steering (i.e., the other one of the first front wheel 1031 and the second front wheel 1032).

In a vehicle including a parallel four-bar link mechanism (parallelogram link mechanism) that tilts two front wheels, a tie rod that defines a member to transmit a steering force to the two front wheels is a member whose posture and position are changed significantly in accordance with the tilting operation and the steering operation of the vehicle, thus being a member having a large movable range. The inventor of the preferred embodiments of the present invention performed examinations from a plurality of viewpoints by paying attention to the fact that, in a vehicle including a parallelogram link mechanism, the position of the tie rod having a large movable range significantly influences not only the shapes of other members such as brackets connected to the shock-absorbing members that support the front wheels, and other on-vehicle components such as auxiliary devices, but also spaces provided to accommodate these members or to avoid interference with the members.

For example, in the configuration of the vehicle disclosed in German Patent Publication No. 10 2010 052 716 A, a tie rod is disposed between a lower cross member and a bracket connected to a shock-absorbing member when the vehicle is viewed from the front. Furthermore, a slanted portion slanted inward toward the center of the vehicle in the vehicle width direction is provided for the bracket connected to the shock-absorbing member such that the shock-absorbing member is connected to the lower end portion of the slanted portion to avoid the tie rod from interfering with the bracket or the shock-absorbing member when the vehicle has a tilted posture. With this configuration, the tie rod avoids interfering with the bracket or the shock-absorbing member not only in the upright posture but also in the tilted posture. However, the extension/contraction length of the shock-absorbing member that supports the front wheel is shortened because the bracket includes the slanted portion. When the extension/contraction length of the shock-absorbing member is not sufficiently long, it is difficult for the shock-absorbing member to absorb the impact force applied to each of the two front wheels such that the riding comfort of the vehicle is degenerated.

Hence, even when the extension/contraction length of the shock-absorbing member is sufficiently long, for the purpose of avoiding interference between the tie rod and the bracket or between the tie rod and the shock-absorbing member, it is conceived that the tie rod 1067 is disposed in a space X (see FIG. 20) provided at or above a position in which the tie rod overlaps with the second cross member 1052 as viewed from the front of the vehicle, so that the tie rod is separated from the bracket or the shock-absorbing member. For example, in the vehicle configuration disclosed in International Publication No. WO 2012/007819, the tie rod has a shape curved upward when the vehicle is viewed from the front and a portion of the tie rod overlaps with a cross member. With this configuration, the interference between the tie rod and the bracket or between the tie rod and the shock-absorbing member is easily avoided even in the tilted posture, but the space directly ahead of the cross member is eventually used as the movable range of the tie rod. For this reason, the front portion of the vehicle tends to become bulky to secure a space to accommodate on-vehicle components, such as a headlight and auxiliary devices in the front portion of the vehicle. As described above, from the viewpoint of reducing or preventing the enlargement of the front portion of the vehicle, it is not desirable that the tie rod is disposed at the position in which the tie rod overlaps with the cross member when the vehicle is viewed from the front.

Figure 20:
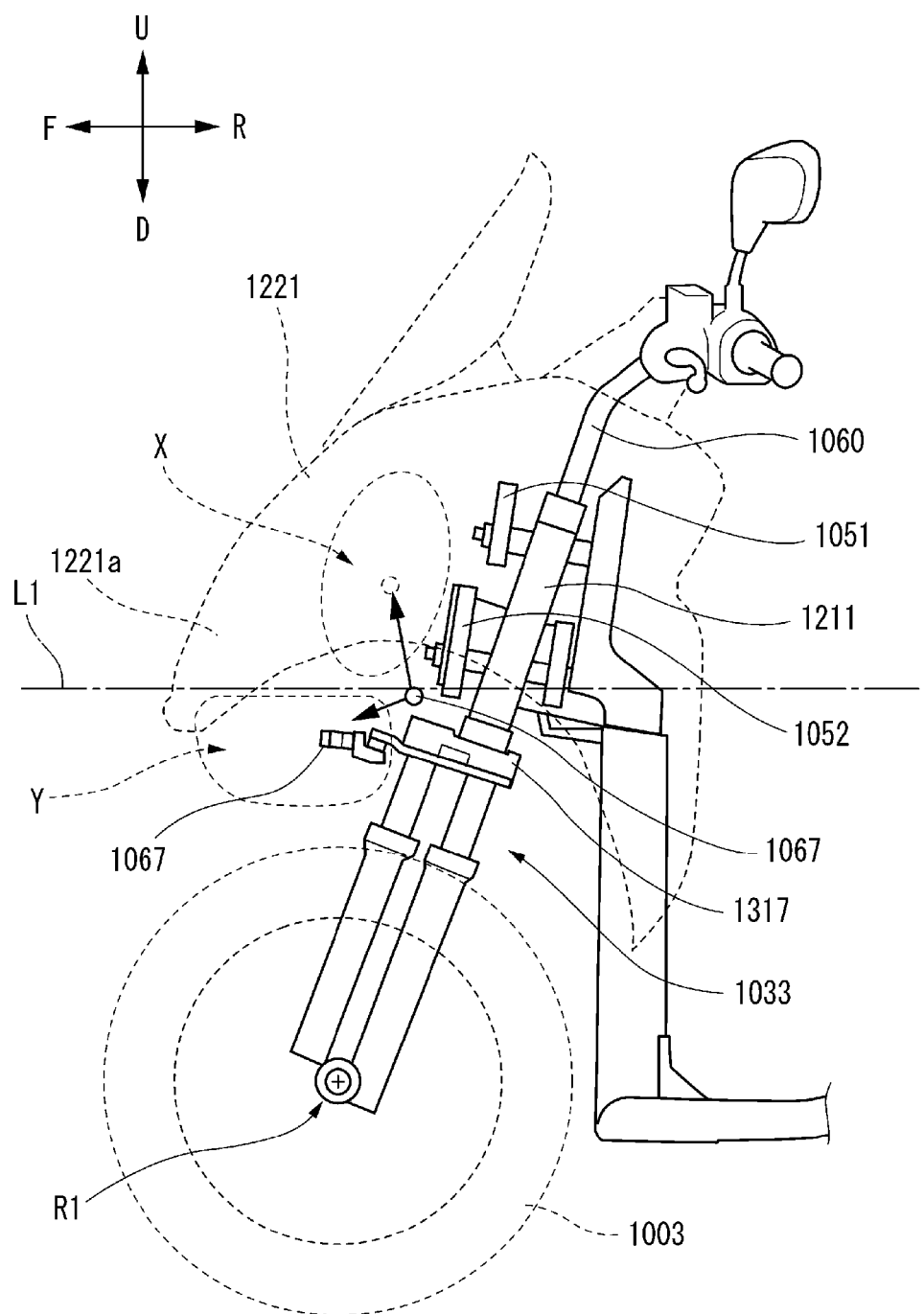
FIG. 20 is a side view illustrating the front portion of the vehicle of FIG. 11.

As described above, there are no conventional examples in which the prevention of the degeneration of the riding comfort of a vehicle and the prevention of the enlargement of the front portion of the vehicle are both attained. Hence, the inventor of the preferred embodiments of the present invention examined an arrangement wherein the tie rod 1067 is disposed in a space Y below the lower end of the second cross member 1052 and ahead of the first bracket 1317 and the second bracket 1327, in the vehicle including the parallelogram link mechanism that tilts the two front wheels, as illustrated in FIG. 20. In FIG. 20, a straight line L1 denotes a horizontal line passing through the lower end of the second cross member 1052. The tie rod 1067 is disposed ahead of the first bracket 1317 and the second bracket 1327 in the front-rear direction of the vehicle so that a clearance is secured between the tie rod 1067 and the two brackets (i.e., the first bracket 1317 and the second bracket 1327) or between the tie rod 1067 and the two shock absorbers (i.e., the first shock absorber 1033 and the second shock absorber 1034) in the front-rear direction of the vehicle even when the vehicle takes the fully tilted posture. With this configuration, when the posture of the vehicle is changed from the upright state to the tilted state, sufficient extension/contraction lengths of the first shock absorber 1033 and the second shock absorber 1034 are easily secured while avoiding interference between the tie rod 1067 and the first shock absorber 1033 or between the tie rod 1067 and the second shock absorber 1034. With the above configuration, in the fully tilted state, the tie rod 1067 is disposed at the position in which the tie rod overlaps with at least one of the first shock-absorber supporting section 1317a of the first bracket 1317 and the first shock absorber 1033 or at the position in which the tie rod overlaps with at least one of the second shock-absorber supporting section 1327a of the second bracket 1327 and the second shock absorber 1034 as viewed from the front of the vehicle (see FIG. 17).

In addition, the front cover 1221 is configured so that the distance between the head pipe 1221 and the front cover 1221 in the front-rear direction of the vehicle gradually increases downward or is maintained in a side view of the vehicle. Furthermore, the front cover 1221 is configured such that the center portion of the front cover 1221 in the left-right direction protrudes frontward in the front-rear direction of the vehicle in a plan view of the vehicle (see FIG. 13). With the front cover 1221, a wide space is secured below the second cross member 1052 and ahead of the first bracket 1317 and the second bracket 1327 in the front-rear direction of the vehicle, as the space Y. With the use of the space Y, the movable range of the tie rod 1067 is secured while the enlargement of the shape of the front cover 1221 in the entire front portion of the vehicle is reduced or prevented. As described the above, the inventor of the preferred embodiments of the present invention discovered that the enlargement of the front portion of the vehicle is able to be reduced or prevented while the extension/contraction lengths of the first shock absorber 1033 and the second shock absorber 1034 are sufficiently long and while the degeneration of the riding comfort of the vehicle is reduced or prevented by disposing the tie rod 1067 at the above-described position.

As described in the above preferred embodiments, since the first cross member 1051 and the second cross member 1052 defining the turnable members of the link mechanism 1005 are disposed above the first front wheel 1031 and the second front wheel 1032, it is possible to reduce or prevent the enlargement of the front portion of the vehicle 1001 to dispose the mechanism to interlock the first front wheel 1031 and the second front wheel 1032. The tie rod 1067 is disposed below the second cross member 1052 and in the space directly ahead of the first bracket 1317 and the second bracket 1327 in the front-rear direction of the vehicle. As described above, while the space ahead of the second cross member 1052 and the first cross member 1051 in the front-rear direction of the vehicle is secured as the space to dispose the on-vehicle components, such as other auxiliary devices, the space Y (see FIG. 20) below the second cross member 1052 and ahead of the first bracket 1317 and the second bracket 1327 in the front-rear direction is used as the movable range of the tie rod 1067. Hence, the enlargement of the front portion of the vehicle is reduced or prevented by effectively using the limited space in the front portion of the vehicle as described above. Furthermore, the tie rod 1067 is disposed at the position in which at least a portion thereof overlaps with at least one of the first shock-absorber supporting section 1317a of the first bracket 1317 and the first shock absorber 1033 or at the position in which at least a portion thereof overlaps with at least one of the second shock-absorber supporting section 1327a of the second bracket 1327 and the second shock absorber 1034, at least in the fully tilted state that the link mechanism 1005 is fully tilted, when the vehicle is viewed from the front. Hence, the large extension/contraction lengths of the first shock absorber 1033 and the second shock absorber 1034 are easily secured while reducing or preventing the enlargement in the up-down direction. As a result, impact forces applied to the first front wheel 1031 and the second front wheel 1032 during the traveling of the vehicle 1001 are absorbed easily and smoothly such that the riding comfort of the vehicle 1001 is improved. Hence, in the above-described preferred embodiments, the enlargement of the front portion of the vehicle 1001 is reduced or prevented while the degeneration of the riding comfort of the vehicle 1001 is reduced or prevented.

Moreover, the head pipe 1211 is disposed so that the lower portion of the head pipe 1211 is positioned ahead of the upper portion thereof in the front-rear direction of the vehicle. The front cover 1221 is configured such that the front cover is slanted downward as it approaches the front end of the vehicle in a side view of the vehicle, and such that the center portion thereof in the left-right direction in a plan view of the vehicle protrudes frontward in the front-rear direction of the vehicle (see FIG. 13 and FIG. 20, for example). With the above-described configuration of the vehicle, a wide space in the front portion of the vehicle is secured even in the area in the vicinity of the front end portion 1221a of the front cover 1221. Using the relatively wide space as the movable range of the tie rod 1067, the entire shape of the front cover 1221 is reduced or prevented from being enlarged such that the enlargement of the front portion of the vehicle is reduced or prevented.

Supposing a case that the vehicle 1001 including the first front wheel 1031 and the second front wheel 1032 interlocked with each other runs over an obstacle having a thickness of 100 mm during traveling, the front wheels on the obstacle are displaced upward by the link mechanism 1005 of the first bracket 1317 and the second bracket 1327 so that the required stroke of each of the first shock absorber 1033 and the second shock absorber 1034 is only about 50 mm, for example. However, from the viewpoint of the riding comfort of the vehicle, the distance of the stroke is desired to be made as long as possible to optimize the stiffness of springs even in the configuration including the two front wheels. Hence, in the above-described preferred embodiments in which the extension/contraction length of each of the first shock absorber 1033 and the second shock absorber 1034 is easily secured, the impact forces applied to the first front wheel 1031 and the second front wheel 1032 during the traveling of the vehicle 1001 are absorbed easily such that the riding comfort of the vehicle 1001 is improved.

Furthermore, International Publication No. WO 2012/007819 discloses a vehicle configuration in which a tie rod that transmits the steering force generated in accordance with the turning operation of a steering shaft to left and right brackets is disposed at a position in which the tie rod overlaps with the lower cross member of a link mechanism as viewed from the front of the vehicle. In the vehicle configuration described in International Publication No. WO 2012/007819, the space that accommodates other vehicle components, such as auxiliary devices, is limited to an area ahead of the cross member. Hence, in the vehicle configuration described in International Publication No. WO 2012/007819, a vehicle body cover and the like are enlarged and the front portion of the vehicle is apt to become bulky to secure sufficient space to accommodate other vehicle components, such as auxiliary devices.

On the other hand, in the above-described preferred embodiments, the first cross member 1051 and the second cross member 1052 defining the turnable members of the link mechanism 1005 are disposed above the first front wheel 1031 and the second front wheel 1032. Furthermore, the tie rod 1067 is disposed at the position in which at least a portion thereof overlaps with at least one of the first shock-absorber supporting section 1317a of the first bracket 1317 and the first shock absorber 1033 or at the position in which at least a portion thereof overlaps with at least one of the second shock-absorber supporting section 1327a of the second bracket 1327 and the second shock absorber 1034, at least in the fully tilted state that the link mechanism 1005 is fully tilted when the vehicle is viewed from front. With this configuration, the front portion of the vehicle 1001 is reduced or prevented from being enlarged.

In the above-described preferred embodiments, in the no-load state of the vehicle 1001, the tie rod 1067 is disposed at the position in which portions thereof overlap with the first shock-absorber supporting section 1317a of the first bracket 1317 and the second shock-absorber supporting section 1327a of the second bracket 1327 as viewed from the front of the vehicle. Hence, even in the upright state of the vehicle, the tie rod 1067 avoids making contact with the first shock-absorber supporting section 1317a of the first bracket 1317 by using the space in the front-rear direction such that the first shock-absorber supporting section 1317a of the first bracket 1317 is easily disposed in an upper area in comparison with the conventional configuration. Similarly, the second shock-absorber supporting section 1327a of the second bracket 1327 is easily disposed in an upper area. Hence, the large extension/contraction lengths of the first shock absorber 1033 and the second shock absorber 1034 are easily secured. As a result, impact forces applied to the first front wheel 1031 and the second front wheel 1032 during the traveling of the vehicle 1001 are absorbed easily and smoothly such that the riding comfort of the vehicle 1001 is improved.

In the above-described preferred embodiments, in the no-load state of the vehicle 1001, the first side-member supporting section 1317b and the first shock-absorber supporting section 1317a overlap with each other as viewed from the direction orthogonal or substantially orthogonal to the extending direction of the first side member 153. Similarly, the second side-member supporting section 1327b and the second shock-absorber supporting section 1327a overlap with each other as viewed from the direction orthogonal or substantially orthogonal to the extending direction of the second side member 1054. Hence, the upper and lower surfaces of the first bracket 1317 and the second bracket 1327 are simply flat surfaces. For this reason, the first bracket 1317 and the second bracket 1327 are downsized in comparison with the conventional configuration in which the brackets include slanted portions. Therefore, the enlargement of the vehicle body cover 1022 is reduced or prevented such that the enlargement of the front portion of the vehicle 1001 is reduced or prevented. Furthermore, in the above-described preferred embodiments, in comparison with the conventional configuration in which the brackets include slanted portions, the shapes of the brackets are simple so as to have a flat surface which is easily produced such that the production costs of the first bracket 1317 and the second bracket 1327 are reduced.

In the above-described preferred embodiments, the first opposing surface 1674 of the tie rod 1067 is configured so as to be spaced away from the first shock absorber 1033 in the front-rear direction of the vehicle, and the second opposing surface 1675 of the tie rod 1067 is configured so as to be spaced away from the second shock absorber 1034 in the front-rear direction of the vehicle. Hence, the first connecting section 1671, the second connecting section 1672, and the third connecting section 1673 of the tie rod 1067 are not required to be disposed significantly forward. As a result, the front portion of the vehicle 1001 is reduced or prevented from being enlarged.

In the above-described preferred embodiments, the configuration preferably includes the steering force transmitting mechanism 1006 in which the tie rod 1067 is supported via the center joint 1064, the left joint 1065, and the right joint 1066 which are respectively disposed directly ahead of the center transmission plate 1061, the left transmission plate 1062, and the right transmission plate 1063. However, the steering force transmitting mechanism 1006 may be configured so that the tie rod 1067 is respectively supported at rear portions of the center transmission plate 1061, the left transmission plate 1062, and the right transmission plate 1063 via the center joint 1064, the left joint 1065, and the right joint 1066. When the tie rod 1067 is disposed behind the first shock absorber 1033, the second shock absorber 1034, the first shock-absorber supporting section 1317a, and the second shock-absorber supporting section 1327a, the above structure is configured such that the first opposing surface 1674 and the second opposing surface 1675 of the tie rod 1067 are curved so as to protrude rearward. With this configuration, the first connecting section 1671, the second connecting section 1672, and the third connecting section 1673 of the tie rod 1067 may not be required to be disposed significantly downward. As a result, the front portion of the vehicle 1001 is reduced or prevented from being enlarged.

In the above-described preferred embodiments, relative to the vehicle center axis F1 extending in the front-rear direction of the vehicle 1, the inner wheel steering angle θα of the front wheel disposed inward during steering (i.e., one of the first front wheel 1031 and the second front wheel 1032) is larger than the outer wheel steering angle θβ of the front wheel disposed outward during steering (i.e., the other one of the first front wheel 1031 or the second front wheel 1032). Hence, during steering, the first front wheel 1031 and the second front wheel 1032 are set to postures in which the Ackermann geometry is easily established. Hence, even when large steering is performed, the turning radius of the first front wheel 1031 is close to that of the second front wheel 1032. For this reason, the first front wheel 1031 is steered smoothly about the first axle 1314 and the second front wheel 1032 is steered smoothly about the second axle 1324.

In particular, in the above-described preferred embodiments, the first opposing surface 1674 and the second opposing surface 1675 of the tie rod 1067 are curved. The tie rod 1067 including the curved sections as described above are configured to be elastically deformed slightly during turning (in other words, the tie rod 1067 has a rigidity to the extent of being elastically deformed slightly while having a rigidity required to transmit the steering force). In other words, the tie rod 1067 has a shape that is liable to be elastically deformed so that the Ackermann geometry is established during the turning of the vehicle 1001.

Furthermore, in the vehicle 1001 including the first front wheel 1031 and the second front wheel 1032 that are tilted by the tilting operation, the surfaces of the first front wheel 1031 and the second front wheel 1032 making contact with the ground are changed during the tilting operation. Because of the influence of this change, the inner-outer wheel difference is absorbed to some extent. Hence, in the vehicle 1001, with the above-described configuration, the riding comfort during the turning is improved, although it is not necessarily required to have a structure in which the Ackermann geometry is established completely.

In the above-described preferred embodiments, the first shock absorber 1033 defining the first support member and the second shock absorber 1034 defining the second support member are preferably disposed closer to the center of the vehicle than the first front wheel 1031 and the second front wheel 1032 in the left-right direction of the vehicle. However, the first shock absorber 1033 defining the first support member may be disposed in an outer area (on the left) of the first front wheel 1031 in the left-right direction of the vehicle. Similarly, the second shock absorber 1034 defining the second support member may be disposed in an outer area (on the right) of the second front wheel 1032 in the left-right direction of the vehicle.

In the above-described preferred embodiments, the connection between the tie rod 1067 and the first bracket 1317, defining the steering force transmitting members, preferably is performed using the left joint 1065 including the first left turn section 1651 being turnable about its turn axis oriented in the up-down direction and the second left turn section 1655 being turnable relatively about its turn axis oriented in the front-rear direction relative to the first left turn section 1651. Similarly, the connection between the tie rod 1067 and the second bracket 1327 preferably is performed using the right joint 1066 including the first right turn section 1661 being turnable about its turn axis oriented in the up-down direction and the second right turn section 1665 being turnable relatively about its turn shaft oriented in the front-rear direction relative to the first right turn section 1661. However, the connection between the tie rod 1067 and the first bracket 1317, defining the steering force transmitting members, is not limited to this example. Similarly, the connection between the tie rod 1067 and the second bracket 1327 is not limited to this example. For example, it may be possible to use a left joint (having a configuration in which the disposition relationship between the first left turn section and the second left turn section in the front-rear direction is opposite to that in this example) including a first left turn section being turnable about its turn axis oriented in the front-rear direction and a second left turn section being turnable relatively about its turn axis oriented in the up-down direction relative to the first left turn section. Similarly, it may also be possible to use a right joint (having a configuration in which the disposition relationship between the first right turn section and the second right turn section in the front-rear direction is opposite to that in this example) including a first right turn section being turnable about its turn axis oriented in the front-rear direction and a second right turn section being turnable relatively about its turn axis oriented in the up-down direction relative to the first right turn section. Moreover, a configuration may be used in which the tie rod and the brackets are connected using ball joints or the like.

In addition, in the preferred embodiments described above, the tie rod 1067 overlaps with the first bracket 1317 and the second bracket 1327 as viewed from the front of the vehicle in the no-load state and when the vehicle body frame 1021 is in its upright state. However, the tie rod according to the preferred embodiments of the present invention is not limited to this configuration. As viewed from the side of the vehicle in the upright state of the vehicle body frame 1021, at least portions of the tie rod 1067 may merely be required to be disposed below the second cross member 1052 provided ahead of the first center axis Y1 of the first side member 1053 and the second center axis Y2 of the second side member 1054, above the first front wheel 1031 and the second front wheel 1032, behind the front end of the first front wheel 1031 and the front end of the second front wheel 1032, and ahead of the first center axis Y1 of the first side member 1053 and the second center axis Y2 of the second side member 1054. Hence, for example, as viewed from the side of the vehicle in the upright state of the vehicle body frame 1021, the tie rod 1067 may also be disposed below the second cross member 1054 provided ahead of the first center axis Y1 of the first side member 1053 and the second center axis Y2 of the second side member 1054, and above the first bracket 1317 and the second bracket 1327. Furthermore, the tie rod 1067 may also be disposed below the first bracket 1317 and the second bracket 1327, and above the first front wheel 1031 and the second front wheel 1032.

Hence, the tie rod 1067 is disposed at a position close to or within the movable ranges of the first front wheel 1031 and the second front wheel 1032 at the time when the vehicle body frame 1021 is tilted in the left-right direction. The space in which the tie rod 1067 is disposed is a space that is not used conventionally because of interference with the first front wheel 1031 and the second front wheel 1032. The inventor of the preferred embodiments of the present invention first noticed that the tie rod 1067 moves together with the first front wheel 1031 and the second front wheel 1032 in cooperation with the operation of the link mechanism 1005 and the steering of the handle bar. Then, the inventor of the preferred embodiments of the present invention conceived that it is possible to avoid the interference of the tie rod 1067 with the first front wheel 1031 and the second front wheel 1032. With the use of this idea, the interference of the first front wheel 1031, the second front wheel 1032, the second cross member 1052, the first support member, and the second support member with the tie rod 1067 is avoided by disposing the tie rod 1067 at a position close to or within the movable ranges of the first front wheel 1031 and the second front wheel 1032. Moreover, the tie rod 1067 is disposed below the second cross member 1052 that is provided ahead of the first center axis Y1 of the first side member 1053 and the second center axis Y2 of the second side member 1054. Hence, it is possible to dispose the on-vehicle components, such as other auxiliary devices, in the space ahead of the second cross member 1052. As a result, the enlargement of the structure around the periphery of the steering shaft is reduced or prevented.

Moreover, the tie rod 1067 overlaps with a portion of the first support member or the second support member as viewed from the front of the vehicle in the fully tilted state that the vehicle body frame 1021 is fully tilted in the left-right direction. Hence, in the fully tilted state, the tie rod is positioned ahead of the first support member and the second support member. Therefore, the first shock absorber 1033 of the first support member and the second shock absorber 1034 of the second support member sufficiently secures the extension/contraction lengths thereof while avoiding interference with the tie rod 1067 in the front-rear direction of the vehicle. As a result, the riding comfort of the vehicle is secured. As described above, the enlargement of the structure around the periphery of the steering shaft located above the two front wheels is reduced or prevented while the degeneration of the riding comfort of the vehicle including the tiltable vehicle body frame and the two front wheels is reduced or prevented.

In addition, at least a portion of the tie rod 1067 may be disposed below the upper end of the first bracket 1317 of the first support member and the upper end of the second bracket 1327 of the second support member as viewed from the side of the vehicle in the upright state of the vehicle body frame 1021. With this configuration, the tie rod 1067 is disposed in an even lower area. Hence, a larger space is secured in an area directly ahead of the second cross member 1052 such that the on-vehicle components, such as other auxiliary devices, are disposed therein. In addition, in the above-described vehicle, even in the upright state of the vehicle body frame 1021, the extension/contraction lengths of the first shock absorber 1033 and the second shock absorber 1034 are longer while the contact of the tie rod 1067 with the first support member and the second support member is easily avoided. As a result, the enlargement of the structure around the periphery of the steering shaft located above the two front wheels is reduced or prevented while the degeneration of the riding comfort of the vehicle is further reduced or prevented.

Furthermore, the upper end of the first shock absorber 1033 and the upper end of the second shock absorber 1034 may be disposed above the lower end of the first side member 1053 and the lower end of the second side member 1054 in the up-down direction of the vehicle body frame in the upright state of the vehicle body frame 1021. In the above-described vehicle, the distance between the upper surface and the lower surface of each of the first bracket 1317 and the second bracket 1327 is reduced. For this reason, the first bracket 1317 and the second bracket 1327 are downsized in comparison with the conventional configuration in which the brackets include slanted portions. For this reason, the extension/contraction lengths of the first shock absorber 1033 and the second shock absorber 1034 are longer. As a result, the enlargement of the structure around the periphery of the steering shaft located above the two front wheels is further reduced or prevented while the degeneration of the riding comfort of the vehicle is further reduced or prevented.

In addition, the tie rod 1067 may be configured such that the right intermediate portion between the right end portion and the center portion of the tie rod 1067 and the left intermediate portion between the left end portion and the center portion of the tie rod 1067 are located ahead of at least one of the right end portion, the center portion, and the left end portion in the front-rear direction of the vehicle body frame in the upright state of the vehicle body frame 1021. With this configuration, the tie rod 1067 avoids interference with the first support member and the second support member while the tie rod itself is reduced or prevented from being enlarged. Hence, the movable range of the tie rod 1067 is reduced such that the on-vehicle components, such as other auxiliary devices, are disposed in the space ahead of the second cross member 1052. As a result, the enlargement of the structure around the periphery of the steering shaft located above the two front wheels is further reduced or prevented while the degeneration of the riding comfort of the vehicle is reduced or prevented.

The length of the tie rod 1067 in the left-right direction of the vehicle body frame 1021 may be longer than the distance between the right end of the first front wheel 1031 and the left end of the second front wheel 1032 in the left-right direction and shorter than the distance between the first center axis Y1 of the first side member 1053 and the second center axis Y2 of the second side member 1054 in the left-right direction, as viewed from above of the vehicle in the upright state of the vehicle body frame 1021. Since the tie rod 1067 is disposed below the second cross member 1052 and above the first front wheel 1031 and the second front wheel 1032, even if its length is made longer to obtain the Ackermann geometry, the tie rod does not interfere with the first support member and the second support member. Furthermore, the on-vehicle components, such as other auxiliary devices, are disposed in the space directly ahead of the second cross member 1052. As a result, the enlargement of the structure around the periphery of the steering shaft located above the two front wheels is reduced or prevented while the degeneration of the riding comfort of the vehicle is reduced or prevented such that the characteristics of the vehicle are easily adjusted.

Furthermore, the vehicle may include the front cover 1221 supported on the vehicle body frame 1021 and covering at least the first cross member 1051 of the link mechanism 1005. Moreover, the vehicle may include a first front fender and a second front fender disposed directly above the first front wheel 1031 and the second front wheel 1032, which are turned together with the first front wheel 1031 and the second front wheel 1032 in cooperation with the turning of the steering shaft 1060. The tie rod 1067 may be disposed at a position closer to the first front fender 1227 and the second front fender 1228 than to the front cover in the up-down direction in the upright state of the vehicle body frame. The movement of the tie rod 1067 is interlocked with the movements of the first front fender 1227 and the second front fender 1228. On the other hand, since the front cover 1221 is supported on the vehicle body frame 1021, its movement is not interlocked with the movement of the tie rod 1067. For this reason, the tie rod 1067 is disposed in an even lower area. Hence, a larger space is secured in an area directly ahead of the second cross member 1052 such that the on-vehicle components, such as other auxiliary devices, are disposed therein. As a result, the enlargement of the structure around the periphery of the steering shaft located above the two front wheels is further reduced or prevented while the degeneration of the riding comfort of the vehicle is reduced or prevented.

In addition, the tie rod 1067 may be disposed at a position closer to the turning center R1 (see FIG. 11 and FIG. 20) of the first front wheel and the second front wheel than to the second cross member 1052 that is provided ahead of the first center axis Y1 of the first side member 1053 and the second center axis Y2 of the second side member 1054 in the front-rear direction in the upright state of the vehicle body frame 1021. With this configuration, the tie rod 1067 is disposed in an even more anterior area. Hence, a larger space is secured in an area directly ahead of the second cross member 1052 such that the on-vehicle components, such as other auxiliary devices, are disposed therein. As a result, the enlargement of the structure around the periphery of the steering shaft located above the two front wheels is further reduced or prevented while the degeneration of the riding comfort of the vehicle is reduced or prevented.

Furthermore, in the preferred embodiments of the present invention, the tie rod 1067 preferably is defined by a single member. However, the present invention is not limited to this configuration. The tie rod according to a preferred embodiment of the present invention may be a single member or may be two or more members. In addition, the tie rod 1067 according to a preferred embodiment of the present invention is curved frontward between the first connecting section 1671 and the third connecting section 1673 and between the second connecting section 1672 and the third connecting section 1673. However, the tie rod according to the present invention is not limited to the shape according to this configuration. The tie rod according to a preferred embodiment of the present invention may be curved or may have a straight shape, provided that the tie rod has a shape extending in the left-right direction.

In the first support member and the second support member according to a preferred embodiment of the present invention, one end thereof is fixed to a bracket and the other end thereof preferably is configured as a telescopic support member to support an axle. However, the support member according to the present invention is not limited to the telescopic support member. For example, the support member may be a link-type support member. The link-type support member includes, for example, a bottom bridge provided directly below a side rod and extending frontward; a fork extending downward from the front end portion of the bottom bridge; a supporting arm, one end portion of which is supported so as to be pivotable relative to the fork and the other end portion of which is provided with an axle to support a front wheel; and a shock-absorbing member provided between the bottom bridge and the supporting arm.

The term "parallel" according to preferred embodiments of the present invention comprehends two straight lines in members which are not intersecting with each other but are inclined preferably in the range of about ±30 degrees, for example. The term "along" to be used for the terms "direction" and "member" for example according to preferred embodiments of the present invention includes a case in which the direction and the member are inclined preferably in the range of about ±45 degrees, for example. The term "extend" to be used for the term "direction" according to preferred embodiments of the present invention includes a case in which the direction is preferably inclined in the range of about ±45 degrees, for example. The term "front-rear direction" according to preferred embodiments of the present invention includes not only the front-rear direction but also a direction inclined preferably in the range of about ±45 degrees relative to the front-rear direction, for example. The term "up-down direction" according to preferred embodiments of the present invention includes not only the up-down direction but also a direction preferably inclined in the range of about ±45 degrees relative to the up-down direction, for example. The term "left-right direction" according to preferred embodiments of the present invention includes not only the left-right direction but also a direction preferably inclined in the range of about ±45 degrees relative to the left-right direction, for example. The vehicle according to preferred embodiments of the present invention is a vehicle including a tiltable vehicle body frame and two front wheels. The number of the rear wheels thereof is not limited to one but may be two. Furthermore, the vehicle may include a vehicle body cover to cover the vehicle body frame. The vehicle may not include a vehicle body cover to cover the vehicle body frame. The power source of the vehicle is not limited to an engine but may be an electric motor.

In preferred embodiments of the present invention, the front fenders are disposed directly above the first front wheel and the second front wheel and are turned together with the first front wheel and the second front wheel in cooperation with the turning of the steering shaft. However, the front fenders are supported on the upper portions of the shock absorbers or on the brackets of the support members. Hence, the movements of the front fenders are not interlocked with the extension/contraction of the shock-absorbing members. In other words, even if the first front wheel and the second front wheel are displaced in the up-down direction in cooperation with the extension/contraction of the shock-absorbing members, the front fenders are not displaced in the up-down direction in cooperation with the extension/contraction of the shock-absorbing members. However, the term "front fenders" according to preferred embodiments of the present invention includes members that are supported on the lower portions of the shock absorbers. In other words, the term "front fenders" according to preferred embodiments of the present invention includes members that are displaced together with the first front wheel and the second front wheel in the up-down direction in cooperation with the extension/contraction of the shock-absorbing members.

The terms and expressions used herein are used for explanation but not for limited interpretation. No equivalents of features indicated and described herein are eliminated, and various modifications within the scope of the claims of the present invention must be recognized to be allowable.

The present invention can be embodied in a variety of different forms. This disclosure should be regarded to provide preferred embodiments based on the principle of the present invention. Numerous illustrated preferred embodiments have been described herein under the understanding that the present invention is not intended to be limited to the preferred embodiments described/or illustrated herein.

Some of illustrated preferred embodiments of the present invention have been described herein. The present invention is not limited to the various preferable preferred embodiments described herein. The present invention includes all the preferred embodiments including equivalent elements, modifications, deletions, combinations (for example, the combinations of features common to various preferred embodiments), improvements and/or changes that can be recognized by those skilled in the art on the basis of this disclosure. The limitations in the claims should be construed widely on the basis of the terms used in the claims and should not be limited to the preferred embodiments described in the present specification or during the prosecution of the present application. Those preferred embodiments should be construed as non-exclusive. For example, in this disclosure, the terms "preferred," "preferable" and "good" are not exclusive and the meanings of the terms are "preferred but not limited to," "preferable but not limited to this" and "good but not limited to this."

Furthermore, the advantages described referring to the above-described second preferred embodiment are also obtained similarly from the first preferred embodiment.

Although the present invention has been described in detail referring to specific preferred embodiments, various changes and modifications can be made without departing from the spirit and scope of the present invention.

This application claims priority to Japanese Patent Application No. 2012-209873 filed on Sep. 24, 2012 and Japanese Patent Application No. 2013-138478 filed on Jul. 1, 2013, the contents of which are each hereby incorporated by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
    a vehicle body frame;
    a first front wheel and a second front wheel arranged side by side in a left-right direction of the vehicle body frame;
    a first support member including:
        a first shock-absorbing member supporting the first front wheel at a lower portion thereof, and configured to absorb displacement of the first front wheel in an up-down direction of the vehicle body frame relative to an upper portion thereof; and
        a first bracket supporting the upper portion of the first shock-absorbing member;
    a second support member including:
        a second shock-absorbing member supporting the second front wheel at a lower portion thereof and configured to absorb displacement of the second front wheel in the up-down direction of the vehicle body frame relative to an upper portion thereof; and
        a second bracket supporting the upper portion of the second shock-absorbing member;
    a link mechanism including:
        a first side member disposed such that a lower portion thereof is located in front of an upper portion thereof in a front-rear direction of the vehicle body frame and supporting the upper portion of the first support member so as to be turnable about a first axis extending in the up-down direction of the vehicle body frame;
        a second side member disposed such that a lower portion thereof is located in front of an upper portion thereof in the front-rear direction of the vehicle body frame and supporting the upper portion of the second support member so as to be turnable about a second axis extending parallel or substantially parallel to the first axis;
        an upper turnable member turnably supporting the upper portion of the first side member at a left end portion thereof and turnably supporting the upper portion of the second side member at a right end portion thereof, the upper turnable member including an intermediate portion supported on the vehicle body frame so as to be turnable about an upper axis extending in the front-rear direction of the vehicle body frame; and
        a lower turnable member turnably disposed below the upper turnable member and above the first front wheel and the second front wheel when the vehicle body frame is in an upright state, the lower turnable member supporting the lower portion of the first side member at a left end portion thereof and turnably supporting the lower portion of the second side member at a right end portion thereof, the lower turnable member including an intermediate portion supported on the vehicle body frame so as to be turnable about a lower axis extending parallel or substantially parallel to the upper axis and disposed in front of the first axis and the second axis;
    a steering shaft supported by the vehicle body frame at a position between the first side member and the second side member in a left-right direction of the vehicle body frame and including an upper end portion disposed above the lower axis in the up-down direction, the steering shaft being disposed such that a lower end portion thereof is located in front of the upper end portion in the front-rear direction of the vehicle body frame and configured to turn about a steering turn axis extending in the up-down direction of the vehicle body frame;
    a handle disposed on the upper end portion of the steering shaft; and
    a steering force transmitting mechanism including a tie rod extending in the left-right direction of the vehicle body frame, and configured to transmit a turning motion of the steering shaft in accordance with an operation of the handle to the first support member and the second support member; wherein
    at least a portion of the tie rod of the steering force transmitting mechanism overlaps with a portion of the first support member or the second support member such that the tie rod is positioned ahead of the first support member and the second support member when viewed from a front of the vehicle when the vehicle body frame is in a fully-tilted condition in the left-right direction; and
    an entirety of the tie rod of the steering force transmitting mechanism is disposed below the lower turnable member, above the first front wheel and the second front wheel, behind a front end of the first front wheel and a front end of the second front wheel, and in front of the first axis of the first side member and the second axis of the second side member when viewed from a lateral side of the vehicle when the vehicle body frame is in the upright state.

2. The vehicle according to claim 1, wherein at least a portion of the tie rod is disposed below an upper end of the first bracket of the first support member and an upper end of the second bracket of the second support member when viewed from the lateral side of the vehicle when the vehicle body frame is in the upright state.

3. A vehicle comprising:
    a vehicle body frame;
    a first front wheel and a second front wheel arranged side by side in a left-right direction of the vehicle body frame;
    a first support member including:
        a first shock-absorbing member supporting the first front wheel at a lower portion thereof, and configured to absorb displacement of the first front wheel in an up-down direction of the vehicle body frame relative to an upper portion thereof; and
a first bracket supporting the upper portion of the first shock-absorbing member;
a second support member including:
a second shock-absorbing member supporting the second front wheel at a lower portion thereof and configured to absorb displacement of the second front wheel in the up-down direction of the vehicle body frame relative to an upper portion thereof; and
a second bracket supporting the upper portion of the second shock-absorbing member;
a link mechanism including:
a first side member disposed such that a lower portion thereof is located in front of an upper portion thereof in a front-rear direction of the vehicle body frame and supporting the upper portion of the first support member so as to be turnable about a first axis extending in the up-down direction of the vehicle body frame;
a second side member disposed such that a lower portion thereof is located in front of an upper portion thereof in the front-rear direction of the vehicle body frame and supporting the upper portion of the second support member so as to be turnable about a second axis extending parallel or substantially parallel to the first axis;
an upper turnable member turnably supporting the upper portion of the first side member at a left end portion thereof and turnably supporting the upper portion of the second side member at a right end portion thereof, the upper turnable member including an intermediate portion supported on the vehicle body frame so as to be turnable about an upper axis extending in the front-rear direction of the vehicle body frame; and
a lower turnable member turnably disposed below the upper turnable member and above the first front wheel and the second front wheel when the vehicle body frame is in an upright state, the lower turnable member supporting the lower portion of the first side member at a left end portion thereof and turnably supporting the lower portion of the second side member at a right end portion thereof, the lower turnable member including an intermediate portion supported on the vehicle body frame so as to be turnable about a lower axis extending parallel or substantially parallel to the upper axis and disposed in front of the first axis and the second axis;
a steering shaft supported by the vehicle body frame at a position between the first side member and the second side member in a left-right direction of the vehicle body frame and including an upper end portion disposed above the lower axis in the up-down direction, the steering shaft being disposed such that a lower end portion thereof is located in front of the upper end portion in the front-rear direction of the vehicle body frame and configured to turn about a steering turn axis extending in the up-down direction of the vehicle body frame;
a handle disposed on the upper end portion of the steering shaft; and
a steering force transmitting mechanism including a tie rod extending in the left-right direction of the vehicle body frame, and configured to transmit a turning motion of the steering shaft in accordance with an operation of the handle to the first support member and the second support member; wherein
at least a portion of the tie rod of the steering force transmitting mechanism overlaps with a portion of the first support member or the second support member when viewed from a front of the vehicle when the vehicle body frame is in a fully-tilted condition in the left-right direction;
at least a portion of the tie rod of the steering force transmitting mechanism is disposed below the lower turnable member, above the first front wheel and the second front wheel, behind a front end of the first front wheel and a front end of the second front wheel, and in front of the first axis of the first side member and the second axis of the second side member when viewed from a lateral side of the vehicle when the vehicle body frame is in the upright state; and
the upper end of the first shock-absorbing member and the upper end of the second shock-absorbing member are disposed above a lower end of the first side member and a lower end of the second side member in the up-down direction when the vehicle body frame is in the upright state.

4. The vehicle according to claim 1, wherein the tie rod is configured such that a left intermediate portion thereof located between a left end portion thereof and an intermediate portion thereof, and a right intermediate portion thereof located between a right end portion thereof and the intermediate portion thereof is located in front of either one of the left end portion thereof, the right end portion thereof, and the intermediate portion thereof in the front-rear direction of the vehicle body frame in the upright state.

5. The vehicle according to claim 1, wherein a length of the tie rod in the left-right direction of the vehicle body frame is longer than a distance between a right end of the first front wheel and a left end of the second front wheel in the left-right direction, and is shorter than a distance between the first axis of the first side member and the second axis of the second side member in the left-right direction, when viewed from above the vehicle when the vehicle body frame is in the upright state.

6. A vehicle comprising:
a vehicle body frame;
a first front wheel and a second front wheel arranged side by side in a left-right direction of the vehicle body frame;
a first support member including:
a first shock-absorbing member supporting the first front wheel at a lower portion thereof, and configured to absorb displacement of the first front wheel in an up-down direction of the vehicle body frame relative to an upper portion thereof; and
a first bracket supporting the upper portion of the first shock-absorbing member;
a second support member including:
a second shock-absorbing member supporting the second front wheel at a lower portion thereof and configured to absorb displacement of the second front wheel in the up-down direction of the vehicle body frame relative to an upper portion thereof; and
a second bracket supporting the upper portion of the second shock-absorbing member;
a link mechanism including:
a first side member disposed such that a lower portion thereof is located in front of an upper portion thereof in a front-rear direction of the vehicle body frame and supporting the upper portion of the first support member so as to be turnable about a first axis extending in the up-down direction of the vehicle body frame;
a second side member disposed such that a lower portion thereof is located in front of an upper portion thereof in the front-rear direction of the vehicle body frame and supporting the upper portion of the second support member so as to be turnable about a second axis extending parallel or substantially parallel to the first axis;
an upper turnable member turnably supporting the upper portion of the first side member at a left end portion thereof and turnably supporting the upper portion of the second side member at a right end portion thereof, the upper turnable member including an intermediate portion supported on the vehicle body frame so as to be turnable about an upper axis extending in the front-rear direction of the vehicle body frame; and
a lower turnable member turnably disposed below the upper turnable member and above the first front wheel and the second front wheel when the vehicle body frame is in an upright state, the lower turnable member supporting the lower portion of the first side member at a left end portion thereof and turnably supporting the lower portion of the second side member at a right end portion thereof, the lower turnable member including an intermediate portion supported on the vehicle body frame so as to be turnable about a lower axis extending parallel or substantially parallel to the upper axis and disposed in front of the first axis and the second axis;
a steering shaft supported by the vehicle body frame at a position between the first side member and the second side member in a left-right direction of the vehicle body frame and including an upper end portion disposed above the lower axis in the up-down direction, the steering shaft being disposed such that a lower end portion thereof is located in front of the upper end portion in the front-rear direction of the vehicle body frame and configured to turn about a steering turn axis extending in the up-down direction of the vehicle body frame;
a handle disposed on the upper end portion of the steering shaft;
a steering force transmitting mechanism including a tie rod extending in the left-right direction of the vehicle body frame, and configured to transmit a turning motion of the steering shaft in accordance with an operation of the handle to the first support member and the second support member;
a front cover supported on the vehicle body frame and covering at least the upper turnable member of the link mechanism;
a first front fender disposed directly above the first front wheel and configured to turn together with the first front wheel in cooperation with the turning motion of the steering shaft; and
a second front fender disposed directly above the second front wheel and configured to turn together with the second front wheel in cooperation with the turning motion of the steering shaft; wherein
at least a portion of the tie rod of the steering force transmitting mechanism overlaps with a portion of the first support member or the second support member when viewed from a front of the vehicle when the vehicle body frame is in a fully-tilted condition in the left-right direction;
at least a portion of the tie rod of the steering force transmitting mechanism is disposed below the lower turnable member, above the first front wheel and the second front wheel, behind a front end of the first front wheel and a front end of the second front wheel, and in front of the first axis of the first side member and the second axis of the second side member when viewed from a lateral side of the vehicle when the vehicle body frame is in the upright state; and
the tie rod is disposed closer to the first front fender and the second front fender than to the front cover in the up-down direction when the vehicle body frame is in the upright state.

7. The vehicle according to claim 1, wherein the tie rod is closer to a turning center of the first front wheel and a turning center of the second front wheel than to the lower turnable member in front of the first axis of the first side member and the second axis of the second side member in the front-rear direction when the vehicle body frame is in the upright state.

* * * * *